US011228634B2

(12) United States Patent
Nagao

(10) Patent No.: US 11,228,634 B2
(45) Date of Patent: Jan. 18, 2022

(54) MANAGEMENT SYSTEM, REMOTE DEVICE MANAGEMENT SYSTEM, DISPLAY CONTROL METHOD, AND RECORDING MEDIUM

(71) Applicant: Ricoh Company, Ltd., Tokyo (JP)

(72) Inventor: Motohiro Nagao, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 112 days.

(21) Appl. No.: 16/681,903

(22) Filed: Nov. 13, 2019

(65) Prior Publication Data
US 2020/0177667 A1    Jun. 4, 2020

(30) Foreign Application Priority Data

Nov. 29, 2018 (JP) .............................. JP2018-223057

(51) Int. Cl.
*H04L 29/08* (2006.01)
*H04L 29/06* (2006.01)
*G06F 3/048* (2013.01)
*G06F 3/0482* (2013.01)

(52) U.S. Cl.
CPC ............ *H04L 67/025* (2013.01); *G06F 3/048* (2013.01); *G06F 3/0482* (2013.01); *H04L 63/029* (2013.01); *H04L 63/0876* (2013.01)

(58) Field of Classification Search
CPC . H04L 67/025; H04L 63/0876; H04L 63/029; H04L 63/107; H04L 43/00; G06F 3/0482; G06F 3/048; H04W 12/088; H04W 12/37; H04W 12/71; H04W 12/63
See application file for complete search history.

(56) References Cited

U.S. PATENT DOCUMENTS

| 10,469,304 | B1* | 11/2019 | Kempe | ............... H04L 63/0272 |
| 2003/0011467 | A1* | 1/2003 | Suomela | ............... G08C 17/02 340/7.1 |
| 2003/0200347 | A1* | 10/2003 | Weitzman | ............... H04L 41/22 719/310 |

(Continued)

FOREIGN PATENT DOCUMENTS

| JP | 2006-163839 | 6/2006 | |
| JP | 2008-148017 | 6/2008 | |
| WO | WO-9821668 A1 * | 5/1998 | ......... H04L 41/0213 |

*Primary Examiner* — Caroline H Jahnige
(74) *Attorney, Agent, or Firm* — Xsensus LLP

(57) ABSTRACT

A management system, a remote device management system, and a display control method. The management system acquires positioning information indicating a location of a mediating apparatus, stores the acquired positioning information in association with device identification information for identifying a device communicable with the mediating apparatus corresponding to the positioning information, receives device status information indicating status of the device from the mediating apparatus, and displays on a display, a first management image including map information depicting an area including the location corresponding to the positioning information and a device identification image indicating the device status information related to the device corresponding to the device identification information associated with the positioning information at a location indicated by the stored positioning information corresponding to the map information.

11 Claims, 46 Drawing Sheets

(56) References Cited

U.S. PATENT DOCUMENTS

| | | | | |
|---|---|---|---|---|
| 2006/0135119 A1* | 6/2006 | Kumar | ................ | H04M 11/002 |
| | | | | 455/405 |
| 2018/0115462 A1* | 4/2018 | Makovsky | .............. | H04L 67/30 |
| 2018/0324044 A1* | 11/2018 | Owen | ..................... | H04L 41/12 |
| 2019/0319921 A1* | 10/2019 | Nishizaki | ................ | H04L 67/34 |

\* cited by examiner

FIG. 8

| No | MEDIATING APPARATUS ID | MEDIATING APPARATUS NAME | IP ADDRESS | APPARATUS STATUS INFORMATION | DEVICE ID | LOCATION ID |
|---|---|---|---|---|---|---|
| 1 | gatewayA | Mediating Apparatus A | 192.168.0.aaa | Connected | deviceA | locationA |
| 2 | gatewayB | Mediating Apparatus B | 192.168.0.bbb | Connected | deviceB | locationB |
| 3 | gatewayC | Mediating Apparatus C | 192.168.0.ccc | Disconnected | deviceC,deviceD | locationC |
| ... | ... | ... | ... | ... | ... | ... |

| No | DEVICE ID | DEVICE NAME | IP ADDRESS | DEVICE STATUS INFORMATION |
|---|---|---|---|---|
| 1 | deviceA | Device A | 192.168.0.xxx | Offline |
| 2 | deviceB | Device B | 192.168.0.yyy | Online |
| 3 | deviceC | Device C | 192.168.0.zzz | Unknown |
| 4 | deviceD | Device D | 192.168.0.rrr | Unknown |
| ⋮ | ⋮ | ⋮ | ⋮ | ⋮ |

| No | LOCATION ID | LOCATION NAME | POSITIONING INFORMATION ||
|---|---|---|---|---|
| | | | LATITUDE | LONGITUDE |
| 1 | locationA | Ebina | 35.4588774 | 139.3886881 |
| 2 | locationB | Shinyokohama | 35.5111702 | 139.6185560 |
| 3 | locationC | Omori | 35.5977553 | 139.7038083 |
| ⋮ | ⋮ | ⋮ | ⋮ | ⋮ |

| No | ACCOUNT ID | PASSWORD |
|---|---|---|
| 1 | ownerA | 0101 |
| 2 | ownerB | 0202 |
| . . . | . . . | . . . |

| No | SCREEN ID | MEDIATING APPARATUS ID | DEVICE ID | LOCATION ID |
|---|---|---|---|---|
| 1 | A001 | gatewayA | deviceA | locationA |
| 2 | A001 | gatewayB | deviceB | locationB |
| 3 | A001 | gatewayC | deviceC,deviceD | locationC |
| ⋮ | ⋮ | ⋮ | ⋮ | ⋮ |

FIG. 13

| No | SCREEN ID | COMMON SCREEN ID | LAYER | MEDIATING APPARATUS ID | DEVICE ID | LOCATION ID | MAP INFORMATION |
|---|---|---|---|---|---|---|---|
| 1 | B001 | p01 | 1 | gatewayA | - | locationA | https://www.⋯ |
| 2 | B001 | p01 | 1 | gatewayB | - | locationB | https://www.⋯ |
| 3 | B001 | p01 | 1 | gatewayC | - | locationC | https://www.⋯ |
| 4 | B002 | p01 | 2 | - | deviceA | locationA | https://www.⋯ |
| 5 | B002 | p01 | 2 | - | deviceB | locationB | https://www.⋯ |
| 6 | B002 | p01 | 2 | - | deviceC | locationC | https://www.⋯ |
| 7 | B002 | p01 | 2 | - | deviceD | locationC | https://www.⋯ |
| 8 | B003 | p01 | 3 | - | deviceA | - | - |
| 9 | B003 | p01 | 3 | - | deviceB | - | - |
| 10 | B003 | p01 | 3 | - | deviceC | - | - |
| 11 | B003 | p01 | 3 | - | deviceD | - | - |
| ⋯ | ⋯ | ⋯ | ⋯ | ⋯ | ⋯ | ⋯ | ⋯ |

| No | OPERATION NAME | OPERATION ID | OPERATION DETAILS | COMMUNICATION PROTOCOL | COMMUNICATION PARAMETER |
|---|---|---|---|---|---|
| 1 | Remote Operation A | operationA | Acquire Status Information | TCP/IP;HTTP | ... |
| 2 | Remote Operation B | operationB | Power On | TCP/IP;HTTP | ... |
| 3 | Remote Operation C | operationC | Acquire Status Information | RS-232C Serial Communication | ... |
| ... | ... | ... | ... | ... | ... |

| No | DEVICE ID | DEVICE NAME | IP ADDRESS | DEVICE STATUS INFORMATION |
|---|---|---|---|---|
| 1 | deviceA | Device A | 192.168.0.xxx | Offline |
| 2 | deviceK | Device K | 192.168.0.kkk | Online |
| ⋮ | ⋮ | ⋮ | ⋮ | ⋮ |

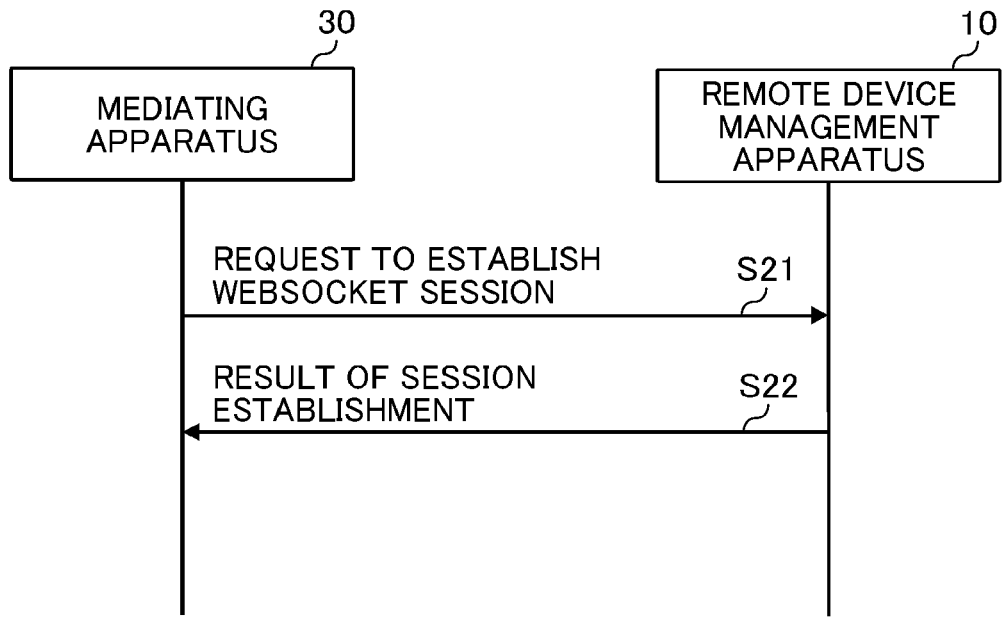
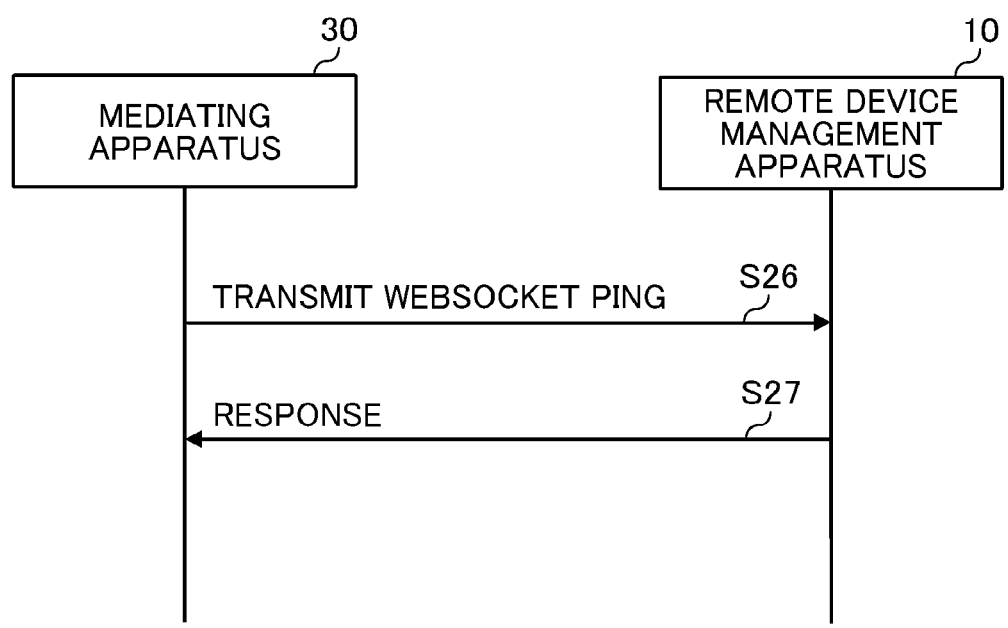

FIG. 30

```
{
  "requests":[{
    "protocol":"HTTP",//String "HTTP"
    "method":"POST/GET/PUT/DELETE",//String
    "secure":true,//boolean
    "port":port number,//interger
    "urlPath":"HTTPendpoint",//String
    "headers":[//sets when setting value in header
      {"X-abc":"hoge"},
      {"X-efg":"foo"}
    ],
    "queryStrings":///set when setting value in query
      {"id":"0001"},
      {"name":"bar"}
    ]
    "messageBody":"set when setting information in body",//String
    "responseValue":"designate parameter corresponding to HTTP response",//String
    "option":null
  }]
}
```

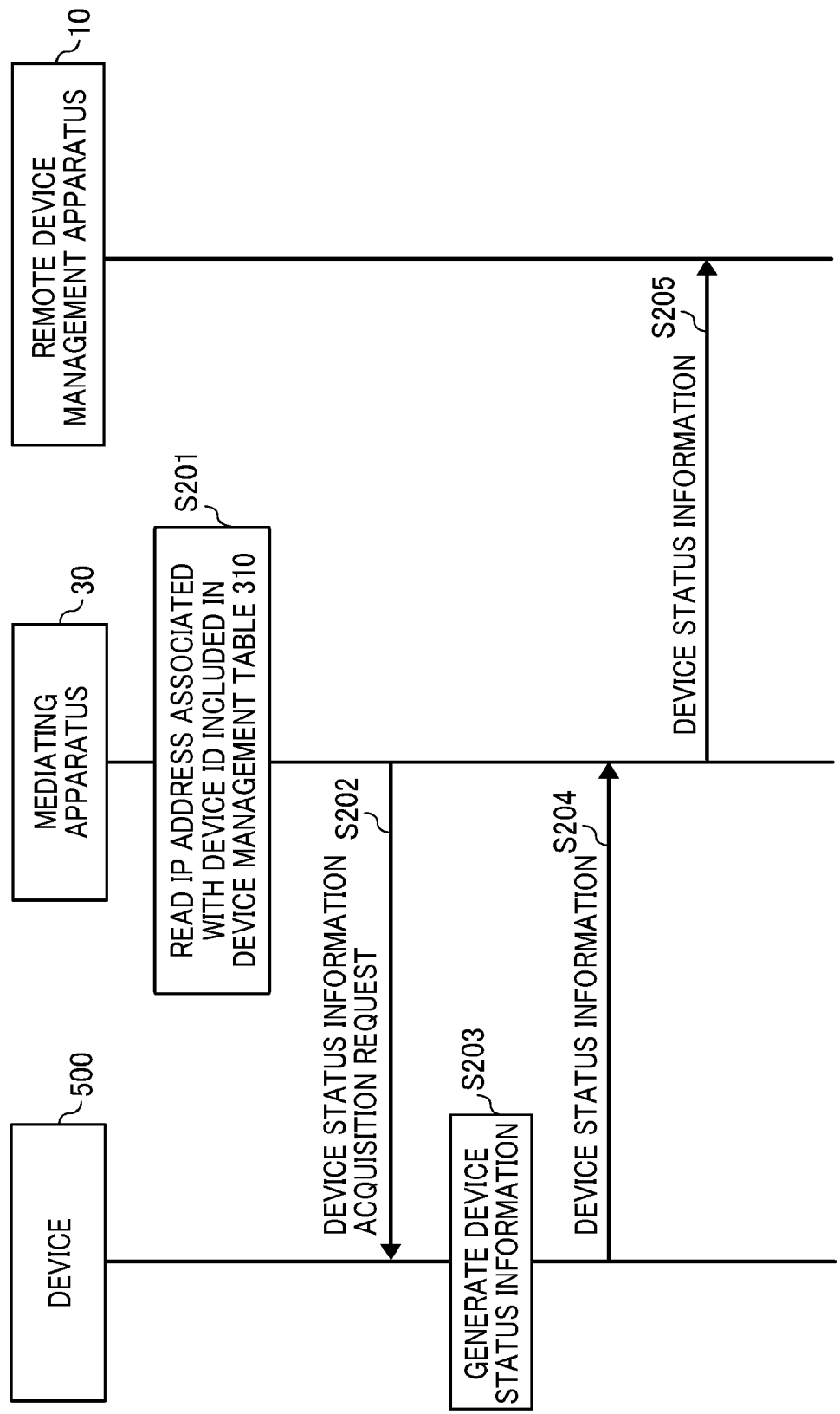

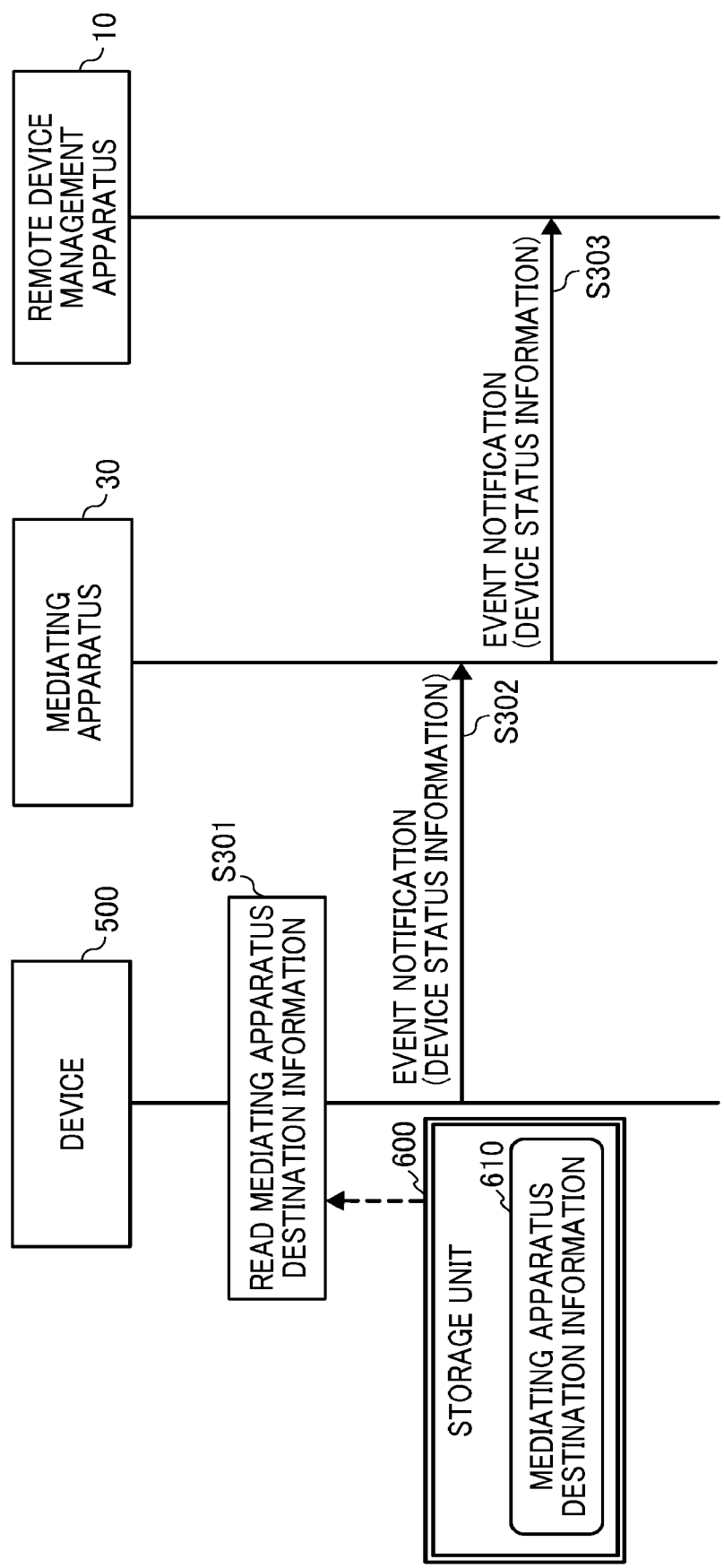

FIG. 35

| No | DEVICE ID | DEVICE NAME | IP ADDRESS | DEVICE STATUS INFORMATION | DEVICE TYPE ID |
|---|---|---|---|---|---|
| 1 | deviceA | Device A | 192.168.0.xxx | Offline | categoryA |
| 2 | deviceB | Device B | 192.168.0.yyy | Online | categoryB |
| 3 | deviceC | Device C | 192.168.0.zzz | Unknown | categoryA |
| 4 | deviceD | Device D | 192.168.0.rrr | Unknown | categoryC |
| ... | ... | ... | ... | ... | ... |

| No | OPERATION NAME | OPERATION ID | DEVICE TYPE ID | OPERATION CONTENT | COMMUNICATION PROTOCOL | COMMUNICATION PARAMETER |
|---|---|---|---|---|---|---|
| 1 | Remote Operation A | operationA | categoryA | Acquire Status Information | TCP/IP;HTTP | ... |
| 2 | Remote Operation B | operationB | categoryB | Power On | TCP/IP;HTTP | ... |
| 3 | Remote Operation C | operationC | categoryC | Acquire Status Information | RS-232C Serial Communication | ... |
| ... | ... | ... | ... | ... | ... | ... |

| No | ACCOUNT ID | PASSWORD | ROLE | MEDIATING APPARATUS ID |
|----|------------|----------|------|------------------------|
| 1 | ownerA | 0101 | Device Administrator | gatewayA, gatewayB |
| 2 | ownerB | 0202 | Engineer | gatewayC |
| ⋮ | ⋮ | ⋮ | ⋮ | ⋮ |

| No | ACCOUNT ID | PASSWORD | LOCATION ID |
|----|------------|----------|-------------|
| 1  | ownerA     | 0101     | locationA   |
| 2  | ownerB     | 0202     | locationB   |
| ⋮  | ⋮          | ⋮        | ⋮           |

MANAGEMENT SYSTEM, REMOTE DEVICE MANAGEMENT SYSTEM, DISPLAY CONTROL METHOD, AND RECORDING MEDIUM

CROSS-REFERENCE TO RELATED APPLICATION

This patent application is based on and claims priority pursuant to 35 U.S.C. § 119(a) to Japanese Patent Application No. 2018-223057, filed on Nov. 29, 2018, in the Japan Patent Office, the entire disclosure of which is hereby incorporated by reference herein.

BACKGROUND

Technical Field

The present disclosure relates to a management system, a remote device management system, a display control method, and a recording medium.

Background Art

A remote device management system can remotely manage devices present in a local network such as a local area network (LAN) from outside the local network. The remote device management system, for example, includes a mediating apparatus capable of acquiring device information from the device in the local network. A management server located outside the local network implements remote management of devices by communicating with the mediating apparatus through a firewall.

SUMMARY

Embodiments of the present disclosure describe a management system, a remote device management system, and a display control method. The management system acquires positioning information indicating a location of a mediating apparatus, stores the acquired positioning information in association with device identification information for identifying a device communicable with the mediating apparatus corresponding to the positioning information, receives device status information indicating status of the device from the mediating apparatus, and displays on a display, a first management image including map information depicting an area including the location corresponding to the positioning information and a device identification image indicating the device status information related to the device corresponding to the device identification information associated with the positioning information at a location indicated by the stored positioning information corresponding to the map information.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 8 is a diagram illustrating an example of a mediating apparatus management table according to the first embodiment of the present disclosure;

FIG. 9 is a diagram illustrating an example of a device management table according to the first embodiment of the present disclosure;

FIG. 10 is a diagram illustrating an example of a location management table according to the first embodiment of the present disclosure;

FIG. 11 is a diagram illustrating an example of an account management table according to the first embodiment of the present disclosure;

FIG. 12 is a diagram illustrating an example of a logical configuration management table according to the first embodiment of the present disclosure;

FIG. 13 is a diagram illustrating an example of a physical configuration management table according to the first embodiment of the present disclosure;

FIG. 14 is a diagram illustrating an example of a remote operation management table according to the first embodiment of the present disclosure;

FIG. 15 is a diagram illustrating an example of a device management table according to the first embodiment of the present disclosure;

FIG. 17A and FIG. 17B are sequence diagrams illustrating examples of a process for establishing a communication session between the remote device management apparatus and the mediating apparatus in the remote device management system according to the first embodiment of the present disclosure;

FIG. 30 is a diagram illustrating an example of data structure of a device control request transmitted from the remote device management apparatus in the remote device management system according to the first embodiment of the present disclosure;

FIG. 31 is a sequence diagram illustrating an example of a device status information acquisition process in the remote device management system according to the first embodiment of the present disclosure;

FIG. 32 is a sequence diagram illustrating an example of a device status notification process from the device to the remote device management apparatus by the remote device management system according to the first embodiment of the present disclosure;

FIG. 35 is a diagram illustrating an example of the device management table according to the second embodiment of the present disclosure;

FIG. 36 is a diagram illustrating an example of the remote operation management table according to the second embodiment of the present disclosure;

FIG. 40 is a diagram illustrating an example of the account management table according to the third embodiment of the present disclosure;

FIG. 43 is a diagram illustrating an example of the account management table according to the fourth embodiment of the present disclosure;

Figure 1:
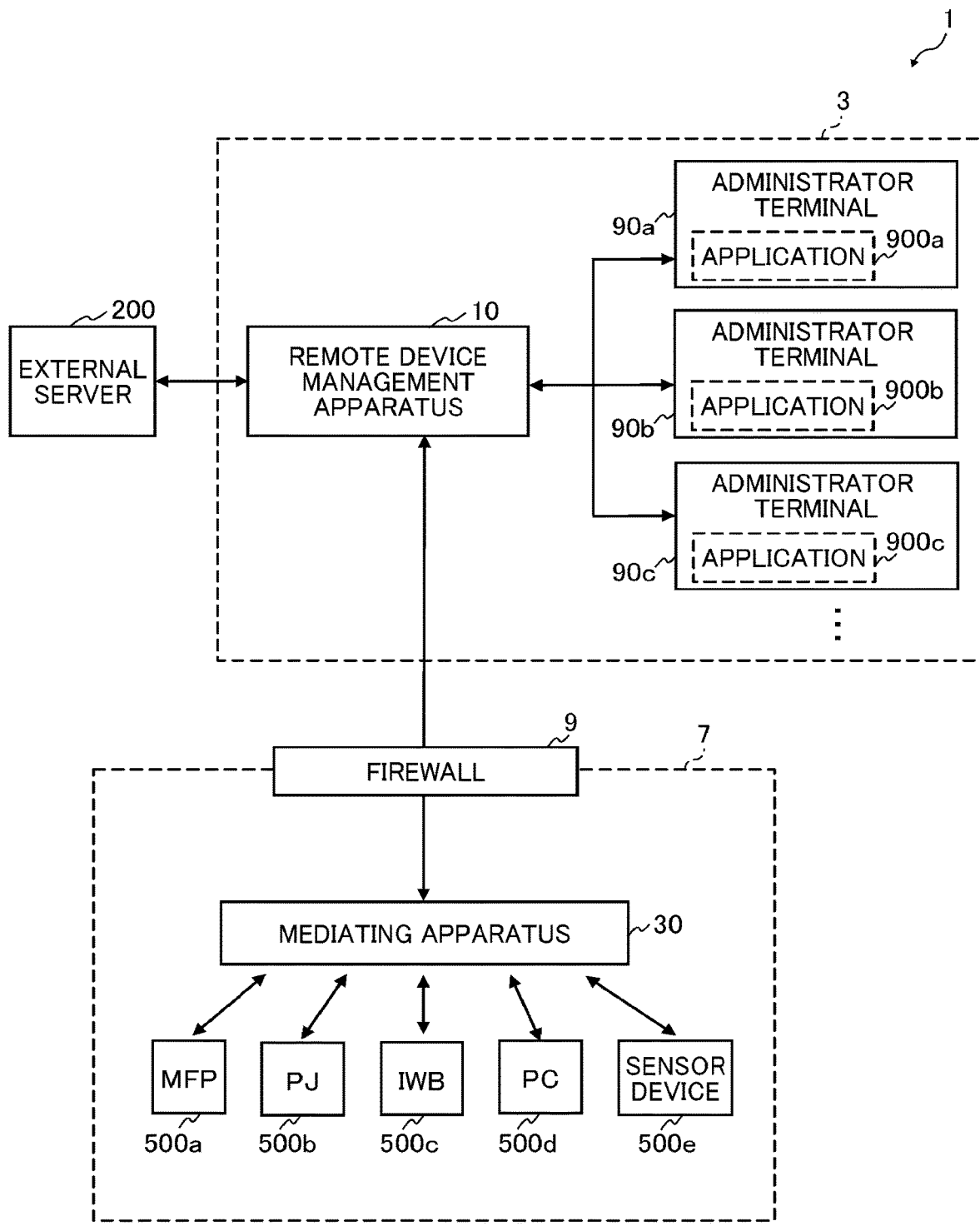
FIG. 1 is a diagram illustrating an example of a system configuration of a remote device management system according to a first embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Hereinafter, embodiments of the present disclosure are described with reference to the drawings. In the description of the drawings, the same elements are denoted by the same reference numbers, and redundant description is omitted.

System Configuration

FIG. 1 is a diagram illustrating an example of a system configuration of a remote device management system according to a first embodiment. The remote device management system 1 includes a management system 3, a local network 7, a firewall 9 and an external server 200. The local network 7 is connected to the management system 3 through the internet. The local network 7 and the management system 3 communicate through the firewall 9.

The local network 7 is a communication network formed in a network environment such as an office, a conference room, a warehouse, a factory or a production line. The local network 7 is, for example, an internal local area network (LAN) not connected to the internet. The local network 7 includes a mediating apparatus 30, a multifunction peripheral (MFP) 500a, a projector (PJ) 500b, an interactive whiteboard (IWB: electronic whiteboard capable of mutual communication) 500c, a personal computer (PC) 500d, and a sensor device 500e (for example, electronic balance, barometer, accelerometer, ammeter, thermometer, photometer, human sensor, camera, illuminance meter communicably connected to the outside). The MFP 500a, the PJ 500b, the IWB 500c, the PC 500d, and the sensor device 500e are management target devices to be managed by the management system 3. The device 500 used in the following description is a generic name for these devices.

The firewall 9 functions to allow only certain packets of information from the management system 3 through the internet into the local network 7. The firewall 9 blocks unintended or unauthorized access to the local network 7. In addition, the firewall 9 transfers a packet from the mediating apparatus 30 to the management system 3.

The management system 3 is a system for managing the mediating apparatus 30 and the device 500 in the local network 7. The management system 3 includes the remote device management apparatus 10 and a plurality of administrator terminals 90 (90a, 90b, 90c, hereinafter collectively referred to as an administrator terminal 90 when it is not necessary to distinguish among them).

The remote device management apparatus 10 is a server for managing information related to the mediating apparatus 30 and the device 500 in a plurality of local networks 7. The remote device management apparatus 10 is connected to the mediating apparatus 30 through the firewall 9, and remotely manages the device 500 in the local network 7 through the mediating apparatus 30. As an example of management, the remote device management apparatus 10 can acquire information related to a status such as the amount of toner remaining in a printer and the number of printed sheets from the MFP 500a. Also, the remote device management apparatus 10 can issue an instruction to execute printing of document data stored in the MFP 500a. In addition, the remote device management apparatus 10 controls the power for the PJ 500b, the IWB 500c, and the PC 500d. Furthermore, the remote device management apparatus 10 can obtain information acquired by the sensor device 500e from the sensor device 500e. The remote device management apparatus 10 may be configured by a single server or as a plurality of servers.

The administrator terminal 90 is a terminal such as a laptop PC used by an administrator of the remote device management system 1 such as a person in charge of installing the mediating apparatus 30 or a person in charge of maintenance of the device 500. The administrator terminal 90 provides the administrator of the remote device management system 1 with the information related to the device 500 by displaying the device status information related to the device 500 managed by the remote device management apparatus 10. Also, the plurality of administrator terminals 90 can access the remote device management apparatus 10 from different locations. The administrator terminal 90a operates application 900a, the administrator terminal 90b operates application 900b, and the administrator terminal 90c operates application 900c (hereinafter collectively referred to as application 900 when the applications 900a to 900c are not distinguished from each other). The remote device management apparatus 10 can manage applications to be provided to each administrator terminal 90 according to, for example, usage environment of the local network 7 and type of the device 500. The administrator terminal 90 may be, for example, a terminal equipped with a web browser such as a tablet, a mobile phone, a smartphone, a wearable terminal, or a desktop PC. Further, the administrator terminal 90 may be configured to be able to directly communicate with the mediating apparatus 30 in the local network 7. For example, installation of the mediating apparatus 30 may be performed smoothly when the administrator terminal 90 used by the person in charge of the installation directly communicates with the mediating apparatus 30 in the local network 7.

The mediating apparatus 30 is an apparatus that mediates communication between the remote device management apparatus 10 and the device 500 in the local network 7. The mediating apparatus 30 maintains a session at all times to transmit messages from the remote device management apparatus 10 to the local network 7 across the firewall 9 and implements bidirectional communication between the remote device management apparatus 10 and the management (monitor) target device 500 while ensuring security in the local network 7. The mediating apparatus 30 can communicate with the device 500 and the firewall 9 through a wired or wireless LAN or the like. The mediating apparatus 30 accesses the device 500 in response to an instruction from the remote device management apparatus 10, send alerts from the device 500 to the remote device management apparatus 10, or execute information acquisition and life-and-death monitoring (for example, whether the device 500 can communicate or not) of the device 500 based on a preset schedule. The mediating apparatus 30 may be a box-type communication device functioning as a single unit, or may be incorporated in an apparatus such as the MFP 500a.

Also, the mediating apparatus 30 can communicate with the remote device management apparatus 10 on the internet through the firewall 9. The mediating apparatus 30 is located in the local network 7 interfaced with the firewall 9 and the remote device management apparatus 10 included in the management system 3 is located outside the local network 7 with the firewall 9 as an interface.

The device 500 (MFP 500a, PJ 500b, IWB 500c, PC 500d and sensor device 500e) is located in the local network 7 with the firewall 9 as an interface. The device 500 is the management target device that is subjected to maintenance, counter reading, and the like by the management system 3. Further, the device 500 may attach a device having a network function to a terminal not having a network function such as a human sensor.

The external server 200 is a device that provides an external service or application to the management system 3. The external server 200, for example, provides map information available from an external service or application to the management system 3 using web application programming interface (web API).

The management system 3 may be configured to execute the functions of the remote device management apparatus 10 and the administrator terminal 90 in one apparatus. Although FIG. 1 illustrates an example in which the management system 3 remotely manages a plurality of devices 500 located in one local network 7, the management system 3 may be configured to remotely manage the devices 500 located in each of a plurality of local networks 7. In addition, although FIG. 1 illustrates an example in which one mediating apparatus 30 is located in one local network 7, two or more mediating apparatuses 30 may be located in one local network. In this case, the mediating apparatuses 30 may share functions.

Overview

Figure 2:
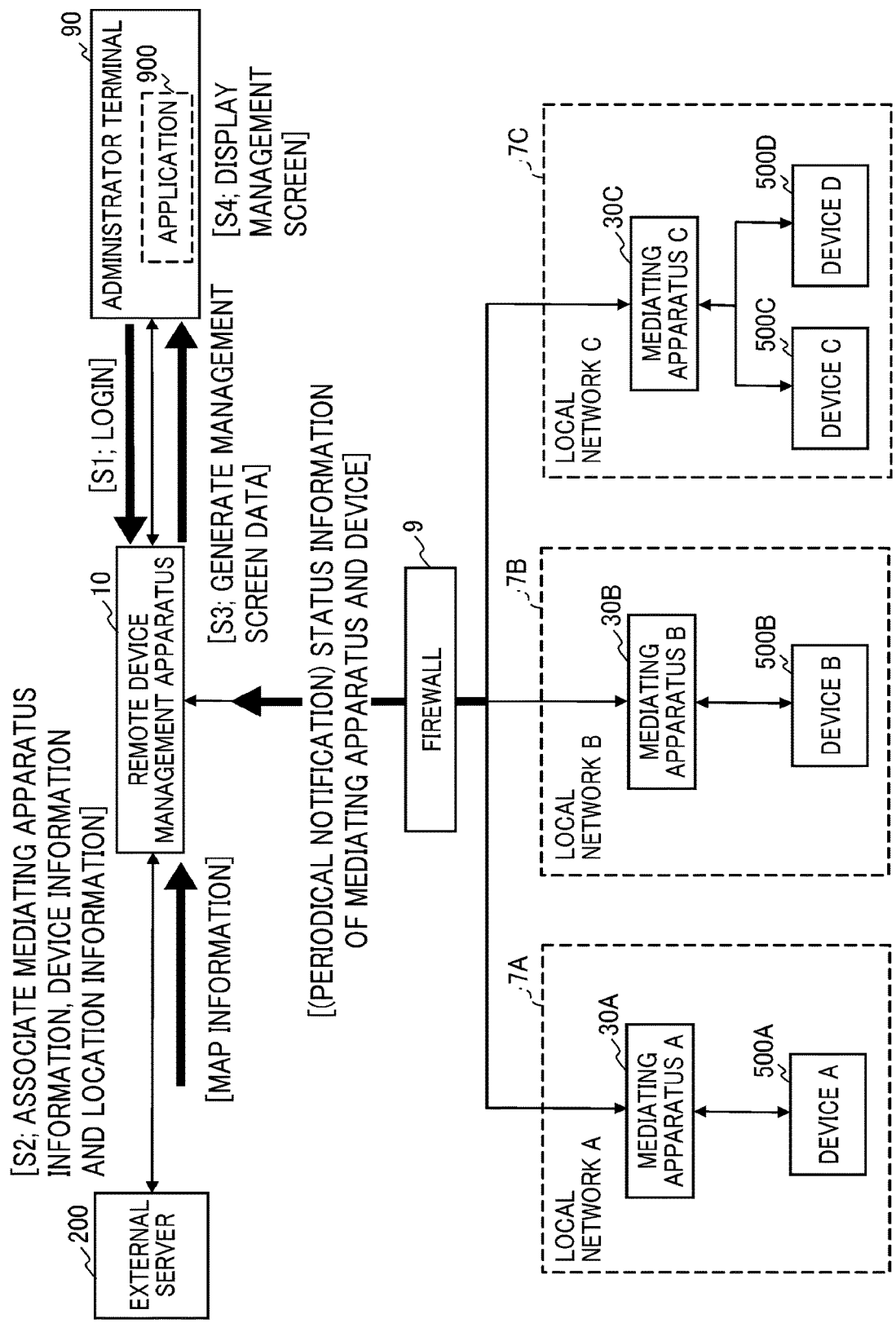
FIG. 2 is a diagram illustrating an example of an overview of the remote device management system in operation according to the first embodiment of the present disclosure.

Hereinafter, an overview of configuration of the remote device management system according to the first embodiment of the present disclosure is described. FIG. 2 schematically illustrates an overview of the remote device management system in operation according to the first embodiment. Details of the functions and the like implemented by the remote device management system 1 are described below with reference to the drawings, etc.

FIG. 2 is a diagram illustrating an example of the overview of the remote device management system in operation according to the first embodiment of the present disclosure. The remote device management system 1 illustrated in FIG. 2 is a system that allows a system administrator to intuitively grasp the status and location of the device 500 to be managed. In the remote device management system 1 illustrated in FIG. 2, a plurality of local networks 7 (7A, 7B, 7C) are constructed at different locations. These local networks 7 include the mediating apparatuses 30 (30A, 30B, 30C) that communicate with the remote device management apparatus 10 through the firewall 9, and the management target devices 500 (500A, 500B, 500C, 500D) communicably connected to the mediating apparatus 30.

The remote device management apparatus 10 periodically receives apparatus status information indicating the status of the mediating apparatus 30 or device status information indicating the status of the device 500 from the mediating apparatuses 30 provided in each local network 7. The remote device management apparatus 10 can acquire apparatus status information and device status information by maintaining a bidirectional communication session such as Web Socket communication or polling with each mediating apparatus 30.

In step S1, the system administrator logs in to the application 900 installed on the administrator terminal 90 using the administrator terminal 90. In step S2, in order to generate a management screen to be displayed on the administrator terminal 90, the remote device management apparatus 10 associates pre-stored mediating apparatus information on the mediating apparatus 30, device information on the device 500, and location information indicating the location of the mediating apparatus 30. In addition, the remote device management apparatus 10 acquires the map information including a location corresponding to the place where each local network 7 is constructed from the external server 200.

In step S3, the remote device management apparatus 10 generates the management screen to be displayed on the administrator terminal 90 using the information associated in step S2 and the acquired map information. The management screen is a display screen for presenting the status of the mediating apparatus 30 or the device 500 monitored (managed) by the remote device management apparatus 10 to the administrator who uses the administrator terminal 90. The remote device management apparatus 10 generates as a management screen, a physical configuration screen 910b including a device identification image 930 indicating device status information related to the device 500 connected to the mediating apparatus 30 at the location on the map information corresponding to where the mediating apparatus 30 is installed (illustrated in FIG. 27 described below). In step S4, the administrator terminal 90 displays the management screen generated by the remote device management apparatus 10. Thereby, the administrator who uses the administrator terminal 90 can intuitively grasp the status and location of the management target device 500 on a single screen.

In a conventional remote device management system, device status information is displayed on the administrator terminal 90 used by the administrator to inform the status of device to be managed, but it was not possible to intuitively grasp where the managed device was installed. Further, in order to identify the location of the device to be managed, the remote device management apparatus 10 needs to access a console screen for identifying the device 500 and perform a Secure Shell (SSH) connection with the device 500, resulting in a time-consuming task for the administrator.

The remote device management system according to the first embodiment displays the location of the mediating apparatus 30 that communicates with the device 500 on the map together with the device status information indicating the status of the device 500 to be managed, for the administrator to intuitively grasp the status and location of the device 500 to be managed. In addition, when a malfunction of the managed mediating apparatus 30 or the device 500 is identified on the management screen displayed on the administrator terminal 90, the administrator can handle an issue immediately from the information displayed on the management screen. As a result, physical movement and maintenance work become unnecessary and work efficiency can be improved.

Hardware Configuration

The hardware configuration of each device according to the first embodiment is described. Each device included in the remote device management system 1 has a general computer configuration. Here, a hardware configuration example of a general computer is described.

Figure 3:
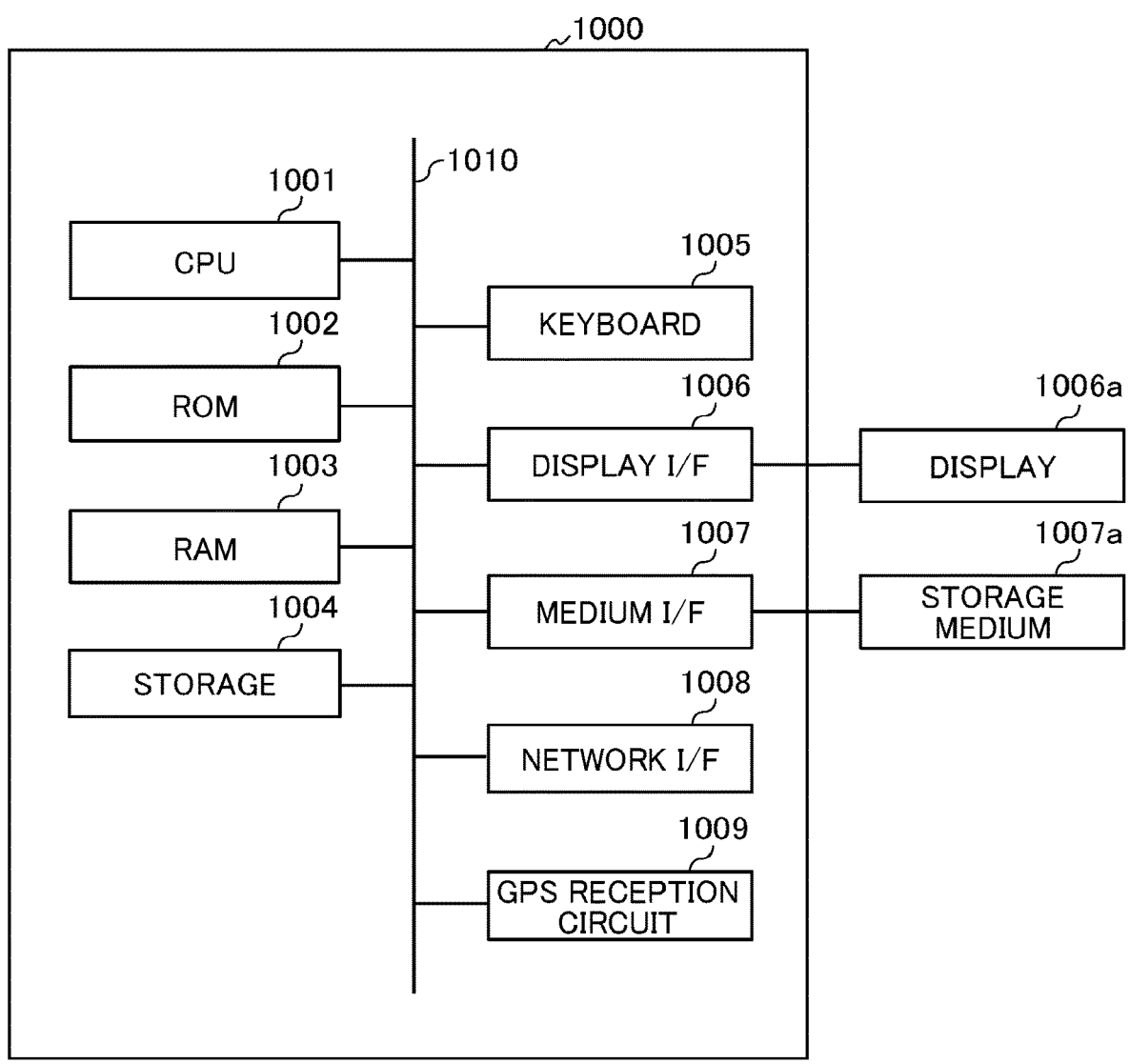
FIG. 3 is a block diagram illustrating an example of a hardware configuration of a computer according to the first embodiment of the present disclosure.

FIG. 3 is a block diagram illustrating an example hardware configuration of a computer according to the first embodiment of the present disclosure. The hardware configuration of the computer 1000 illustrated in FIG. 3 may have the same configuration in each embodiment, and components may be added or deleted as necessary. The computer 1000 includes a central processing unit (CPU) 1001, a read only memory (ROM) 1002, a random access memory (RAM) 1003, a storage 1004, a keyboard 1005, a display interface (I/F) 1006, a medium I/F 1007, a network I/F 1008, a Global Positioning System (GPS) reception circuit 1009, a bus 1010, and the like.

The CPU 1001 is an arithmetic device that implements each function of the computer 1000 by reading programs and data stored in the ROM 1002, the storage 1004, and the like on the RAM 1003 and executing processing. For example, the remote device management apparatus 10 and the administrator terminal 90 implement the display control method according to the embodiments of the present disclosure by causing the CPU 1001 to execute the application program installed in each apparatus.

The ROM 1002 is a non-volatile memory that can hold programs and data even after the power is turned off. The ROM 1002 includes, for example, a flash ROM or the like. A software development kit (SDK) corresponding to various uses is installed in the ROM 1002, and the application of the SDK can be used to implement the functions of the computer 1000, network connection, and the like.

A RAM 1003 is a volatile memory used as a work area or the like of the CPU 1001. The storage 1004 is, for example, a storage device such as a hard disk drive (HDD) or a solid state drive (SSD). The storage 1004 stores, for example, an operating system (OS), an application program, various data, and the like.

The keyboard 1005 is a type of input device provided with a plurality of keys for inputting characters, numerical values, various instructions, and the like. The input device may be, for example, a mouse, a touch panel or a voice input device as well as the keyboard 1005. The display I/F 1006 controls display of various information such as a cursor, a menu, a window, characters, or an image on the display 1006a such as a liquid crystal display (LCD). The display 1006a may be a touch panel display provided with input device.

The medium I/F 1007 controls reading or writing (storage) of data to a storage medium 1007a such as a universal serial bus (USB) memory, a memory card, an optical disk, or a flash memory.

The network I/F 1008 is an interface for connecting the computer 1000 to a network and transmitting and receiving data to and from another computer, an electronic device, or the like. The network I/F 1008 is, for example, a communication interface such as a wired or wireless LAN. The network I/F 1008 includes 3rd Generation (3G), long term evolution (LTE), 4th Generation (4G), 5th Generation (5G), Zigbee (registered trademark), EnOcean, Bluetooth (registered trademark) Low Energy (BLE), Near Field Communication (NFC), millimeter wave wireless communication, infrared communication, Quick Response (QR) code (registered trademark), visible light, communication interface such as environmental sound or ultrasonic.

The GPS reception circuit 1009 receives a GPS signal including positioning information (latitude, longitude, and altitude) of a device or a terminal from a GPS satellite or an indoor GPS such as Indoor MEssaging System (IMES).

The bus 1010 is commonly connected to the above-described components, and transmits an address signal, a data signal, various control signals, and the like. The CPU 1001, ROM 1002, RAM 1003, storage 1004, keyboard 1005, display I/F 1006, medium I/F 1007, network I/F 1008, and GPS reception circuit 1009 are connected to each other through the bus 1010.

In the hardware configuration of each device according to the first embodiment, components may be added or deleted as necessary. For example, the remote device management apparatus 10 may be configured without an input device such as the keyboard 1005 and the display 1006a. Further, the device 500 may be configured to include a module or the like for providing a function or service according to the type of each device.

Functional Configuration

Figure 4:
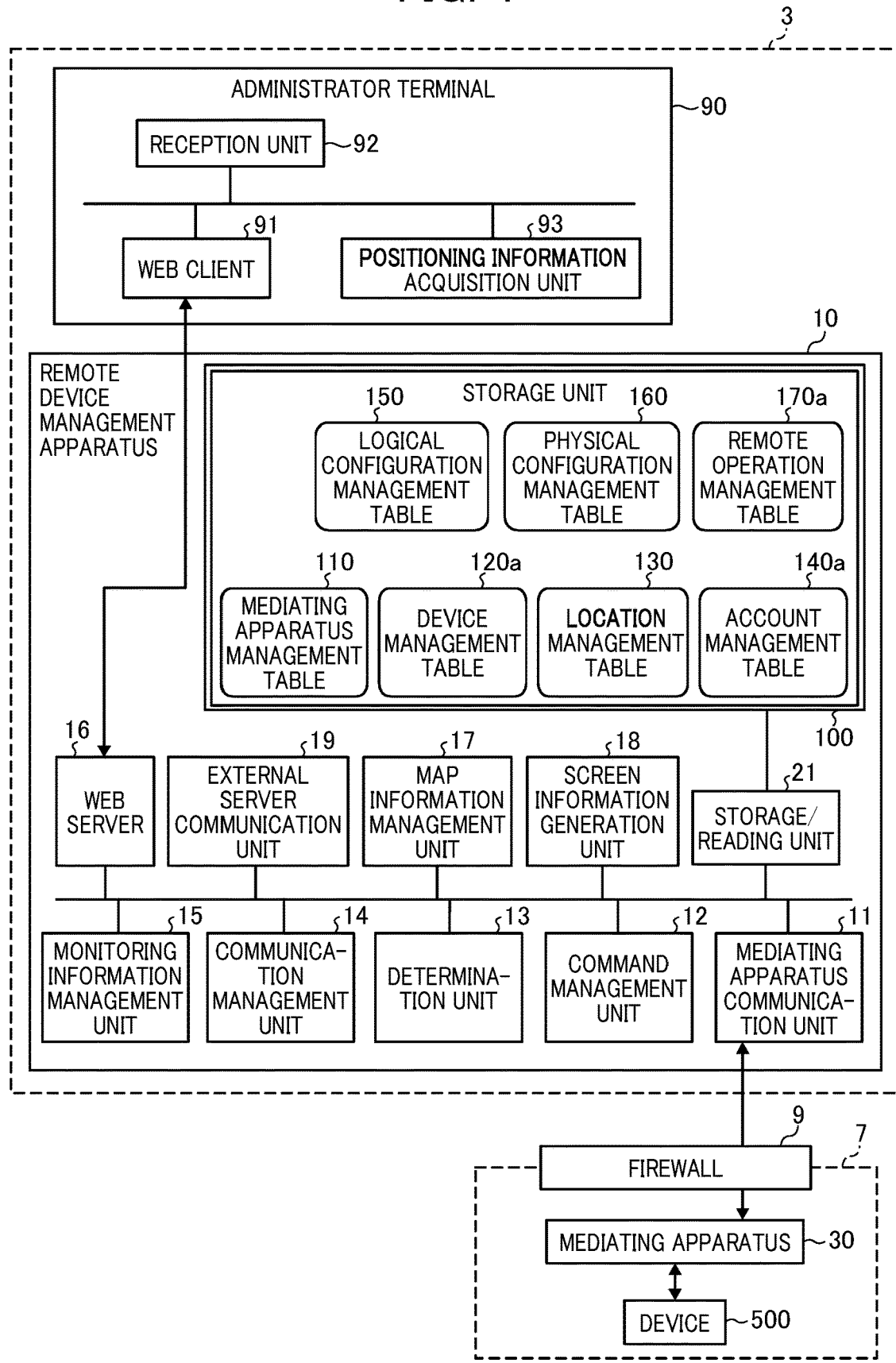
FIG. 4 is a block diagram illustrating an example of a functional configuration of a management system according to the first embodiment of the present disclosure.

Hereinafter, a functional configuration of the remote device management system according to the first embodiment is described. The functional configuration of the remote device management apparatus 10 and the administrator terminal 90 included in the management system 3 is described below with reference to FIG. 4. FIG. 4 is a block diagram illustrating an example of the functional configuration of the management system according to the first embodiment of the present disclosure. The functions implemented by the remote device management apparatus 10 illustrated in FIG. 4 are a mediating apparatus communication unit 11, a command management unit 12, a determination unit 13, a communication management unit 14, a monitoring information management unit 15, a web server 16, a map information management unit 17, a screen information generation unit 18, external server communication unit 19, storage/reading unit 21, and a storage unit 100.

The mediating apparatus communication unit 11 exchanges various data (information) with the mediating apparatus 30. The mediating apparatus communication unit 11 controls communication with the mediating apparatus 30 located inside the local network 7 through the firewall 9. The mediating apparatus communication unit 11 maintains a communication session (such as Web Socket) so that the mediating apparatus 30 can always communicate (connect) with the remote device management apparatus 10 and performs various types of data interaction with the mediating apparatus 30. The mediating apparatus communication unit 11 receives polling to the remote device management apparatus 10 transmitted from the mediating apparatus 30 and transmits a response to the polling to the mediating apparatus 30. Either method may be used in the present embodiment.

The mediating apparatus communication unit 11 transmits, for example, a command issued by the web server 16 to the mediating apparatus 30. The command transmitted from the mediating apparatus communication unit 11 is an example of request information indicating a request for the mediating apparatus 30 or the device 500, for example. When a communication session (such as Web Socket) that can always communicate (connect) between the remote device management apparatus 10 and the mediating apparatus 30 is not established, the remote device management apparatus 10 manages the transmission status of the command issued by the web server 16 with a status such as "not transmitted" or "transmission completed". Further, the mediating apparatus communication unit 11 receives from the mediating apparatus 30, a response to the command transmitted to the mediating apparatus 30 or device status information indicating the status of the device 500 voluntarily transmitted from the device 500. The received information is transmitted to the web server 16 and displayed on the administrator terminal 90 using a web client. The mediating apparatus communication unit 11 is implemented, for example, by the network I/F 1008 and the program executed by the CPU 1001 illustrated in FIG. 3.

The command management unit 12 manages commands issued by the web server 16. The command management unit 12 manages, for example, commands generated by the web server 16 and the execution result of the command by the mediating apparatus 30 or the device 500. The command management unit 12 is implemented by, for example, a program executed by the CPU 1001 illustrated in FIG. 3.

The determination unit 13 determines the status of the mediating apparatus 30 and the device 500 based on information transmitted from the mediating apparatus 30 and the management (monitoring) target device 500. The determination unit 13 is implemented by, for example, a program executed by the CPU 1001 illustrated in FIG. 3.

The communication management unit 14 manages communication with the mediating apparatus 30 and the device 500 in the local network 7. The communication management unit 14 manages information on communication protocols that can be used in the remote device management system 1, for example. Further, the communication management unit 14 manages communication parameter information defined in each communication protocol. The communication management unit 14 is implemented by, for example, a program executed by the CPU 1001 illustrated in FIG. 3.

The monitoring information management unit 15 manages mediating apparatus information related to the mediating apparatus 30 and device information related to the device 500. The monitoring information management unit 15 manages, for example, a task schedule for transmitting a status information acquisition request to the mediating apparatus 30 or the device 500. In addition, the monitoring information management unit 15 manages the status of the device 500 based on device status information indicating the status of the device 500 transmitted from the device 500, for example. The monitoring information management unit 15 is implemented by, for example, a program executed by the CPU 1001 illustrated in FIG. 3.

The web server 16 is a server for web application. The web server 16 receives a request from the web client 91 by a web application programming interface (web API) using a communication protocol such as HyperText Transport Protocol Secure (HTTPS), performs processing according to the request, and respond to the web client 91. The communication protocol may include File Transfer Protocol (FTP), HTTP, and Simple Network Management Protocol (SNMP). Further, when the remote device management apparatus 10 requires communication with the mediating apparatus 30 or the device 500, the web server 16 issues (generates) a command to be transmitted to the mediating apparatus 30 or the device 500. The issued command is a control command such as acquisition of device status information indicating the status of the device 500 or power on or power off. These commands are examples of request information indicating a request for the mediating apparatus 30 and the device 500. The web server 16 may have a function such as WebSocket to display the command result received by the mediating apparatus communication unit 11 on the screen of the web client 91 in real time. The web server 16 is implemented by, for example, the network I/F 1008 and a program executed by the CPU 1001 illustrated in FIG. 3.

The map information management unit 17 manages the map information received by the external server communication unit 19. The map information management unit 17 is implemented by, for example, a program executed by the CPU 1001 illustrated in FIG. 3.

The screen information generation unit 18 generates the management screen to be displayed on the administrator terminal 90. The management screen is a display screen for presenting the status of the mediating apparatus 30 or the device 500 monitored (managed) by the remote device management apparatus 10 to the administrator who uses the administrator terminal 90. The screen information generation unit 18 generates the management screens such as the logical configuration screen 710 and physical configuration screens 910a and 910b based on, for example, mediating apparatus information and device information managed by the monitoring information management unit 15. The screen information generation unit 18 is implemented by, for example, a program executed by the CPU 1001 illustrated in FIG. 3.

The external server communication unit 19 exchanges various data (information) with the external server 200. The external server communication unit 19 receives from the external server 200, the map information available from the external service or application provided by the external server 200. The external server communication unit 19 is implemented by, for example, the network I/F 1008 and a program executed by the CPU 1001 illustrated in FIG. 3.

The storage/reading unit 21 stores various data in the storage unit 100 and reads the various data from the storage unit 100. The storage/reading unit 21 and the storage unit 100 are implemented by, for example, a program executed by the CPU 1001 illustrated in FIG. 3. The storage unit 100 is implemented by the ROM 1002 or the storage 1004 illustrated in FIG. 3. Further, the storage unit 100 stores a mediating apparatus management table 110, a device management table 120a, a location management table 130, an account management table 140a, a logical configuration management table 150, a physical configuration management table 160, and a remote operation management table 170a. Details of the mediating apparatus management table 110, the device management table 120a, the location management table 130, the account management table, the logical configuration management table 150, the physical configuration management table 160, and the remote operation management table 170a are described below.

Hereinafter, a functional configuration of the administrator terminal 90 is described. The functions implemented by the administrator terminal 90 illustrated in FIG. 4 include a web client 91, a reception unit 92, and a positioning information acquisition unit 93.

The web client 91 is a client unit of the web application. The web client 91 is implemented by executing a program described in a language such as HyperText Markup Language (HTML), JavaScript (registered trademark), or Cascading Style Sheets (CSS) operating in the web browser. The web client 91 displays on the display 1006a on the administrator terminal 90, for example, a logical configuration screen 710 (illustrated in FIGS. 22 to 24), a physical configuration screen 910a, 910b (illustrated in FIGS. 26 to 27), or a device status display screen 950 described below. The web client 91 is implemented by, for example, the network OF 1008 and a program executed by the CPU 1001 illustrated in FIG. 3.

The reception unit 92 receives input by a user to the input device such as the keyboard 1005 illustrated in FIG. 3. The reception unit 92 receives, for example, a selection of various items illustrated on the display screen displayed on the display 1006a by the web client 91. The reception unit 92 is implemented by, for example, the keyboard 1005 and a program executed by the CPU 1001 illustrated in FIG. 3.

The positioning information acquisition unit 93 acquires the positioning information related to the administrator terminal 90. The positioning information acquisition unit 93 acquires the positioning information including latitude and longitude information indicating the location of the administrator terminal 90 using, for example, the GPS reception circuit 1009. The positioning information acquisition unit 93 is implemented by, for example, the GPS reception circuit 1009 and a program executed by the CPU 1001 illustrated in FIG. 3.

Figure 5:
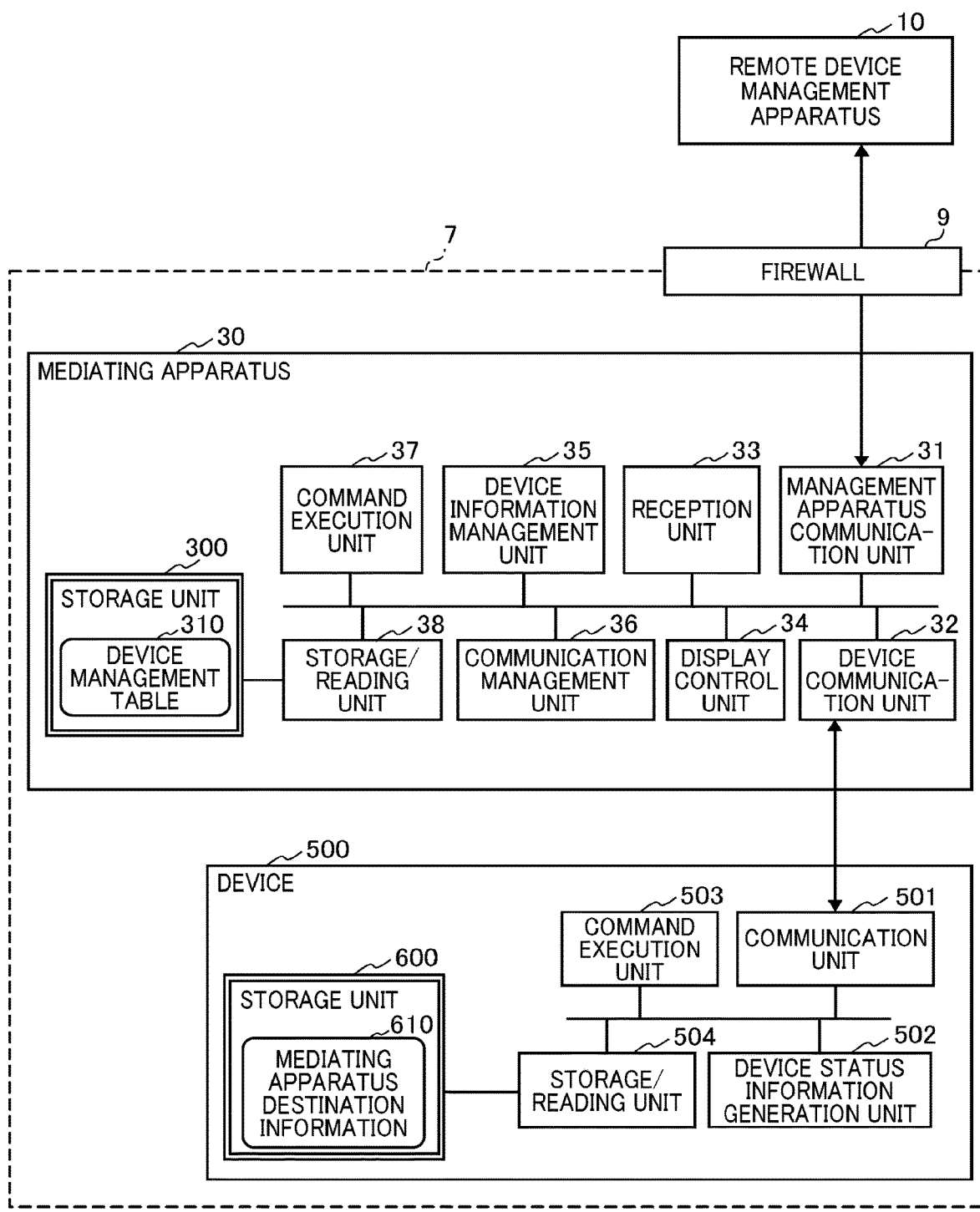
FIG. 5 is a block diagram illustrating an example of a functional configuration of a mediating apparatus and devices according to the first embodiment of the present disclosure.

A functional configuration of respective devices included in the local network 7 is described with reference to FIG. 5. FIG. 5 is a block diagram illustrating an example of the functional configuration of the mediating apparatus and the device according to the first embodiment of the present disclosure. The functions implemented by the mediating apparatus 30 illustrated in FIG. 5 includes a management apparatus communication unit 31, a device communication unit 32, a reception unit 33, a display control unit 34, a device information management unit 35, a communication management unit 36, a command execution unit 37, a storage/reading unit 38, and a storage unit 300.

The management apparatus communication unit 31 exchanges various data (information) with the remote device management apparatus 10. The management apparatus communication unit 31 receives, for example, a command transmitted from the remote device management apparatus 10 that requests the device 500 to execute a process. In addition, the management apparatus communication unit 31 transmits, for example, a response (execution result of the process) to the command transmitted from the remote device management apparatus 10 to the remote device management apparatus 10. Furthermore, the management apparatus communication unit 31 transmits the apparatus status information indicating the status of the mediating apparatus 30 or the device status information indicating the status of the device 500 to the remote device management apparatus 10. The management apparatus communication unit 31 is implemented by, for example, the network I/F 1008 and a program executed by the CPU 1001 illustrated in FIG. 3.

The device communication unit 32 exchanges various data (information) with the device 500. The device communication unit 32 communicates with the device 500 using communication definitions such as operation types, communication protocols, and parameters managed by the communication management unit 36. The device communication unit 32 transmits, for example, the command received by the management apparatus communication unit 31 to the device 500. Further, the device communication unit 32 receives, for example, a response to the command transmitted from the device 500. The device communication unit 32 is implemented by, for example, the network I/F 1008 and a program executed by the CPU 1001 illustrated in FIG. 3.

The reception unit 33 receives input by a user to the input device such as the keyboard 1005 illustrated in FIG. 3. The reception unit 33 is implemented by, for example, the keyboard 1005 and a program executed by the CPU 1001 illustrated in FIG. 3.

The display control unit 34 causes the display 1006a illustrated in FIG. 3 to display various screen information. The display control unit 34 causes the display 1006a to display, for example, an operation screen for receiving an input by the user. The display screen displayed by the display control unit 34 is, for example, a user interface (UI) for performing settings necessary for installing the mediating apparatus 30 on the local network 7. The mediating apparatus 30 uses the UI displayed by the display control unit 34 to set Internet Protocol (IP) address for communication with the remote device management apparatus 10, parameters such as subnet mask or default gateway, Uniform Resource Locator (URL) of the remote device management apparatus 10, proxy server (authentication server), and the like. In addition, the mediating apparatus 30 confirms connection with the remote device management apparatus 10 and starts communication by using the UI displayed by the display control unit 34. The display control unit 34 is implemented by, for example, a program executed by the CPU 1001 illustrated in FIG. 3.

The device information management unit 35 manages device information related to the device 500 communicably connected to the mediating apparatus 30. For example, the device information management unit 35 manages a task schedule for transmitting the device status information acquisition request to the device 500. In addition, the device information management unit 35 manages the status of the device 500 based on the device status information indicating the status of the device 500 transmitted from the device 500, for example.

Furthermore, the device information management unit 35 manages the resource status of the mediating apparatus 30. The device information management unit 35 detects, for example, a symptom of a failure (malfunction) of the mediating apparatus 30, such as a memory shortage, a storage shortage, or a write error. In addition, the device information management unit 35 generates the apparatus status information indicating the status of the mediating apparatus 30 including the monitoring result of the resource status periodically based on, for example, a preset schedule. The device information management unit 35 is implemented by, for example, a program executed by the CPU 1001 illustrated in FIG. 3.

The communication management unit 36 manages a communication definition for communicating with the device 500 included in the local network 7. For example, the communication management unit 36 sets and manages the communication definition with a device 500 based on the requested settings received by the management apparatus communication unit 31. The communication management unit 36 manages communication definition used for communication with the device 500, such as an operation type, a communication protocol, and a communication parameter. For example, the operation type includes acquisition of an identifier (serial number) of the device 500, acquisition of device status information related to the device 500, confirmation of connection with the remote device management apparatus 10, addition or deletion of the device 500 to be managed (monitored), and the like. The communication protocol includes not only a standard protocol such as HTTP, SNMP or Internet Control Message Protocol (ICMP (Ping)) but also a communication protocol other than the communication protocol incorporated in existing firmware such as ModBus or a unique protocol. The parameter includes a timeout time or retry count as common parameters to each communication protocol, method, resource Uniform Resource Identifier (URI), header, or body as HTTP specific parameters, object identifier (OID), version, command type, or community name as SNMP specific parameters.

The communication management unit 36 manages a communication session with the remote device management apparatus 10 through the firewall 9. The communication management unit 36 monitors whether a constant connection (communication session such as Web Socket) is maintained in order to receive a command transmitted from the remote device management apparatus 10. The communication management unit 36 reconnects the communication session when the constant connection is disconnected. The communication management unit 36 is implemented by, for example, a program executed by the CPU 1001 illustrated in FIG. 3.

The command execution unit 37 executes a command which is an instruction to execute a process to the mediating apparatus 30 issued by the remote device management apparatus 10. The issued command is a control command such as acquisition of apparatus status information indicating the status of the mediating apparatus 30 or power on or power off. The command execution unit 37 is implemented by, for example, a program executed by the CPU 1001 illustrated in FIG. 3.

The storage/reading unit 38 stores various data in the storage unit 300 and reads the various data from the storage unit 300. The storage/reading unit 38 and the storage unit 300 are implemented by, for example, the ROM 1002, the storage 1004, and a program executed by the CPU 1001 illustrated in FIG. 3. The storage unit 300 stores a device management table 310. Details of the device management table 310 are described below.

A functional configuration of the device 500 is described below. The functions implemented by the device 500 illustrated in FIG. 5 include a communication unit 501, a device status information generation unit 502, a command execution unit 503, a storage/reading unit 504, and a storage unit 600.

The communication unit 501 exchanges various data (information) with the mediating apparatus 30. The communication unit 501 communicates with the mediating apparatus 30 using a communication protocol such as HTTP or SNMP. The communication unit 501 may use serial communication. The communication unit 501 is implemented by, for example, the network I/F 1008 and a program executed by the CPU 1001 illustrated in FIG. 3.

The device status information generation unit 502 generates device status information indicating the status of the device 500. The status information generation unit 502 generates device status information to be transmitted to the mediating apparatus 30 in response to a request from the mediating apparatus 30. The device status information is, for example, log information including information indicating the resource status of the device 500 and information on the operating status. The device status information generation unit 502 is implemented by, for example, a program executed by the CPU 1001 illustrated in FIG. 3.

The command execution unit 503 executes a command which is an instruction to execute a process to the device 500 issued by the remote device management apparatus 10. The command is, for example, a control instruction such as acquisition of the device status information indicating the status of the device 500 or on/off of the power. The command execution unit 503 is implemented by, for example, a program executed by the CPU 1001 illustrated in FIG. 3.

The storage/reading unit 504 stores various data in the storage unit 600 and reads the various data from the storage unit 600. The storage/reading unit 504 and the storage unit 600 are implemented by, for example, the ROM 1002, the storage 1004, and a program executed by the CPU 1001 illustrated in FIG. 3. The storage unit 600 stores mediating apparatus destination information 610 indicating the destination of the mediating apparatus 30. The mediating apparatus destination information 610 is, for example, the IP address of the mediating apparatus 30.

Communication Definition

Figure 6:
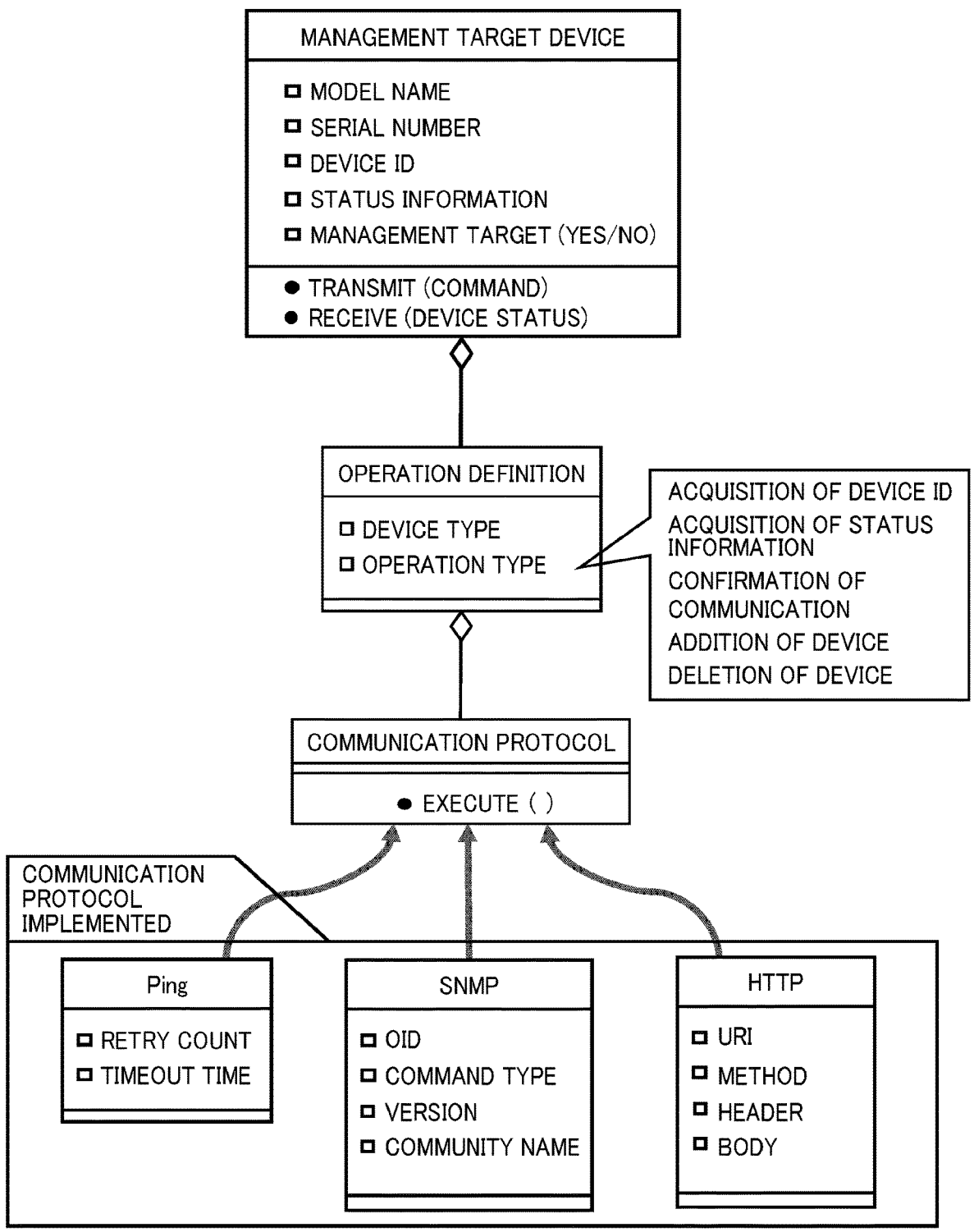
FIG. 6 is a diagram illustrating an example of a schematic model of a communication definition of a device according to the first embodiment of the present disclosure.

A communication definition used for communication with a device 500 is described with reference to FIG. 6 and FIG. 7. FIG. 6 is a diagram illustrating an example of a schematic model of the communication definition of the device according to the first embodiment of the present disclosure. The communication definition illustrated in FIG. 6 is managed by the communication management unit 36 of the mediating apparatus 30 and schematically illustrates the data structure of various types of information communicated with the device 500. The device 500 (management target device) which is a monitoring target (management target) of the remote device management apparatus 10 transmits a model name indicating a type of the device 500, a serial number which is a device identifier (ID) of the device 500, a device ID for identifying the device 500, device status information indicating the status of the device 500, and management target information indicating whether the remote device management apparatus 10 manages the device 500. The remote device management apparatus 10 can identify the device 500 using the model name and the serial number transmitted from the device 500. The device ID includes a model name and a serial number. The device ID is information different from the model name and the serial number, and the device 500 may be identified using the device ID.

The communication definition illustrated in FIG. 6 has a plurality of operation types for each device type as an operation definition. The operation type is, for example, acquisition of the device ID (serial number) of the device 500, acquisition of the device status information, confirmation of communication with the mediating apparatus 30, and addition or deletion of the device 500 to be managed.

Furthermore, each operation type is composed of a plurality of communication protocols. The communication protocols that can be used in the device 500 are standard protocols such as ICMP (Ping), SNMP, or HTTP (body is Java (registered trademark) Script Object Notation (JSON)), and one communication protocol is used for each exchange. That is, the device 500 can be configured to perform multiple times of communication for one operation type.

The parameters include, for example, a timeout time and a retry count as common parameters, and include a method, a resource URI, a header, a body, and the like as HTTP-specific parameters. The SNMP-specific parameters include, for example, OID, version, command type (Get/GetBulk), community name, and the like.

Figure 7:
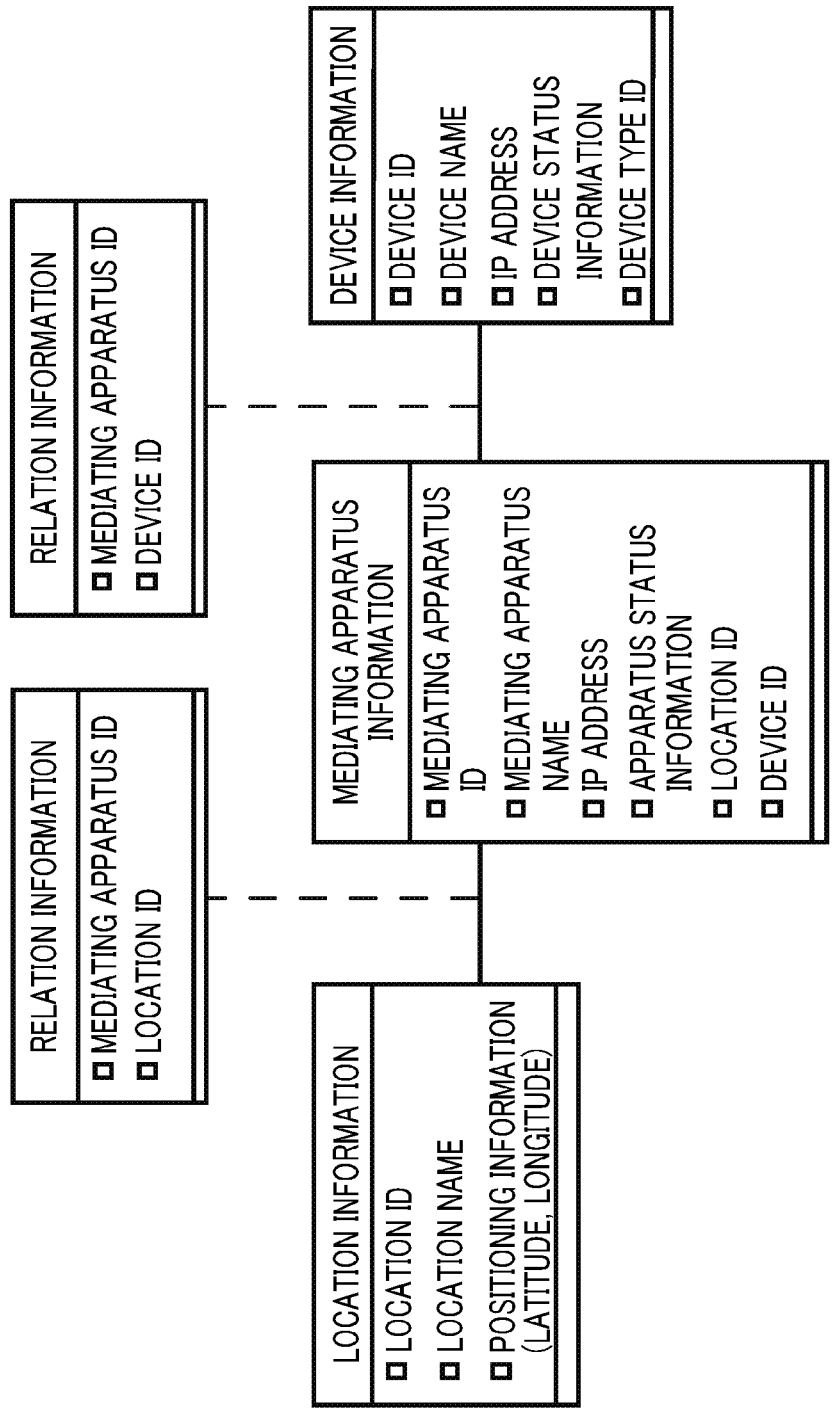
FIG. 7 is a diagram illustrating an example of data structure of an application according to the first embodiment of the present disclosure.

FIG. 7 is a diagram illustrating an example of data structure of an application according to the first embodiment of the present disclosure; FIG. 7 is an entity relation (ER) diagram illustrating data structure of the application 900 provided by the remote device management apparatus 10 and executed on the administrator terminal 90. The application 900 has mediating apparatus information indicating information related to the mediating apparatus 30 registered in the application 900 and communicably connected to the remote device management apparatus 10, device information indicating information related to the device 500 managed by the mediating apparatus 30 communicably connected to the remote device management apparatus 10, and location information including positioning information consisting latitude and longitude information. The application 900 associates the mediating apparatus information and the location information with the mediating apparatus ID and the location ID. Furthermore, the application 900 associates the mediating apparatus information and the device information with the mediating apparatus ID and the device ID. Each piece of information that the application 900 has is stored in the following tables held by the remote device management apparatus 10.

Mediating Apparatus Management Table

FIG. 8 is a diagram illustrating an example of a mediating apparatus management table according to the first embodiment of the present disclosure. The mediating apparatus management table 110 is stored in the storage unit 100 of the remote device management apparatus 10. The mediating apparatus management table 110 stores various information related to the mediating apparatus 30 communicably connected to the remote device management apparatus 10 through the firewall 9.

The mediating apparatus management table 110 stores a mediating apparatus ID, a mediating apparatus name, an IP address that is an example of destination information indicating destination of the mediating apparatus 30, apparatus status information that indicates the status of the mediating apparatus 30, a device ID for identifying a device 500 communicably connected to the mediating apparatus 30 and a location ID for identifying a location where the mediating apparatus 30 is installed, in association with each other. The mediating apparatus information includes mediating apparatus ID, mediating apparatus name, IP address, apparatus status information, device ID, and location ID associated in the mediating apparatus management table 110. Using the mediating apparatus management table 110, the remote device management apparatus 10 can identify the destination information (IP address) of the mediating apparatus 30 and the device 500 communicably connected to the mediating apparatus 30. The mediating apparatus ID and mediating apparatus name are examples of mediating apparatus identification information. The mediating apparatus identification information may include either the mediating apparatus ID or the mediating apparatus name.

Device Management Table

FIG. 9 is a diagram illustrating an example of a device management table according to the first embodiment of the present disclosure. The device management table 120*a* is stored in the storage unit 100 of the remote device management apparatus 10. The device management table 120*a* stores various information on the device 500 to be managed (monitored) by the remote device management apparatus 10.

The device management table 120*a* stores a device ID, a device name, an IP address which is an example of destination information indicating the destination of the device 500, and device status information indicating the status of the device 500 in association with each other. The device ID, the device name, the IP address, and the device status information associated in the device management table 120*a* constitute the device information. The remote device management apparatus 10 can identify the destination information (IP address) of the device 500 using the device management table 120*a*. The device ID and device name are examples of device identification information. The device identification information may include either the device ID or the device name.

Location Management Table

FIG. 10 is a diagram illustrating an example of a location management table according to the first embodiment of the present disclosure. The location management table 130 is stored in the storage unit 100 of the remote device management apparatus 10. The location management table 130 stores location information for identifying a place (location) where the mediating apparatus 30 and the device 500 are installed.

The location management table 130 stores a location ID, a location name, and positioning information for identifying the location in association with each other. The location information includes the location ID, location name, and positioning information associated in the location management table 130. Among the information stored in the location management table 130, the positioning information includes latitude and longitude information for identifying the location of the place identified by the associated location ID or location name. The location identification information may include either a location ID or a location name.

Account Management Table

FIG. 11 is a diagram illustrating an example of an account management table according to the first embodiment of the present disclosure. The account management table 140*a* is stored in the storage unit 100 of the remote device management apparatus 10. The account management table 140*a* stores account information to use the application 900 for an administrator who uses the administrator terminal 90.

The account management table 140*a* stores an account ID and password in association with each other for identifying an account that uses the application 900. The remote device management apparatus 10 performs an authentication process for an administrator who uses the application 900, using the account management table 140*a*. The account ID is an example of administrator identification information. The account ID may be an account name, employee number, or identification number for the social security or tax system. The account ID may be administrator terminal identification information such as an administrator terminal ID for identifying the administrator terminal 90, an administrator terminal name, or a manufacturing number.

Logical Configuration Management Table

FIG. 12 is a diagram illustrating an example of a logical configuration management table according to the first embodiment of the present disclosure. The logical configuration management table 150 is stored in the storage unit 100 of the remote device management apparatus 10. The logical configuration management table 150 stores logical configuration screen data for causing the administrator terminal 90 to display a logical configuration screen 710 described below.

The logical configuration management table 150 stores a screen ID for identifying the logical configuration screen 710, the mediating apparatus ID, the device ID for identifying the device 500 that is communicably connected to the mediating apparatus 30 identified by the mediating apparatus ID, and the location ID for identifying the place where the mediating apparatus 30 identified by the mediating apparatus ID is installed, in association with each other. The screen information generation unit 18 generates logical configuration screen data identified by the logical configuration screen ID stored in the logical configuration management table 150. The administrator terminal 90 displays the logical configuration screen 710 illustrated in FIG. 22 using various information associated with the logical configuration screen ID.

Physical Configuration Management Table

FIG. 13 is a diagram illustrating an example of a physical configuration management table according to the first embodiment of the present disclosure. The physical configuration management table 160 is stored in the storage unit 100 of the remote device management apparatus 10. The physical configuration management table 160 stores physical configuration screen data for causing the administrator terminal 90 to display physical configuration screens 910*a* and 910*b* described below.

The physical configuration management table 160 stores a screen ID for identifying the physical configuration screens 910*a* and 910*b*, a common screen ID for identifying a common screen formed using common physical configuration screen data, a layer indicating the hierarchy of multiple common screens, the device ID for identifying the device 500 that is communicably connected to the mediating apparatus 30 identified by the mediating apparatus ID, the location ID for identifying the place in which the mediating apparatus 30 identified by the mediating apparatus ID is installed, and map information in association with each other. The map information includes, for example, the URL of the external server 200 that provides the map information using web API or the like.

Remote Operation Management Table

FIG. 14 is a diagram illustrating an example of a remote operation management table according to the first embodiment of the present disclosure. The remote operation management table 170 is stored in the storage unit 100 of the remote device management apparatus 10. The remote operation management table 170 stores remote operation information indicating operation details for performing remote operation of the device 500 from the management system 3.

The remote operation management table 170 stores an operation name, an operation ID, operation details, a communication protocol, and a communication parameter in association with each other. The operation details includes the specific controls to be remotely implemented. The communication protocol and communication parameter include information on the communication protocol and communication parameter used for communication with the device 500 when performing the remote operation. The operation name and operation ID are examples of remote operation identification information.

Device Management Table

FIG. 15 is a diagram illustrating an example of a device management table according to the first embodiment of the present disclosure. The device management table 310 is stored in the storage unit 300 of the mediating apparatus 30. The device management table 310 stores various information related to the device 500 that is communicably connected to the mediating apparatus 30.

The device management table 310 stores the device ID, the device name, the IP address which is an example of destination information indicating the destination of the device 500, and the device status information indicating the status of the device 500 in association with each other. The device ID, device name, IP address, and device status information associated in the device management table 310 constitute the device information. The mediating apparatus 30 can identify the destination information (IP address) of the device 500 using the device management table 310. The device ID and device name are examples of device identification information. The device identification information may include either the device ID or the device name.

Figure 16:
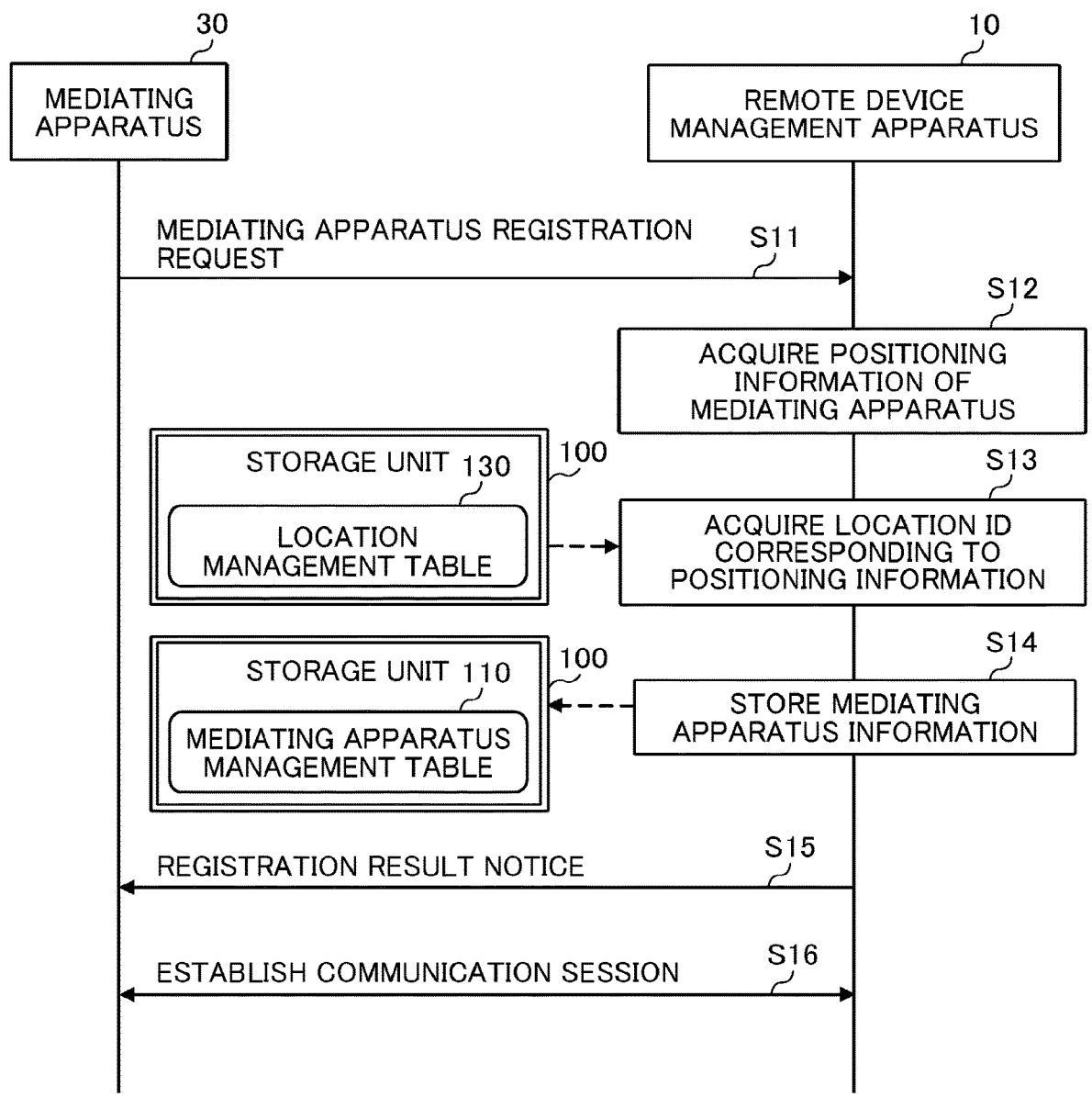
FIG. 16 is a sequence diagram illustrating an example of a registration process of registering the mediating apparatus to the remote device management apparatus according to the first embodiment of the present disclosure.

Establish Communication Session Between Remote Device Management Apparatus and Mediating Apparatus Registration Process of Registering Mediating Apparatus Hereinafter, a process executed by the remote device management system 1 according to the first embodiment is described. A process for establishing and maintaining a communication session between the remote device management apparatus 10 and the mediating apparatus 30 is described with reference to FIGS. 16 to 18. FIG. 16 is a sequence diagram illustrating an example of the registration process of registering the mediating apparatus to the remote device management apparatus according to the first embodiment of the present disclosure.

In step S11, the management apparatus communication unit 31 of the mediating apparatus 30 transmits a mediating apparatus registration request for requesting registration of the newly installed mediating apparatus 30 to the remote device management apparatus 10. The mediating apparatus registration request includes network information set by the communication management unit 36. The network information includes the IP address of the mediating apparatus 30 and the device ID for identifying the device 500 communicably connected to the mediating apparatus 30. As a result, the mediating apparatus communication unit 11 of the remote device management apparatus 10 receives the mediating apparatus registration request transmitted from the mediating apparatus 30.

In step S12, the remote device management apparatus 10 acquires the positioning information related to the mediating apparatus 30 to be registered based on the mediating apparatus registration request received by the mediating apparatus communication unit 11 (an example of an acquisition step). Specifically, the monitoring information management unit 15 of the remote device management apparatus 10 refers to the installation location of the mediating apparatus 30 from contract information related to the mediating apparatus 30 stored in advance in the storage unit 100, and acquires the installation location of the mediating apparatus 30 including latitude and longitude information. The contract information related to the mediating apparatus 30 is information uniquely associated with a contract signed at the time of installation of the mediating apparatus 30 including the location of the mediating apparatus 30 and a contract number. As a result, the management system 3 can eliminate directly inputting the positioning information related to the mediating apparatus 30 and can improve the work efficiency of the person in charge of installing the mediating apparatus 30 (administrator). Further, the contract information related to the mediating apparatus 30 may be stored in another system, and the management system 3 may be configured to acquire the positioning information related to the mediating apparatus 30 in cooperation with another system.

When the positioning information related to the mediating apparatus 30 is included in the mediating apparatus registration request, the monitoring information management unit 15 of the remote device management apparatus 10 uses the positioning information included in the mediating apparatus registration request received by the mediating apparatus communication unit 11. In this case, the management apparatus communication unit 31 of the mediating apparatus 30 transmits to the remote device management apparatus 10 the mediating apparatus registration request including the positioning information received by the reception unit 33 input by the person in charge of installation (administrator).

In step S13, the monitoring information management unit 15 of the remote device management apparatus 10 acquires a location ID corresponding to the positioning information acquired in step S12. Specifically, the monitoring information management unit 15 searches the location management table 130 using the acquired positioning information as a search key, thereby collating whether corresponding positioning information exists. If the corresponding positioning information exists, the monitoring information management unit 15 acquires a location ID associated with the corresponding positioning information. On the other hand, when the corresponding positioning information does not exist, the monitoring information management unit 15 newly generates a location ID and acquires the generated location ID. Then, the monitoring information management unit 15 associates the generated location ID with the acquired positioning information and stores in the location management table 130 as location information.

In step S14, the monitoring information management unit 15 of the remote device management apparatus 10 stores the IP address and device ID included in the mediating apparatus registration request received in step S11 and the mediating apparatus information including the location ID acquired in step S13 in the mediating apparatus management table 110 through the storage/reading unit 21 (an example of a storage control step). The monitoring information management unit 15 issues a mediating apparatus ID for identifying the newly registered mediating apparatus 30.

In step S15, the mediating apparatus communication unit 11 of the remote device management apparatus 10 transmits a registration result notice indicating that the mediating apparatus 30 has been registered by the monitoring information management unit 15 to the mediating apparatus 30. The registration result notice includes the mediating apparatus information registered by the monitoring information management unit 15. Thereby, the management apparatus communication unit 31 of the mediating apparatus 30 receives the registration result notice transmitted from the remote device management apparatus 10.

In step S16, the management apparatus communication unit 31 of the mediating apparatus 30 and the mediating apparatus communication unit 11 of the remote device management apparatus 10 executes a session establishment process to establish a communication session. In this case, the management apparatus communication unit 31 of the mediating apparatus 30 and the mediating apparatus communication unit 11 of the remote device management apparatus 10 establish a communication session such as WebSocket that can always communicate. As a result, the remote device management apparatus 10 can transmit various commands to the device 500 communicably connected to the mediating apparatus 30 through the mediating apparatus 30.

Hereinafter, establishment and maintenance of a communication session between the mediating apparatus 30 and the remote device management apparatus 10 is described with reference to FIGS. 17A-17B and 18. FIG. 17A is a sequence diagram illustrating an example of a process for establishing a communication session between a remote device management apparatus and a mediating apparatus.

In step S21, the management apparatus communication unit 31 of the mediating apparatus 30 transmits a request for establishing a WebSocket session (a communication session capable of constant connection) to the remote device management apparatus 10 in order to establish two-way communication with the remote device management apparatus 10 in response to receiving the registration result notice in step S15 illustrated in FIG. 16. Thereby, the mediating apparatus communication unit 11 of the remote device management apparatus 10 receives a request for establishing a WebSocket session (a communication session capable of constant connection). In step S22, the mediating apparatus communication unit 11 of the remote device management apparatus 10 transmits a session establishment result indicating whether the session is established to the mediating apparatus 30. When the session is established, the mediating apparatus 30 and the remote device management apparatus 10 establish a WebSocket session (a communication session capable of constant connection). If the session establishment fails, the mediating apparatus 30 repeats the process illustrated in FIG. 17A to establish the session again.

FIG. 17B is a sequence diagram illustrating an example of a process for maintaining a communication session established between the remote device management apparatus and the mediating apparatus. In step S26, when the WebSocket session with the remote device management apparatus 10 is established by the process illustrated in FIG. 17A, the management apparatus communication unit 31 of the mediating apparatus 30 periodically transmits WebSocket Ping for session maintenance to the remote device management apparatus 10. In step S27, the mediating apparatus communication unit 11 of the remote device management apparatus 10 transmits a response to the received WebSocket Ping to the mediating apparatus 30. The mediating apparatus 30 executes the process illustrated in FIG. 17A when the response from the remote device management apparatus 10 is not received. Thereby, the mediating apparatus 30 and the remote device management apparatus 10 can maintain the established WebSocket session. Communication from the remote device management apparatus 10 to the mediating apparatus 30 through the firewall 9 is maintained while the WebSocket session is established.

Figure 18:
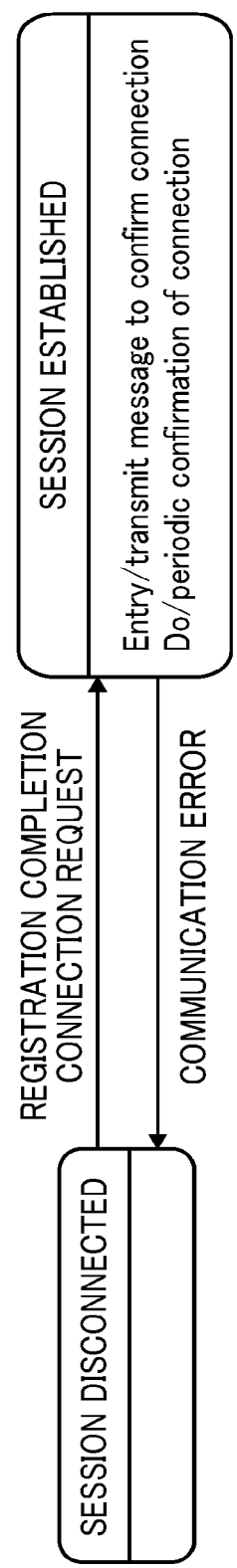
FIG. 18 is a schematic diagram illustrating an example of a status transition of a communication session between the remote device management apparatus and the mediating apparatus in the remote device management system according to the first embodiment of the present disclosure.

FIG. 18 is a schematic diagram illustrating an example of a status transition of a communication session between the remote device management apparatus and the mediating apparatus in the remote device management system according to the first embodiment of the present disclosure. The remote device management apparatus 10 transmits a connection request to the mediating apparatus 30 when the registration of the mediating apparatus 30 is completed. Then, the mediating apparatus 30 establishes a communication session with the remote device management apparatus 10 by transmitting a connection confirmation message to the remote device management apparatus 10. Thereafter, the mediating apparatus 30 periodically confirms communication with the remote device management apparatus 10 and transmits a communication error message to the remote device management apparatus 10 when the communication session is disconnected. Then, when the communication session with the mediating apparatus 30 is disconnected, the remote device management apparatus 10 establishes the communication session with the mediating apparatus 30 again by transmitting a connection request to the mediating apparatus 30 again. In this way, the remote device management apparatus 10 always tries to reconnect to the registered mediating apparatus 30 every time the communication session is disconnected due to a communication error, and always maintains the communication session with the mediating apparatus 30.

Management Screen Display Process

Figure 19:
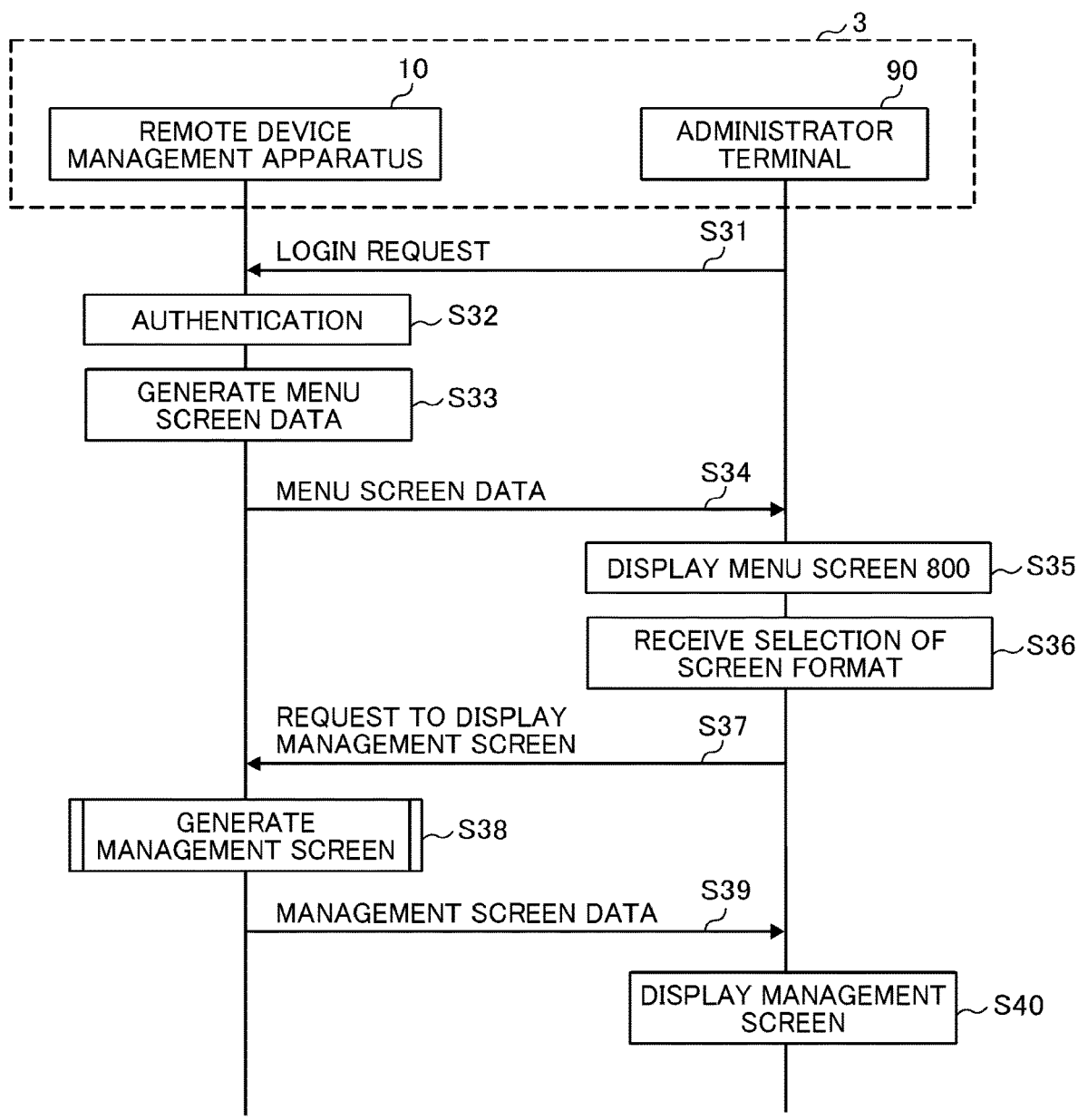
FIG. 19 is a sequence diagram illustrating an example of a management screen display process in the management system according to the first embodiment of the present disclosure.

Hereinafter, a process of displaying a management screen indicating information related to the mediating apparatus 30 and the device 500 on the administrator terminal 90 included in the management system 3 is described with reference to FIGS. 19 to 30. FIG. 19 is a sequence diagram illustrating an example of a management screen display process in the management system according to the first embodiment of the present disclosure. In FIG. 19, the remote device management apparatus 10 is described assuming that the apparatus status information and the device status information have been acquired from the mediating apparatus 30 in advance.

In step S31, the web client 91 of the administrator terminal 90 transmits login request for the application 900 to the remote device management apparatus 10. Specifically, the reception unit 92 of the administrator terminal 90 accepts input of account ID and password performed by the administrator (for example, a maintenance person) on a settings screen displayed on the display 1006*a* of the administrator terminal 90 by the web client 91. The web client 91 transmits a login request including the account ID and password received by the reception unit 92 to the remote device management apparatus 10. Thereby, the web server 16 of the remote device management apparatus 10 receives the login request.

In step S32, the determination unit 13 of the remote device management apparatus 10 executes an authentication process for the administrator who uses the administrator terminal 90 based on information included in the login request received by the web server 16. Specifically, the storage/reading unit 21 searches the account management table 140*a* stored in the storage unit 100 for a combination of account ID and password corresponding to the combination of account ID and password received by the web server 16. When there is a corresponding combination, the determination unit 13 determines that the requesting administrator is a valid administrator. If there is no corresponding combination, the determination unit 13 determines that the requesting administrator is an invalid administrator. When the administrator is determined to be not valid, the web server 16 notifies the administrator terminal 90 that the login failed. Here, a case where the requesting administrator is valid is described.

In step S33, the screen information generation unit 18 of the remote device management apparatus 10 generates menu screen data for a selection screen for a management function to be executed by the application 900. In step S34, the web server 16 of the remote device management apparatus 10 transmits the menu screen data generated by the screen information generation unit 18 to the administrator terminal 90. Thereby, the web client 91 of the administrator terminal 90 receives the menu screen data.

Figure 20:
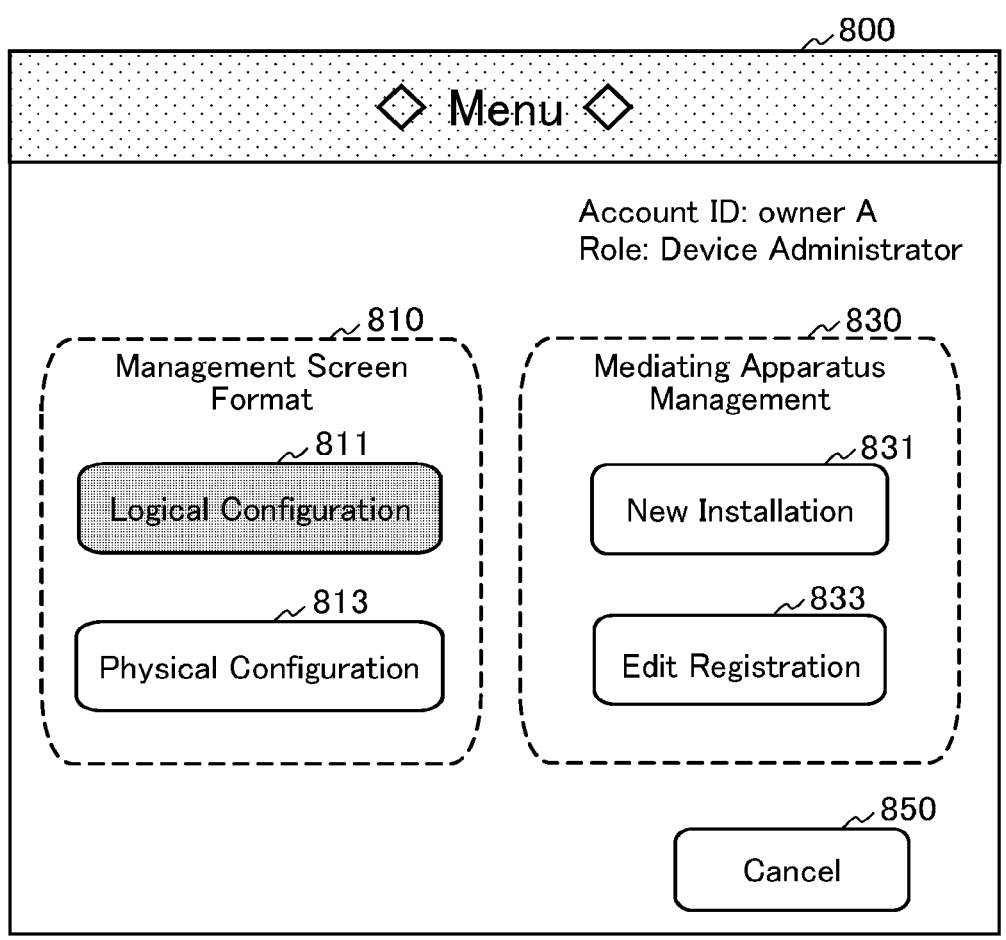
FIG. 20 is a diagram illustrating an example of a menu screen displayed on the administrator terminal according to the first embodiment of the present disclosure.

In step S35, the web client 91 of the administrator terminal 90 displays the menu screen 800 illustrated in FIG. 20 on the display 1006*a* of the administrator terminal 90 using the received menu screen data. FIG. 20 is a diagram illustrating an example of the menu screen displayed on the administrator terminal 90 according to the first embodiment of the present disclosure. The menu screen 800 illustrated in FIG. 20 includes a management screen format selection area 810 indicating available formats of a management screen for displaying the status of the mediating apparatus 30 or the device 500 monitored (managed) by the remote device management apparatus 10, a mediating apparatus management area 830 for selecting operation to be performed on the mediating apparatus 30, and a cancel button 850 to be pressed when cancelling the management process using the administrator terminal 90. The management screen format selection area 810 includes a logical configuration button 811 (an example of a predetermined image) to be pressed when displaying a logical configuration screen illustrating a hierarchical relation (node link) between the mediating apparatus 30 and the device 500, and a physical configuration button 813 (an example of the predetermined image) to be pressed when displaying a physical configuration screen in which information relating to the mediating apparatus 30 and the device 500 is mapped based on the positioning information indicating a place where the mediating apparatus 30 is installed. The mediating apparatus management area 830 includes a new installation button 831 to be pressed when newly installing the mediating apparatus 30, and an edit registration button 833 to be pressed when the mediating apparatus information registered in the remote device management apparatus 10 needs to be edited.

In step S36, the reception unit 92 of the administrator terminal 90 accepts selection of the logical configuration button 811 or the physical configuration button 813 included in the management screen format selection area 810 of the menu screen 800. In step S37, the web client 91 of the administrator terminal 90 transmits a management screen display request including the management screen format received by the reception unit 92 to the remote device management apparatus 10. Thereby, the web server 16 of the remote device management apparatus 10 receives the management screen display request.

In step S38, the screen information generation unit 18 of the remote device management apparatus 10 generates management screen data to be displayed on the administrator terminal 90 according to the management screen format included in the management screen display request received by the web server 16. The management screen is a display screen for presenting the status of the mediating apparatus 30 or the device 500 monitored (managed) by the remote device management apparatus 10 to the administrator who uses the administrator terminal 90. The management screen includes a logical configuration screen 710 and physical configuration screens 910a and 910b described below. Details of the management screen data generation process in each management screen format is described below.

In step S39, the web server 16 of the remote device management apparatus 10 transmits the management screen data generated by the screen information generation unit 18 to the administrator terminal 90. The web client 91 of the administrator terminal 90 receives the management screen data. In step S40, the web client 91 of the administrator terminal 90 uses the received management screen data to display a management screen on the display 1006a of the administrator terminal 90 using web API or the like (an example of a display control step).

Figure 21:
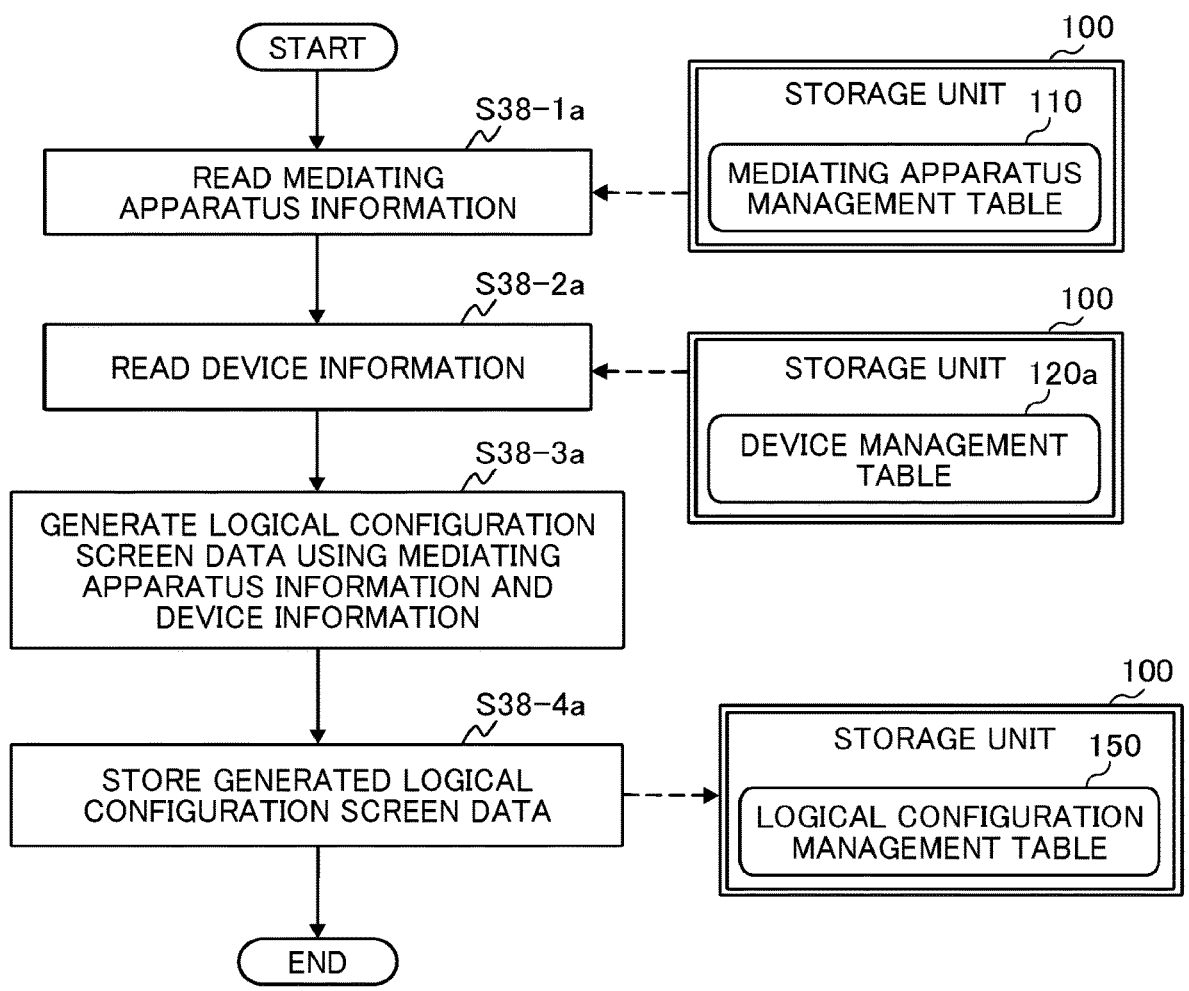
FIG. 21 is a flowchart illustrating an example of a generation process of a logical configuration screen in the remote device management apparatus according to the first embodiment of the present disclosure.

Details of the management screen data generation process illustrated in step S38 of FIG. 19 are described below. First, a process for generating logical configuration screen data as management screen data by the screen information generation unit 18 is described with reference to FIGS. 21 to 24. FIG. 21 is a flowchart illustrating an example of a generation process of generating the logical configuration screen in the remote device management apparatus according to the first embodiment of the present disclosure.

In step S38-1a, the storage/reading unit 21 reads the mediating apparatus information stored in the mediating apparatus management table 110. In step S38-2a, the storage/reading unit 21 retrieves device information associated with the corresponding device ID by searching the device management table 120a using the device ID included in the read mediating apparatus information as a search key.

In step S38-3a, the screen information generation unit 18 generates logical configuration screen data for displaying the logical configuration screen 710 using the read mediating apparatus information and device information. Specifically, the screen information generation unit 18 generates logical configuration screen data by linking each piece of information included in the mediating apparatus information and device information into a tree structure and by rendering a hierarchical relation (node link) between the mediating apparatus 30 and the device 500. Rendering is a process that interprets data written in a web page description language (such as HTML, CSS, or Extensible Markup Language (XML)) and calculates the arrangement of characters and image data that are actually displayed on the screen.

In step S38-4a, the storage/reading unit 21 stores the generated logical configuration screen data in the logical configuration management table 150. Specifically, the storage/reading unit 21 stores each hierarchical relation indicated in the generated logical configuration screen data in association with the same screen ID.

Figure 22:
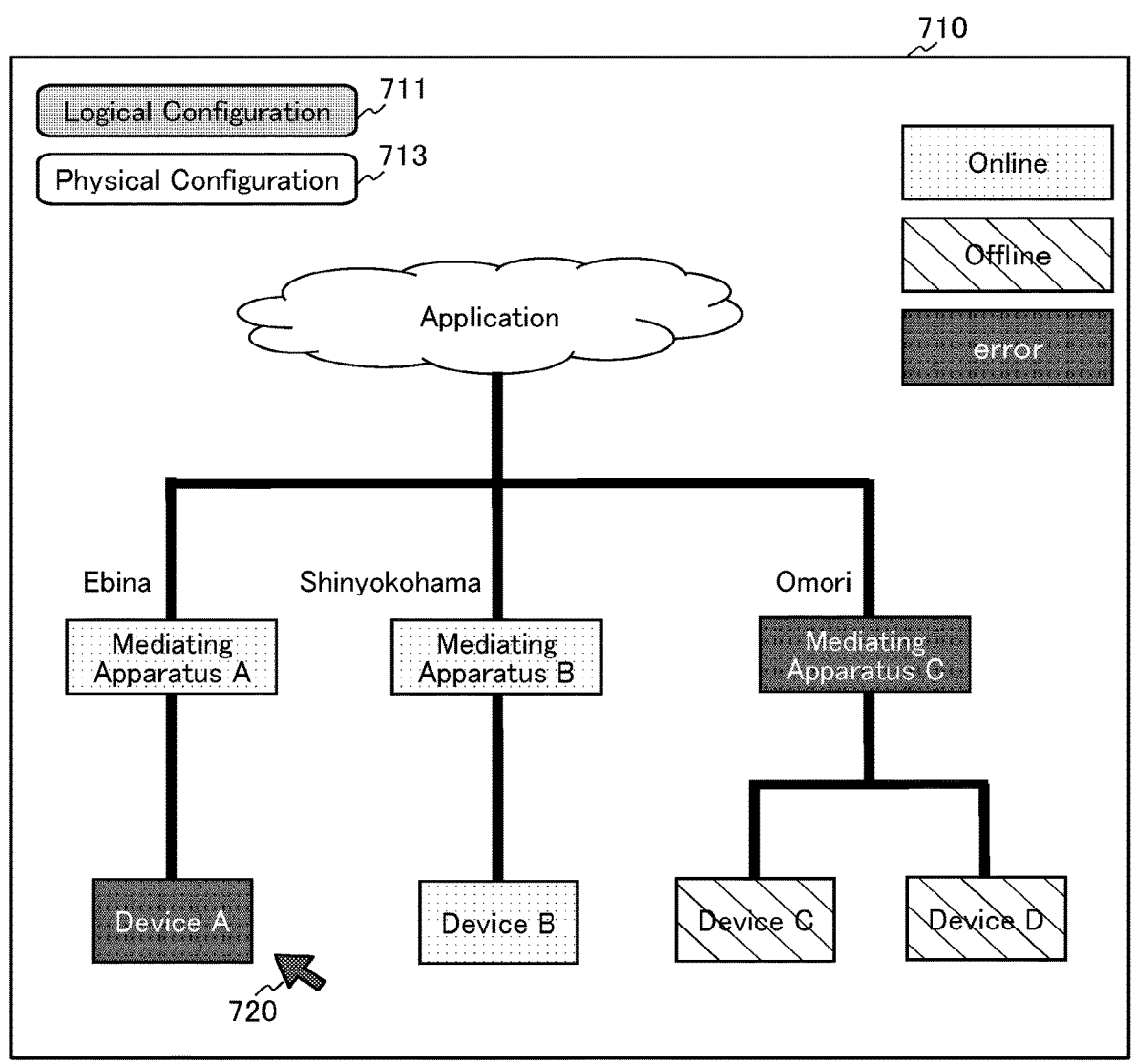
FIG. 22 is a diagram illustrating a first example of the logical configuration screen displayed on the administrator terminal according to the first embodiment of the present disclosure.

FIG. 22 is a diagram illustrating a first example of the logical configuration screen displayed on the administrator terminal according to the first embodiment of the present disclosure. The logical configuration screen 710 illustrated in FIG. 22 is a screen displayed using the logical configuration screen data generated by the screen information generation unit 18 of the remote device management apparatus 10. The logical configuration screen 710 indicates the connection relation (hierarchical relation, node link) between the mediating apparatus 30 and the device 500. Further, the logical configuration screen 710 can visually indicate the status of the mediating apparatus 30 and the device 500 by color coding or the like according to the apparatus status information or the device status information. The logical configuration screen 710 is an example of a third management image. Furthermore, the reception unit 92 of the administrator terminal 90 receives, for example, a selection to the physical configuration button 713 included in the logical configuration screen 710 displayed on the display 1006a by a pointer 720 and switches the management screen displayed on the display 1006a to the physical configuration screens 910a and 910b described below.

Figure 23:
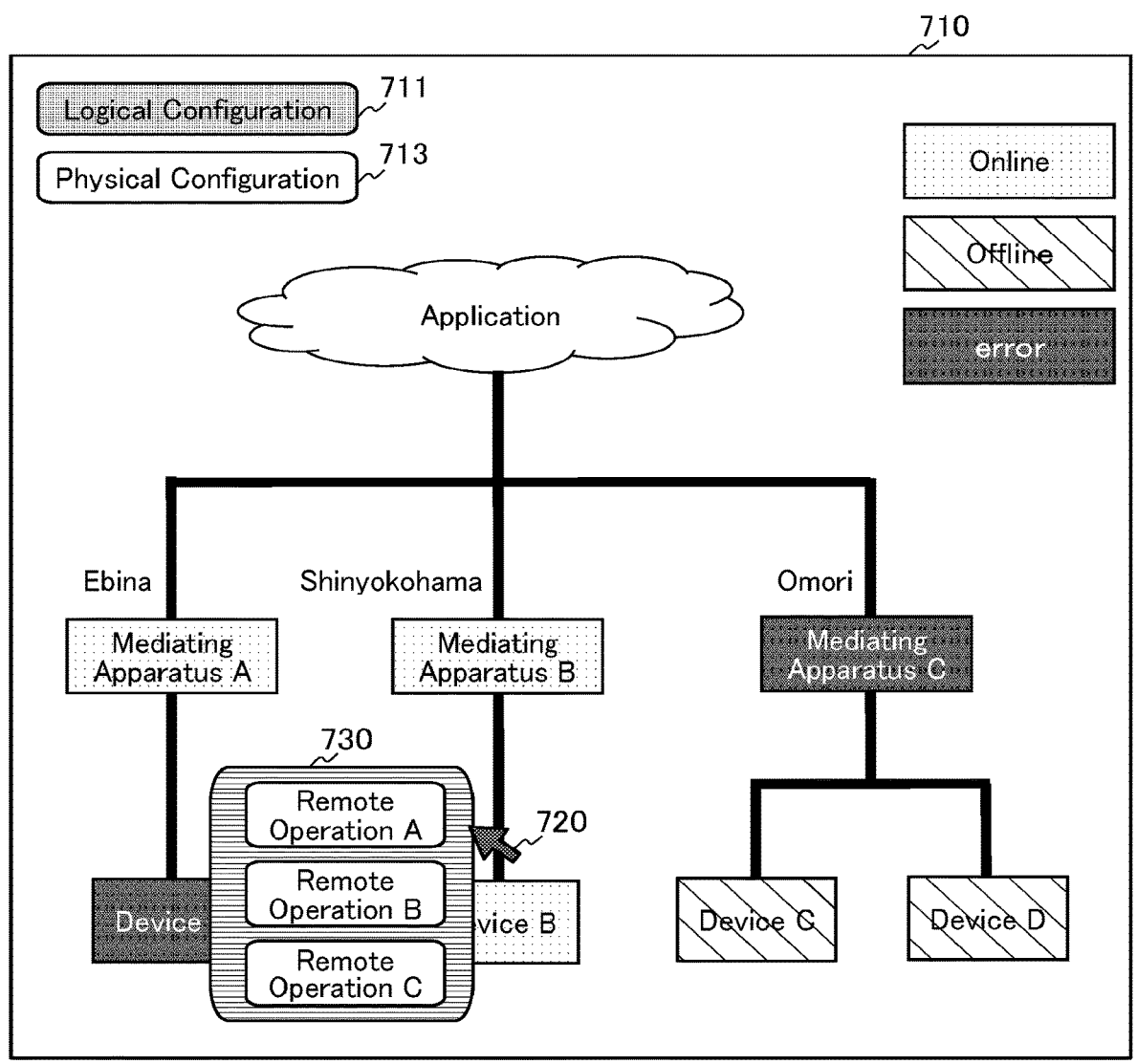
FIG. 23 is a diagram illustrating a second example of the logical configuration screen displayed on the administrator terminal according to the first embodiment of the present disclosure.
Figure 24:
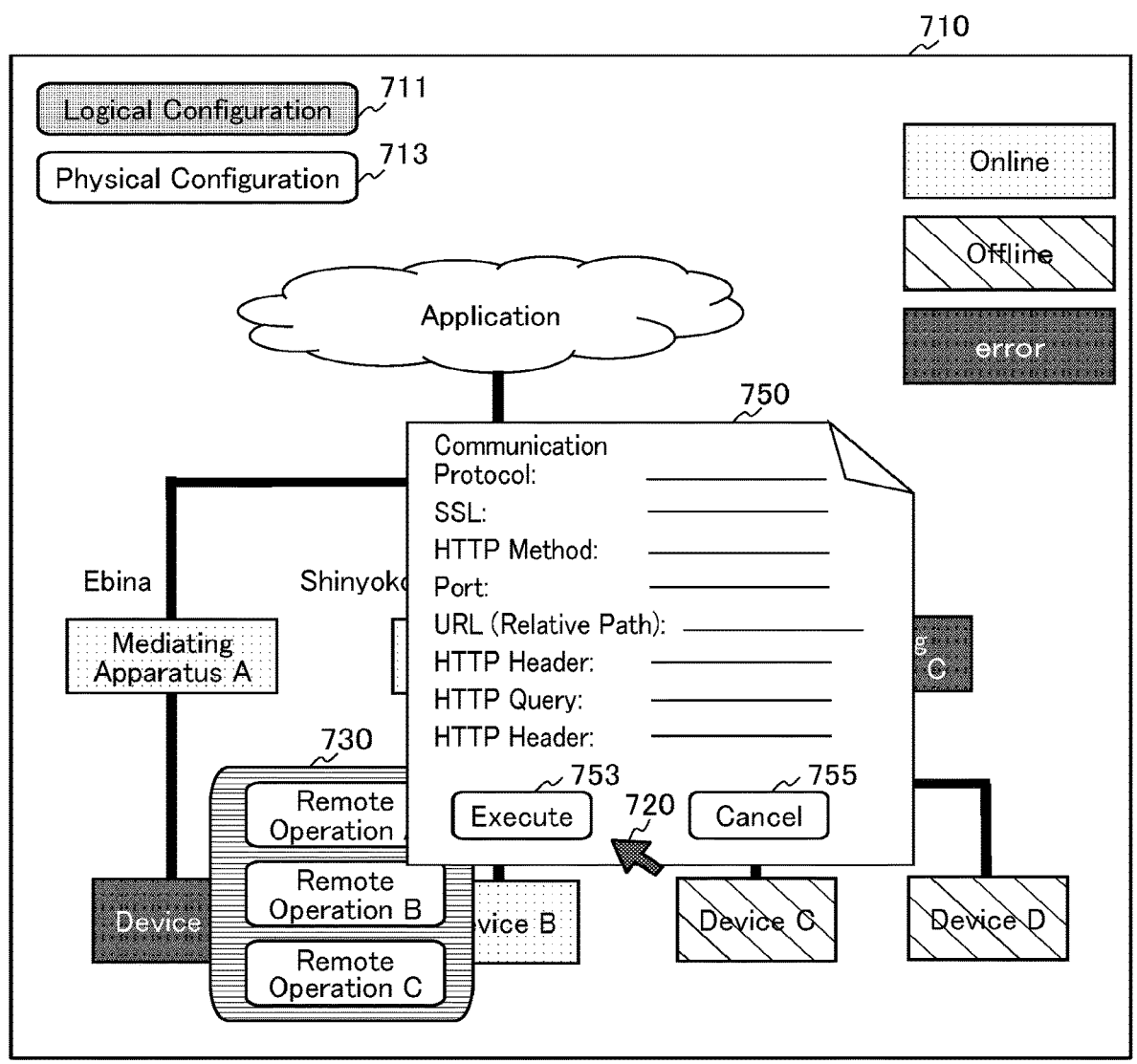
FIG. 24 is a diagram illustrating a third example of the logical configuration screen displayed on the administrator terminal according to the first embodiment of the present disclosure.

The administrator terminal 90 displays a remote operation selection area 730 illustrated in FIG. 23 when the reception unit 92 receives a selection for any of the nodes included in the logical configuration screen 710 using the pointer 720. The remote operation selection area 730 includes a selection button (for example, remote operation A to remote operation C) for selecting the remote operation registered in advance in the remote operation management table 170a. The administrator terminal 90 displays remote operation information 750 illustrated in FIG. 24 when the reception unit 92 receives a selection of any of the selection buttons using the pointer 720. The remote operation information 750 includes information regarding the communication protocol and communication parameters for executing the selected remote operation, an execution button 753 to be pressed when executing the remote operation, and a cancel button 755 to be pressed when canceling the remote operation.

As a result, the management system 3 displays the hierarchical relation between the mediating apparatus 30 and the device 500 to be managed (monitored) and information indicating the status of the mediating apparatus 30 and the device 500, so that the administrator visually recognizes information related to the management target mediating apparatus 30 and device 500.

Figure 25:
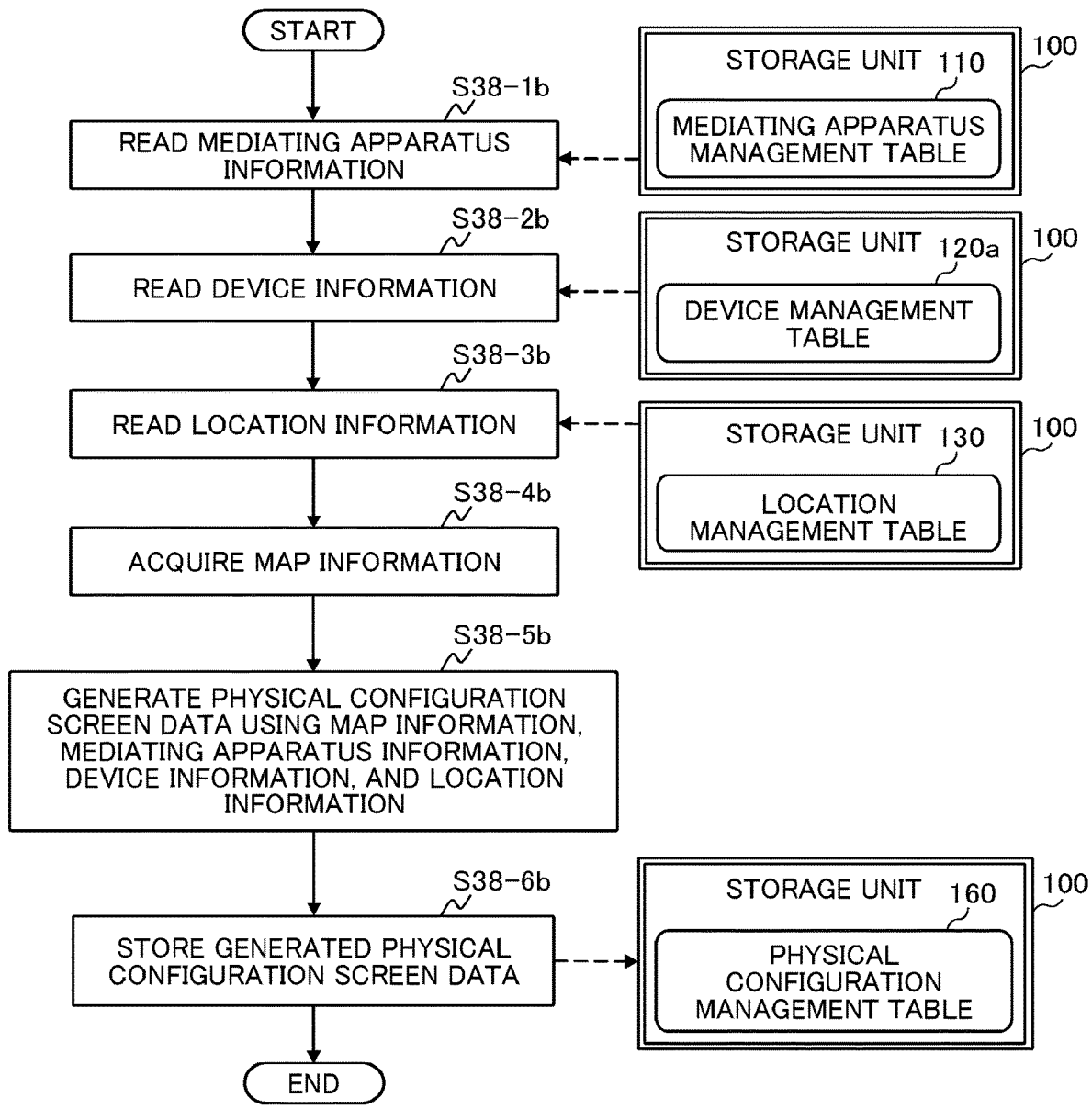
FIG. 25 is a flowchart illustrating an example of a generation process of a physical configuration screen in the remote device management apparatus according to the first embodiment of the present disclosure.

A process for generating physical configuration screen data as management screen data by the screen information generation unit 18 is described with reference to FIGS. 25 to 28. FIG. 25 is a flowchart illustrating an example of a generation process of generating the physical configuration screen in the remote device management apparatus according to the first embodiment of the present disclosure. The physical configuration screen is a display screen in which information related to the mediating apparatus 30 and the device 500 is mapped onto a map based on the positioning information indicating a location where the mediating apparatus 30 is installed.

In step S38-1b, the storage/reading unit 21 reads the mediating apparatus information stored in the mediating apparatus management table 110. In step S38-2b, the storage/reading unit 21 retrieves device information associated with the corresponding device ID by searching the device management table 120a using the device ID included in the read mediating apparatus information as a search key.

In step S38-3b, the storage/reading unit 21 reads the location information associated with the corresponding location ID by searching the location management table 130 using the location ID included in the read mediating apparatus information as a search key.

In step S38-4b, the external server communication unit 19 receives map information including a location corresponding to the positioning information included in the location information read in step S38-3b from the external server 200. The external server communication unit 19 receives, from the external server 200, the map information available from the external service or application provided by the external server 200 using web API or the like.

In step S38-5b, the screen information generation unit 18 uses the map information received by the external server communication unit 19 and the mediating apparatus information, device information, and location information read by the storage/reading unit 21 to generate physical configuration screen data for displaying the physical configuration screens 910a and 910b. Specifically, the screen information generation unit 18 generates physical configuration screen data so that all the information included in the mediating apparatus information and the device information is displayed at the location on the map information corresponding to the latitude and longitude indicated by the positioning information included in the location information associated with the location ID included in the mediating apparatus information.

In step S38-6b, the storage/reading unit 21 stores the physical configuration screen data generated by the screen information generation unit 18 in the physical configuration management table 160. Specifically, the storage/reading unit 21 stores the generated physical configuration screen data in association with each layer.

Figure 26:
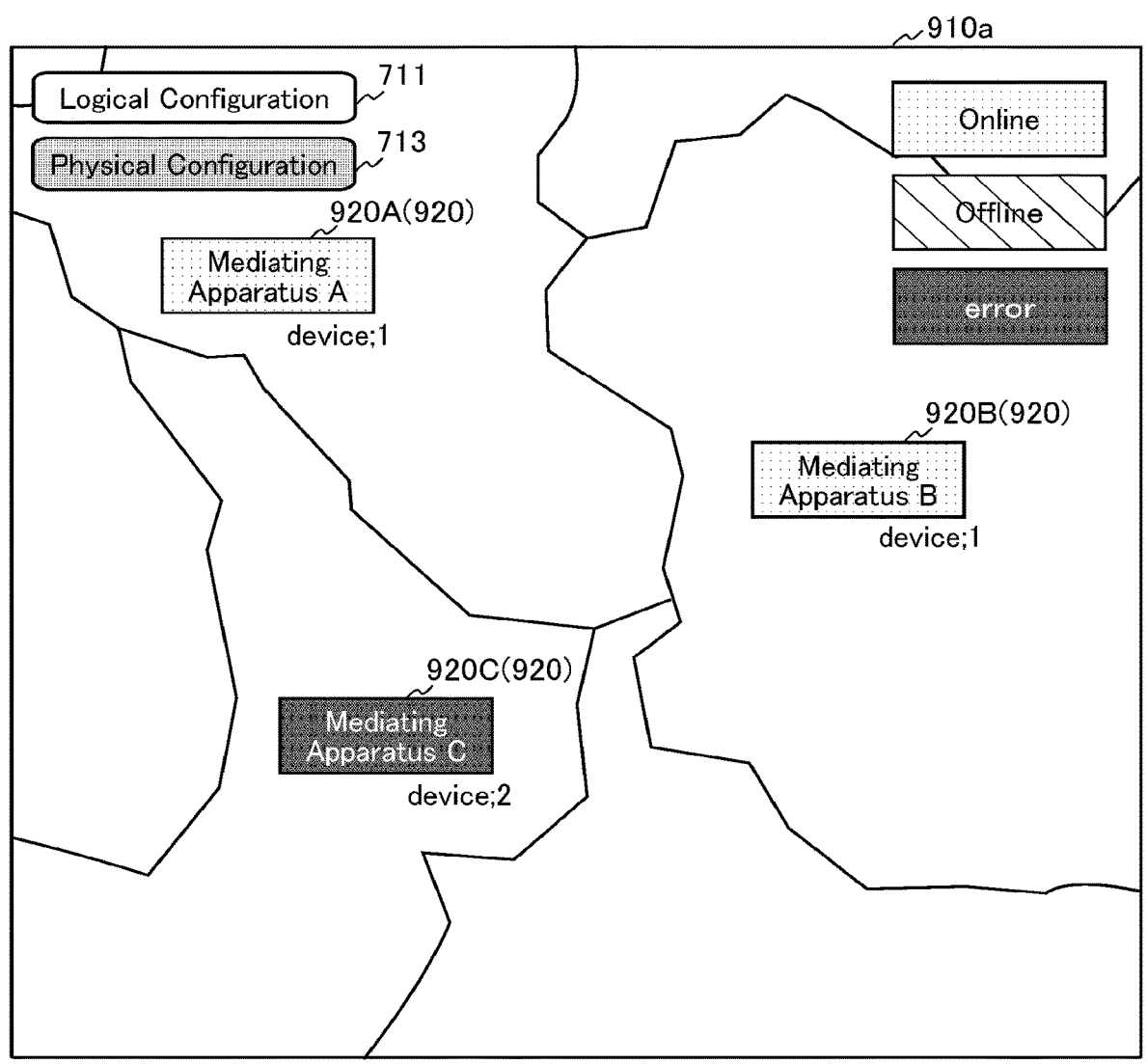
FIG. 26 is a diagram illustrating a first example of the physical configuration screen displayed on the administrator terminal according to the first embodiment of the present disclosure.

FIG. 26 is a diagram illustrating a first example of the physical configuration screen displayed on the administrator terminal according to the first embodiment of the present disclosure. The physical configuration screen 910a illustrated in FIG. 26 is a screen displayed using the physical configuration screen data generated by the screen information generation unit 18 of the remote device management apparatus 10. The physical configuration screen 910a is generated using, for example, each data associated with a screen ID "B001", a common screen ID "p01", and a layer "1" in the physical configuration management table 160. The physical configuration screen 910a is a display screen in which apparatus status information related to each mediating apparatus 30 is mapped on a map displayed from the map information, based on positioning information indicating a place where the mediating apparatus 30 is installed. In addition, the physical configuration screen 910a includes a mediating apparatus identification image 920 (920A, 920B, 920C) indicating apparatus status information. The physical configuration screen 910a is an example of a second management image. The mediating apparatus identification image 920 (920A, 920B, 920C) can visually distinguish the respective statuses of the mediating apparatus 30 by color coding or the like. Furthermore, the reception unit 92 of the administrator terminal 90 receives, for example, a selection to the logical configuration button 711 included in the physical configuration screen 910a displayed on the display 1006a by a pointer 720 and switches the management screen displayed on the display 1006a to the logical configuration screen 710 illustrated in FIG. 22.

Figure 27:
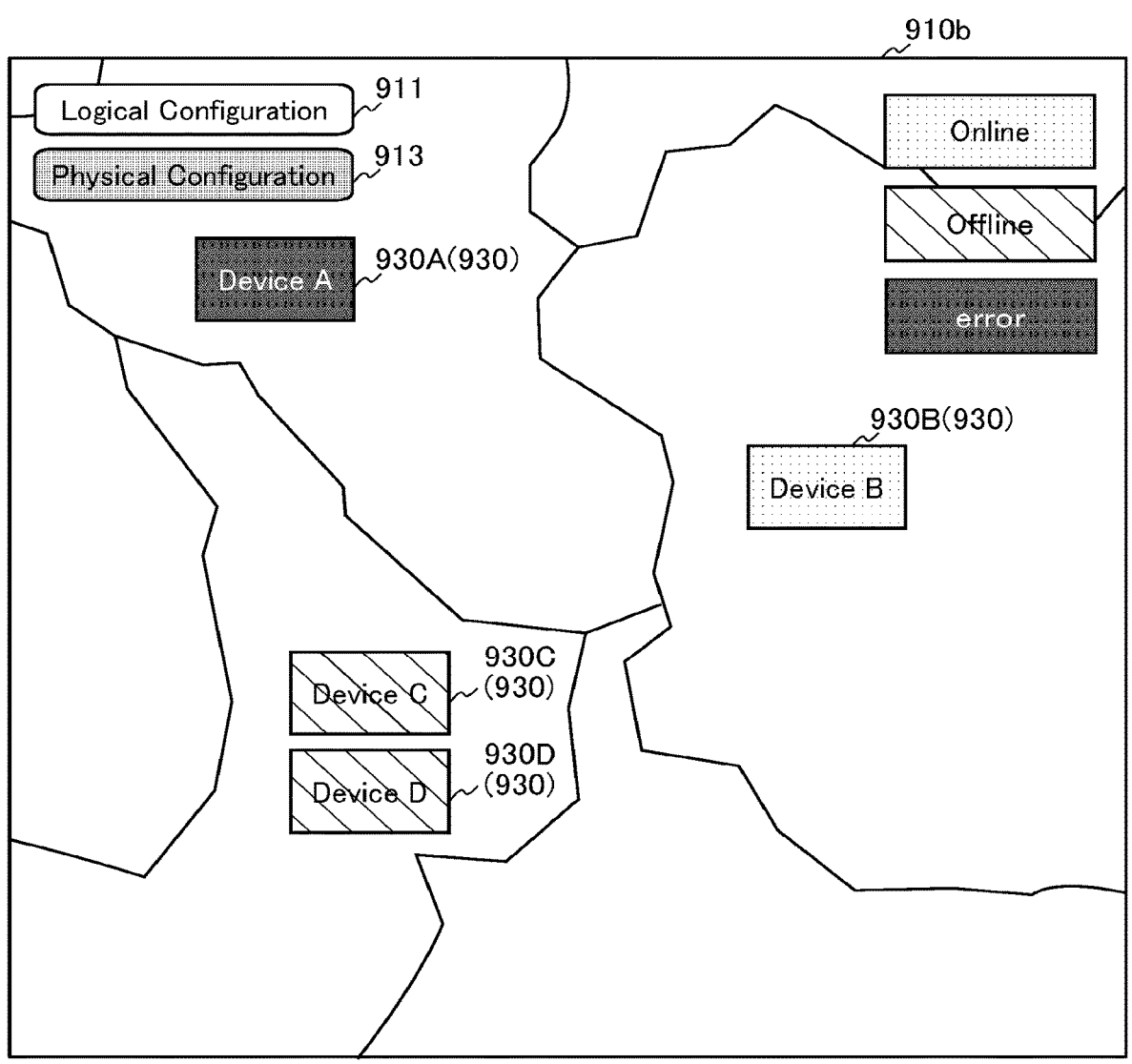
FIG. 27 is a diagram illustrating a second example of the physical configuration screen displayed on the administrator terminal according to the first embodiment of the present disclosure.

In addition, the administrator terminal 90 switches the screen to a physical configuration screen 910b illustrated in FIG. 27 when the reception unit 92 receives a selection for any one of the mediating apparatus identification image 920 (920A, 920B, 920C) included in the physical configuration screen 910a using the pointer 720. The physical configuration screen 910b is a display screen in which device status information related to the device 500 connected to each mediating apparatus 30 is mapped on the map displayed from the map information based on the positioning information indicating the place where the mediating apparatus 30 is installed. Further, the physical configuration screen 910b includes a device identification image 930 (930A, 930B, 930C) indicating the device status information. The physical configuration screen 910b is an example of a first management image. The device identification image 930 (930A, 930B, 930C) can visually distinguish the respective statuses of the device 500 by color coding or the like. The physical configuration screen 910 is different from the logical configuration screen 710 illustrated in FIG. 22 and apparatus status information and device status information are not displayed on the same screen. When any one of the mediating apparatus identification image 920 (920A, 920B, 920C) on the map illustrated in the physical configuration screen 910a illustrated in FIG. 26 is selected, the administrator terminal 90 displays the physical configuration screen 910b illustrating the device status information related to the associated device 500. The physical configuration screen 910b is generated using, for example, each data associated with the screen ID "B002", the common screen ID "p01", and the layer "2" in the physical configuration management table 160.

Figure 28:
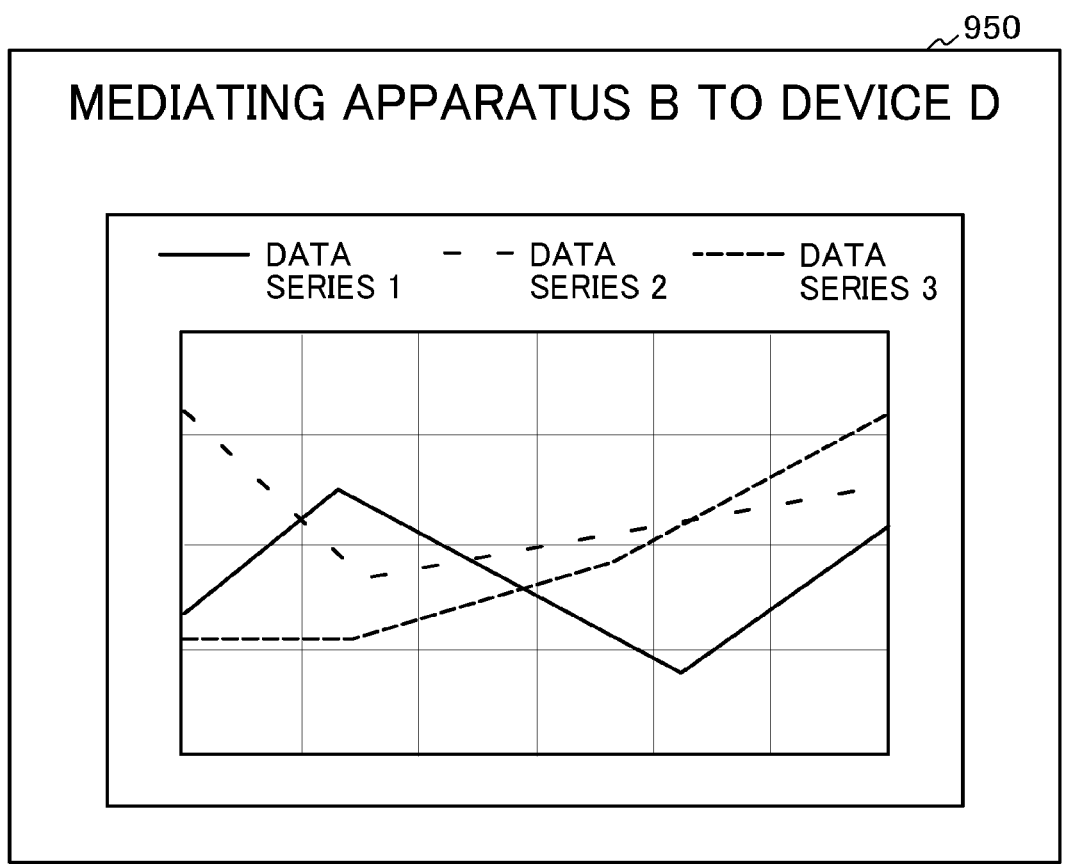
FIG. 28 is a diagram illustrating a third example of the physical configuration screen displayed on the administrator terminal according to the first embodiment of the present disclosure.

Further, the administrator terminal 90 displays a device status display screen 950 illustrated in FIG. 28, in response to receiving a selection for any one of the device identification images 930 (930A, 930B, 930C) included in the physical configuration screen 910b by the reception unit 92 using the pointer 720. The device status display screen 950 illustrates details of device status information related to a device 500 that has been selected by the reception unit 92. The device status display screen 950 indicates, for example, device status information related to the device D connected to the mediating apparatus B.

The management system 3 displays the physical configuration screen 910a or 910b indicating the status and location of the mediating apparatus 30 or the device 500 on the administrator terminal 90. The system administrator can intuitively grasp the location of the mediating apparatus 30 or the device 500 that has a malfunction or the like and should be remotely controlled.

The display method of the physical configuration screens 910a and 910b is not limited to the method using the web API as described in step S39 in FIG. 19. The physical configuration screens 910a and 910b may be displayed by superimposing the coordinates converted from the latitude and longitude indicating the positioning information for Mercator projection, on the map image of Mercator projection.

Further, the positioning information included in the location management table 130 illustrated in FIG. 10 is not limited to latitude and longitude information. The positioning information may be, for example, an address of a place where the mediating apparatus 30 is installed, or a spot that can be identified on a map in the vicinity of the place where the mediating apparatus 30 is installed (for example, a school, a company, a store, a place name, a landmark, etc.). Also, in this case, the screen information generation unit 18 maps information related to the mediating apparatus 30 and the device 500 at a location on the map corresponding to the location indicated by the positioning information.

Figure 29:
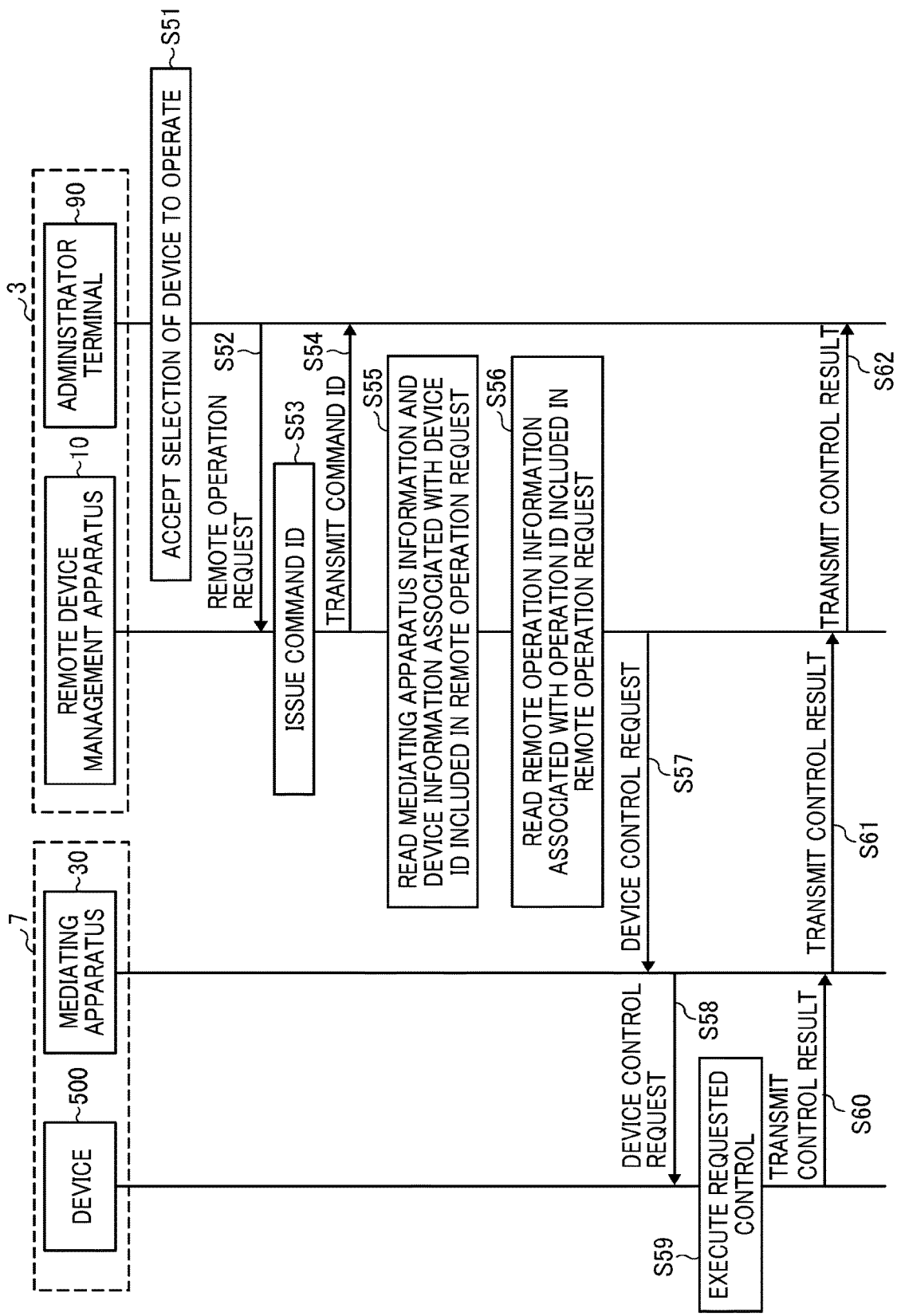
FIG. 29 is a sequence diagram illustrating an example of a device control process executed by the remote device management apparatus in the remote device management system according to the first embodiment of the present disclosure.

The management system 3 can display the locations of the mediating apparatus 30 and the device 500 in more detail by displaying the physical configuration screens 910a and 910b using an indoor floor map in addition to the map information. In this case, the management system 3 stores in the positioning information included in the location management table 130, information on the number of floor corresponding to a specific floor map and the location on the floor, in addition to the latitude and longitude information Communication with Devices Device Control Request Transmission Process Hereinafter, a communication process between the remote device management apparatus and the device 500 is described with reference to FIGS. 29 to 31. A communication process according to a device control request transmitted from the remote device management apparatus 10 to the device 500 is described with reference to FIG. 29. FIG. 29 is a sequence diagram illustrating an example of a device control process executed by the remote device management apparatus in the remote device management system according to the first embodiment of the present disclosure.

In step S51, the reception unit 92 of the administrator terminal 90 receives the selection of the device 500 to be remotely operated by an input operation on the management screen displayed on the display 1006a by the web client 91. For example, the reception unit 92 receives the remote operation selection of a device 500 when the device 500 included in the logical configuration screen 710 illustrated in FIG. 22 or the physical configuration screen 910b illustrated in FIG. 27 is selected.

In step S52, the web client 91 of the administrator terminal 90 transmits a remote operation request for the device 500 selected by the reception unit 92 to the remote device management apparatus 10. The remote operation request includes the device ID of the remote operation target device 500 and the operation ID for identifying the requested remote operation. Thereby, the web server 16 of the remote device management apparatus 10 receives the remote operation request transmitted from the administrator terminal 90.

In step S53, the command management unit 12 of the remote device management apparatus 10 issues a command ID when the remote operation request is received by the web server 16. In step S54, the web server 16 of the remote device management apparatus 10 transmits the command ID issued by the command management unit 12 to the administrator terminal 90. The web client 91 of the administrator terminal 90 receives the command ID.

In step S55, the storage/reading unit 21 of the remote device management apparatus 10 searches the mediating apparatus management table 110 using the device ID included in the remote operation request received by the web server 16 as a search key and reads the mediating apparatus information associated with the corresponding device ID. The storage/reading unit 21 searches the device management table 120a using the device ID included in the remote operation request received by the web server 16 as a search key and reads the device information associated with the corresponding device ID.

Further, in step S56, the storage/reading unit 21 of the remote device management apparatus 10 searches the remote operation management table 170a using the operation ID included in the remote operation request received by the web server 16 as a search key, and reads the remote operation information associated with the corresponding operation ID.

In step S57, the mediating apparatus communication unit 11 of the remote device management apparatus 10 transmits a device control request for performing control on the device 500 to the mediating apparatus 30 identified by the mediating apparatus information read by the storage/reading unit 21. The device control request includes the remote operation information read by the storage/reading unit 21. An example of the data structure of the device control request transmitted from the remote device management apparatus 10 is illustrated in FIG. 30. As illustrated in FIG. 30, the remote device management apparatus 10 describes the remote operation content from the mediating apparatus 30 to the device 500 in the body of the HTTP request. The communication protocol or communication parameter information described in FIG. 30 is information included in the remote operation information. Thereby, the management apparatus communication unit 31 of the mediating apparatus 30 receives the device control request transmitted from the remote device management apparatus 10.

In step S58, the device communication unit 32 of the mediating apparatus 30 transmits the device control request received by the management apparatus communication unit 31 to the device 500. Thereby, the communication unit 501 of the device 500 receives the device control request transmitted from the mediating apparatus 30.

In step S59, the command execution unit 503 of the device 500 executes control indicated in the device control request received by the communication unit 501. In step S60, the communication unit 501 of the device 500 transmits a control result notice indicating a control result by the command execution unit 503 to the mediating apparatus 30. This control result notice includes device status information indicating the status of the device 500 together with information on the control result. Thereby, the device communication unit 32 of the mediating apparatus 30 receives the control result notice transmitted from the device 500.

In step S61, the management apparatus communication unit 31 of the mediating apparatus 30 transmits the control result notice received by the device communication unit 32 to the remote device management apparatus 10. Thereby, the mediating apparatus communication unit 11 of the remote device management apparatus 10 receives the control result notice as a response to the transmitted device control request from the mediating apparatus 30.

In step S62, the web server 16 of the remote device management apparatus 10 transmits the control result notice received by the mediating apparatus communication unit 11 to the administrator terminal 90. The web client 91 of the administrator terminal 90 receives the control result notice as a response to the transmitted remote operation request. The web client 91 of the administrator terminal 90 may present control result notice to the administrator who uses the administrator terminal 90, for example, by displaying the control result notice transmitted from the remote device management apparatus 10 on the display 1006a of the administrator terminal 90. The administrator who uses the administrator terminal 90 can check the requested remote operation and the result together by collating the command ID acquired in step S54 with the presented control result notice. Thereby, the remote device management system 1 can notify the administrator such as the person in charge of maintenance of the device 500 of the control result of the device 500.

The remote device management system 1 can solve a malfunction or perform maintenance on the device 500 that requires remote control and can reduce the workload of the administrator since the administrator can select the device 500 for remote control based on the status and location of the device 500 displayed on the logical configuration screen 710 or the physical configuration screen 910a, 910b displayed on the administrator terminal 90.

Device Status Information Acquisition Process

Hereinafter, a process of acquiring device status information related to the device 500 in response to a request from the mediating apparatus 30 is described with reference to FIG. 31. FIG. 31 is a sequence diagram illustrating an example of a device status information acquisition process in the remote device management system according to the first embodiment of the present disclosure. FIG. 31 illustrates a process in the case where the mediating apparatus 30 periodically acquires the device status information related to the device 500 and transmits the acquired device status information to the remote device management apparatus 10 at a designated time or at regular intervals.

In step S201, the storage/reading unit 38 of the mediating apparatus 30 reads the IP address associated with the device ID of the device 500 that is the transmission destination of the device status information acquisition request included in the device management table 310 stored in the storage unit 300.

In step S202, the device communication unit 32 of the mediating apparatus 30 transmits a device status information acquisition request to the device 500 using the IP address read by the storage/reading unit 21. Thereby, the communication unit 501 of the device 500 receives the device status information acquisition request transmitted from the mediating apparatus 30.

In step S203, the device status information generation unit 502 of the device 500 generates device status information indicating the status of the device 500. The device status information is, for example, the resource status of the device 500 and log information including information on the operating status.

In step S204, the communication unit 501 of the device 500 transmits the device status information generated by the device status information generation unit 502 to the mediating apparatus 30. The device communication unit 32 of the mediating apparatus 30 receives the device status information that is a response to the transmitted device status information acquisition request.

In step S205, the management apparatus communication unit 31 of the mediating apparatus 30 transmits the device status information received by the device communication unit 32 to the remote device management apparatus 10. Thereby, the mediating apparatus communication unit 11 of the remote device management apparatus 10 receives the device status information transmitted from the mediating apparatus 30.

The web client 91 of the administrator terminal 90 may present the device status information to the administrator who uses the administrator terminal 90, for example, by displaying the device status information transmitted from the remote device management apparatus 10 on the display 1006a of the administrator terminal 90. As a result, the remote device management system 1 can notify the administrator such as the person in charge of maintenance of the device 500 of the status of the device 500.

Notification Process of Device Status Information

Hereinafter, a process in the case where device status information is voluntarily reported from the device 500 is described with reference to FIG. 32. When the device 500 detects a malfunction such as a failure, the device 500 transmits an event notification for notifying the administrator of the malfunction. FIG. 32 is a sequence diagram illustrating an example of a notification process of reporting the device status information from the device to the remote device management apparatus in the remote device management system according to the first embodiment of the present disclosure.

In step S301, the storage/reading unit 504 of the device 500 reads the mediating apparatus destination information 610 stored in the storage unit 600. In step S302, the communication unit 501 of the device 500 transmits an event notification to the mediating apparatus 30 identified by the mediating apparatus destination information 610 read by the storage/reading unit 504. This event notification includes device status information indicating the status of the device 500 generated by the device status information generation unit 502 of the device 500. The device communication unit 32 of the mediating apparatus 30 receives the event notification transmitted from the device 500.

In step S303, the management apparatus communication unit 31 of the mediating apparatus 30 transmits the event notification received by the device communication unit 32 to the remote device management apparatus 10. Thereby, the mediating apparatus communication unit 11 of the remote device management apparatus 10 receives the event notification transmitted from the mediating apparatus 30.

Note that the web client 91 of the administrator terminal 90 may display the information contained in the event notification transmitted from the remote device management apparatus 10 on the display 1006a of the administrator terminal 90. As a result, the remote device management system 1 can notify the administrator such as the person in charge of maintenance of the device 500 of the status of the device 500 transmitted from the device 500.

As described above, the remote device management system according to the first embodiment displays the apparatus status information related to the mediating apparatus 30 and the device status information related to the device 500 on the map corresponding to the location where the mediating apparatus 30 is installed for the system administrator to intuitively grasp the status and location of the mediating apparatus 30 or the device 500. Further, when a malfunction occurs in the device 500, the remote device management system 1 presents a physical configuration screen 910b indicating the location of the device 500 where the malfunction has occurred to the administrator. Since it is possible to easily identify the location where the malfunction has occurred, the workload of the administrator can be reduced.

Hereinafter, the remote device management system according to a second embodiment is described. The same configuration and the same functions as those of the first embodiment are denoted by the same reference numbers, and the description thereof is omitted. In the remote device management system according to the second embodiment, content of remote operation for the device 500 is set in advance for each type of the device 500, and device control based on the set content of remote operation is performed when the device 500 is remotely operated from the management system 3. Accordingly, the remote device management system according to the second embodiment can perform device control based on the operation content according to the type of the device 500 to be controlled without the administrator designating the content of operation.

Functional Configuration

Figure 33:
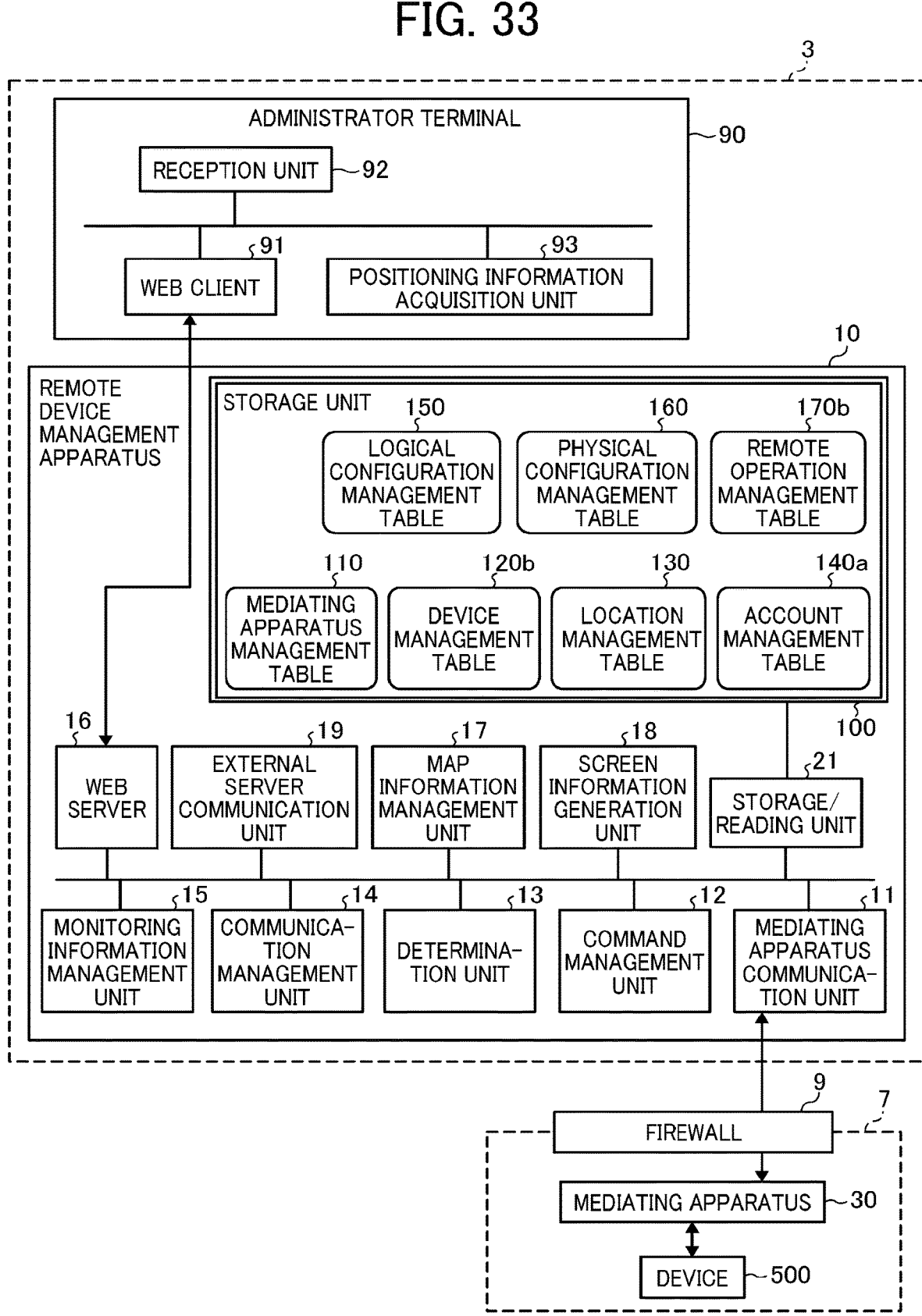
FIG. 33 is a block diagram illustrating an example of a functional configuration of the management system according to a second embodiment of the present disclosure.

FIG. 33 is a block diagram illustrating an example of a functional configuration of the management system according to the second embodiment of the present disclosure. The difference from the first embodiment is that the storage unit 100 of the remote device management apparatus 10 stores the device management table 120b instead of the device management table 120a, and the remote operation management table 170b instead of the remote operation management table 170a. Details of the device management table 120b and the remote operation management table 170b are described below.

Communication Definition

Figure 34:
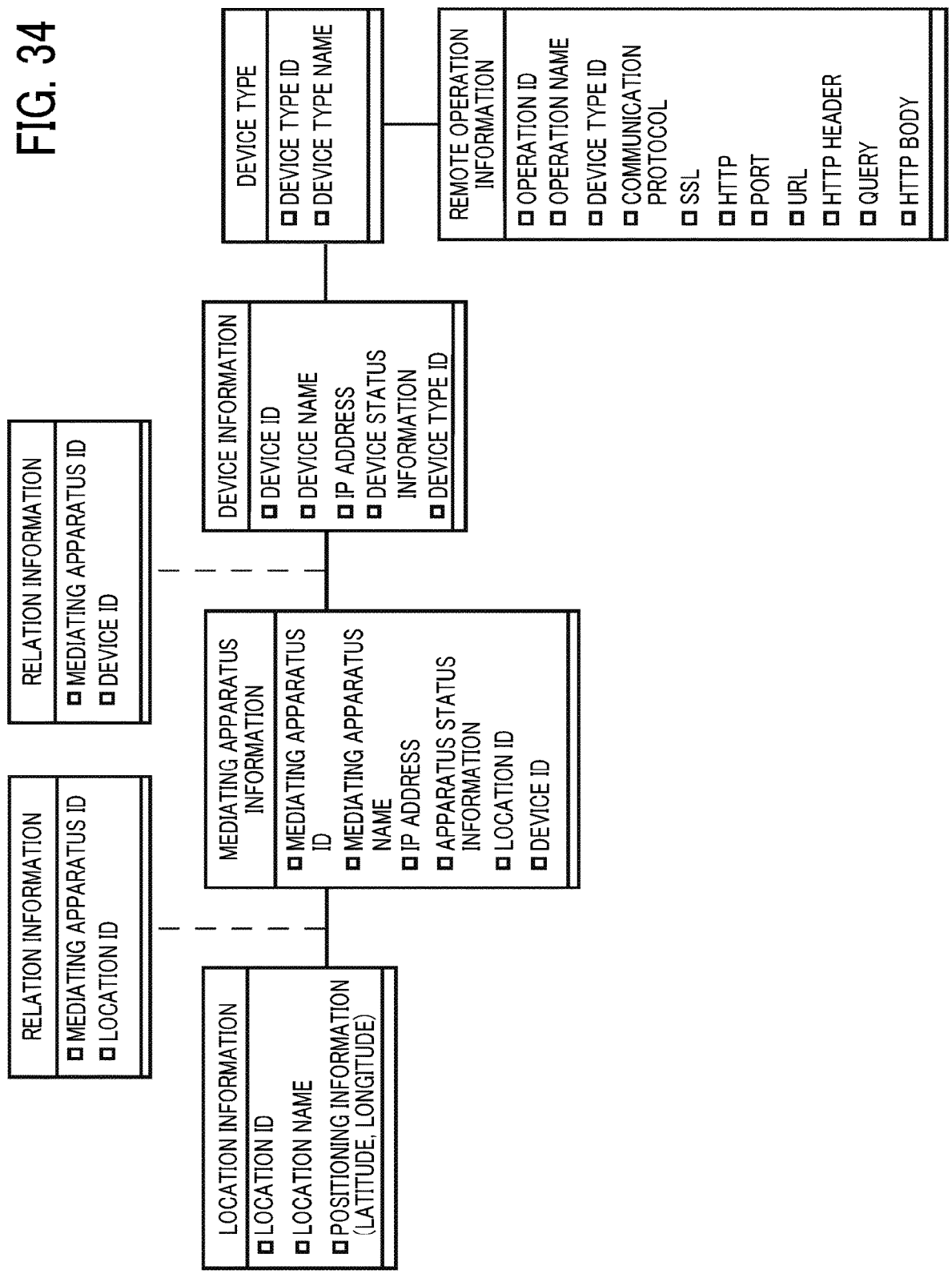
FIG. 34 is a diagram illustrating an example of data structure of the application according to the second embodiment of the present disclosure.

FIG. 34 is a diagram illustrating an example of data structure of the application according to the second embodiment of the present disclosure. The data structure illustrated in FIG. 34 is for setting the device type indicating the type of the device 500 and content for remote operation for each device type, in addition to the data structure of the application 900 according to the first embodiment illustrated in FIG. 7. Further, although the data structure illustrated in FIG. 34 is an ER diagram, the remote device management apparatus 10 stores the content of remote operation related to the device type as a setting. Here, the type of the device 500 is, for example, the MFP, PJ, IWB, PC, or sensor device as illustrated in FIG. 1. Each piece of information that the application 900 has is stored in the following tables held by the remote device management apparatus 10.

Device Management Table

FIG. 35 is a diagram illustrating an example of the device management table according to the second embodiment of the present disclosure. In addition to the device information stored in the device management table 120a illustrated in FIG. 9, the device management table 120b illustrated in FIG. 35 further stores a device type ID in association with the device ID and the like. The device type ID is device type identification information for identifying the type of the device 500 to be managed (monitored).

Remote Operation Management Table

FIG. 36 is a diagram illustrating an example of the remote operation management table according to the second embodiment of the present disclosure. The remote operation management table 170b illustrated in FIG. 36 stores in addition to the remote operation information stored in the remote operation management table 170a illustrated in FIG. 15, the device type ID in association with the operation ID or the like. The remote device management apparatus 10 stores the operation contents related to the remote operation in association with each type of the device 500 by the remote operation management table 170b.

Figure 37:
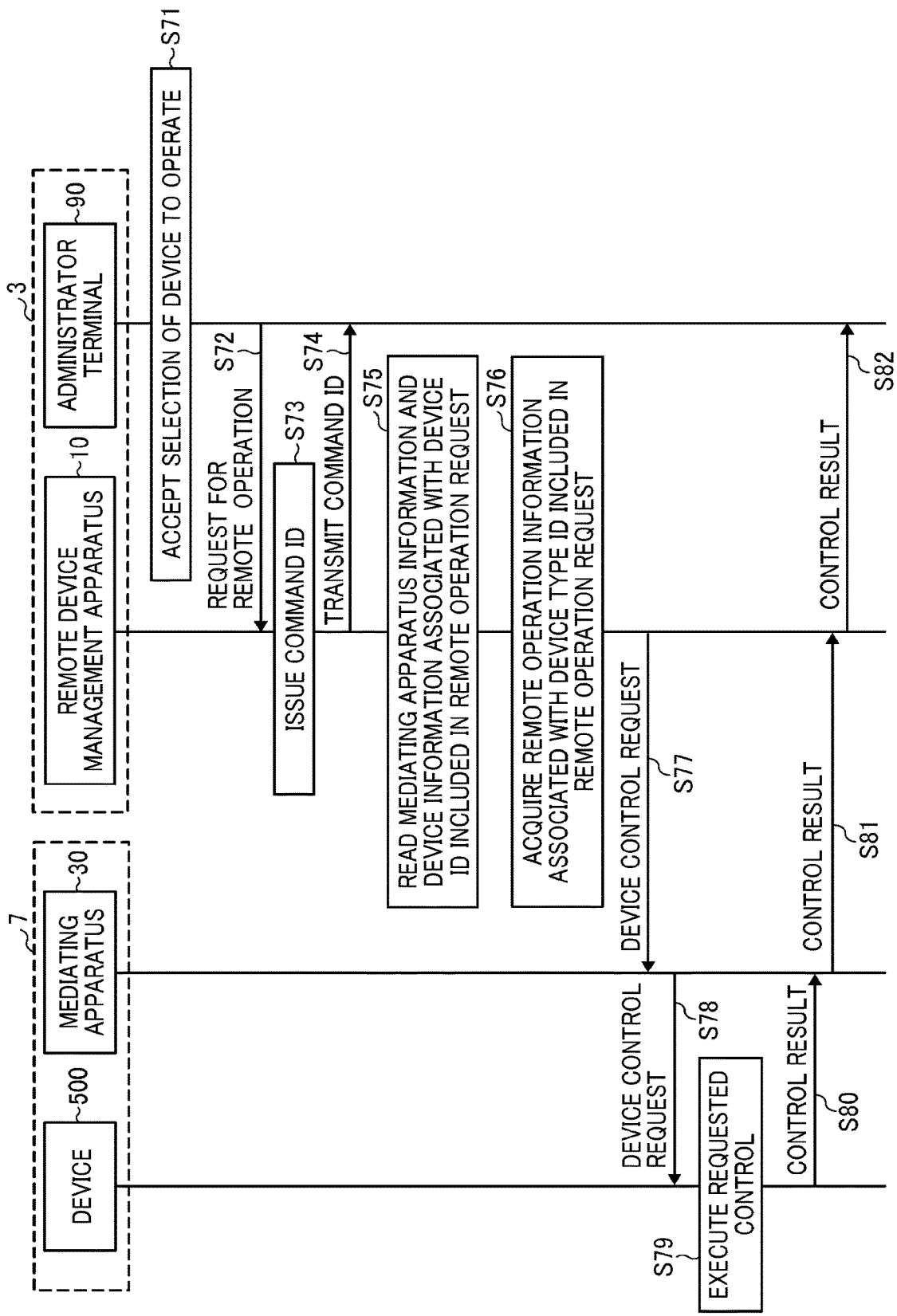
FIG. 37 is a sequence diagram illustrating an example of the device control process executed by the remote device management apparatus in the remote device management system according to the second embodiment of the present disclosure.

Hereinafter, processes executed by the remote device management system according to the second embodiment is described with reference to FIG. 37. FIG. 37 is a sequence diagram illustrating an example of the device control process executed by the remote device management apparatus in the remote device management system according to the second embodiment of the present disclosure. FIG. 37 is described assuming that the operation content for each device type is set in the remote operation management table 170b in advance. In the second embodiment, processes other than the control process of the device executed by the remote device management apparatus illustrated in FIG. 37 are the same as the processes described in the first embodiment, and thus the description thereof is omitted.

In step S71, the reception unit 92 of the administrator terminal 90 receives the selection of the device 500 to be remotely operated by an input operation on the management screen displayed on the display 1006 a by the web client 91. For example, the reception unit 92 receives the remote operation selection of a device 500 when the device identification image 930 (930A, 930B, 930C) included in the physical configuration screen 910b illustrated in FIG. 27 is selected.

In step S72, the web client 91 of the administrator terminal 90 transmits a remote operation request for the device 500 selected by the reception unit 92 to the remote device management apparatus 10. The remote operation request includes the device ID of the device 500 to be remotely operated. The web server 16 of the remote device management apparatus 10 receives the remote operation request transmitted from the administrator terminal 90.

In step S73, the command management unit 12 of the remote device management apparatus 10 issues a command ID when the remote operation request is received by the web server 16. In step S74, the web server 16 of the remote device management apparatus 10 transmits the command ID issued by the command management unit 12 to the administrator terminal 90. The web client 91 of the administrator terminal 90 receives the command ID.

In step S75, the storage/reading unit 21 of the remote device management apparatus 10 searches the mediating apparatus management table 110 using the device ID included in the remote operation request received by the web server 16 as a search key and reads the mediating apparatus information associated with the corresponding device ID. The storage/reading unit 21 searches the device management table 120a using the device ID included in the remote operation request received by the web server 16 as a search key and reads the device information associated with the corresponding device ID.

Further, in step S76, the storage/reading unit 21 of the remote device management apparatus 10 searches the remote operation management table 170b using the device type ID included in the device information read in step S75 as a search key and reads the remote operation information associated with the corresponding operation ID.

In step S77, the mediating apparatus communication unit 11 of the remote device management apparatus 10 transmits a device control request to the mediating apparatus 30 identified by the mediating apparatus information read by the storage/reading unit 21. The device control request includes the remote operation information read by the storage/reading unit 21. The data structure of the device control request transmitted from the remote device management apparatus 10 is the same as the data structure illustrated in FIG. 30, the description thereof is omitted. Thereby, the management apparatus communication unit 31 of the mediating apparatus 30 receives the device control request transmitted from the remote device management apparatus 10.

In step S78, the device communication unit 32 of the mediating apparatus 30 transmits the device control request received by the management apparatus communication unit 31 to the device 500. Thereby, the communication unit 501 of the device 500 receives the device control request transmitted from the mediating apparatus 30.

In step S79, the command execution unit 503 of the device 500 executes control indicated in the device control request received by the communication unit 501. In step S80, the communication unit 501 of the device 500 transmits a control result notice indicating a control result by the command execution unit 503 to the mediating apparatus 30. Thereby, the device communication unit 32 of the mediating apparatus 30 receives the control result notice transmitted from the device 500.

In step S81, the management apparatus communication unit 31 of the mediating apparatus 30 transmits the control result notice received by the device communication unit 32 to the remote device management apparatus 10. Thereby, the mediating apparatus communication unit 11 of the remote device management apparatus 10 receives the control result notice as a response to the transmitted device control request from the mediating apparatus 30.

In step S82, the web server 16 of the remote device management apparatus 10 transmits the control result notice received by the mediating apparatus communication unit 11 to the administrator terminal 90. The web client 91 of the administrator terminal 90 receives the control result notice as a response to the transmitted remote operation request. Note that the web client 91 of the administrator terminal 90 may display the information contained in the control result notice transmitted from the remote device management apparatus 10 on the display 1006a of the administrator terminal 90. Thereby, the remote device management system 1 can notify the administrator such as the person in charge of maintenance of the device 500 of the control result of the device 500.

In addition, although FIG. 37 illustrates the process in which the remote device management apparatus 10 designates operation content based on the type of device 500 for which the remote operation request has been accepted, the management system 3 may read the operation content associated with the device type of the device 500 from the remote operation management table 170b and, for example, the operation content may be displayed on the administrator terminal 90 as in the remote operation selection area 730 illustrated in FIG. 23.

As described above, in the remote device management system according to the second embodiment, content of remote operation for the device 500 is set in advance for each type of the device 500 in the management system 3, and device control based on the set content of remote operation is performed when the device 500 is remotely operated from the management system 3. Accordingly, the remote device management system according to the second embodiment can perform device control based on the operation content according to the type of the device 500 to be controlled without the administrator designating the content of operation. Therefore, the administrator can control or maintain the device 500 without knowing the operation content or method of the remote operation, and as a result, work efficiency can be improved.

Hereinafter, the remote device management system according to a third embodiment is described. The same configuration and the same function as those of the first embodiment are denoted by the same reference numbers, and the description thereof is omitted. The remote device management system according to the third embodiment filters information on the management screen displayed on the administrator terminal 90 for each account used when the administrator logs in to the application 900. Thereby, the remote device management system according to the third embodiment can prevent reduced assessment or search capability on the part of the administrator due to an increase in information displayed on the management screen.

Functional Configuration

Figure 38:
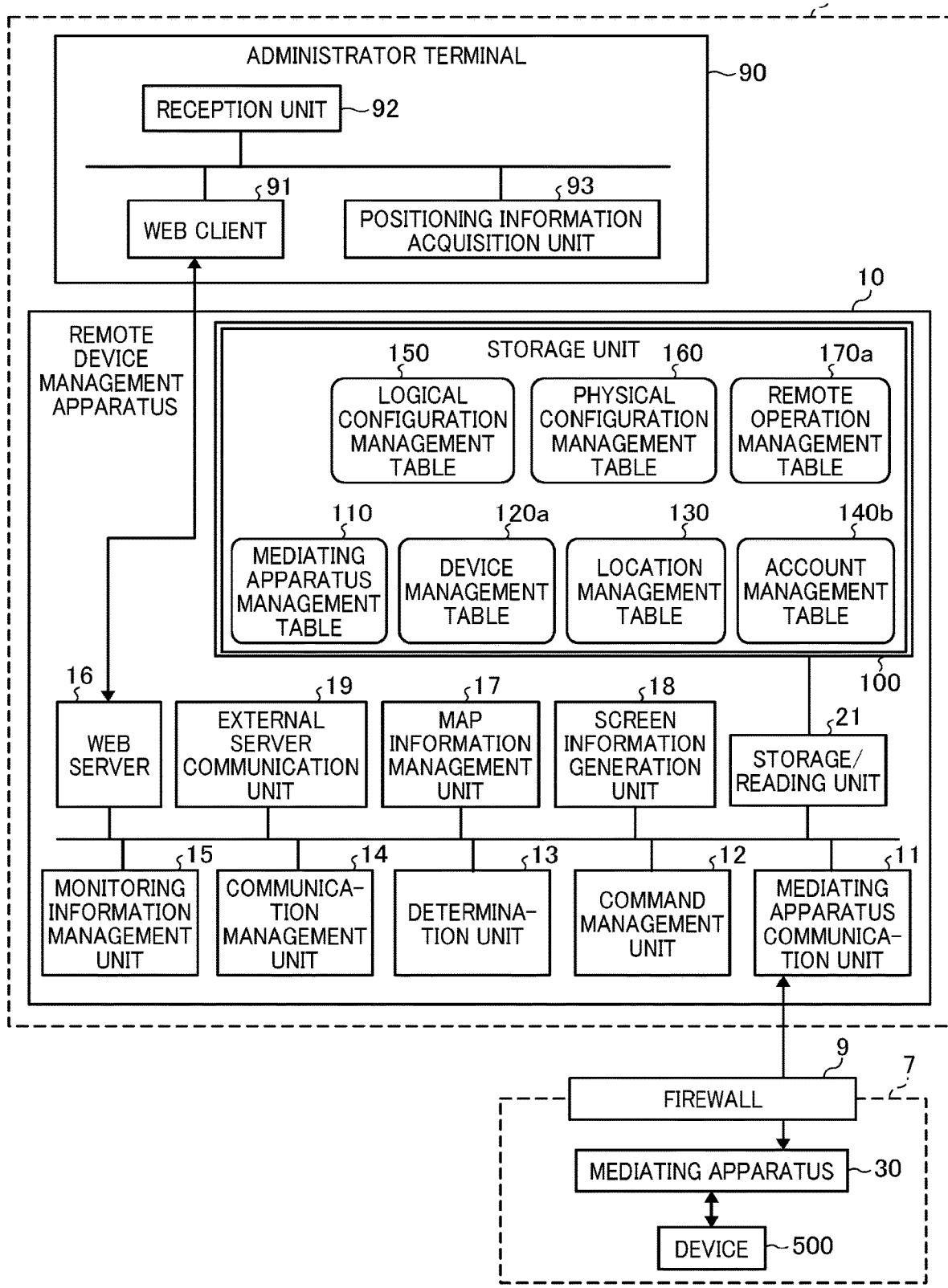
FIG. 38 is a block diagram illustrating an example of the functional configuration of the management system according to a third embodiment of the present disclosure.

FIG. 38 is a block diagram illustrating an example of the functional configuration of the management system according to the third embodiment of the present disclosure. The difference from the first embodiment is that an account management table 140b is stored in the storage unit 100 of the remote device management apparatus 10 instead of the account management table 140a. Details of the account management table 140b are described below.

Communication Definition

Figure 39:
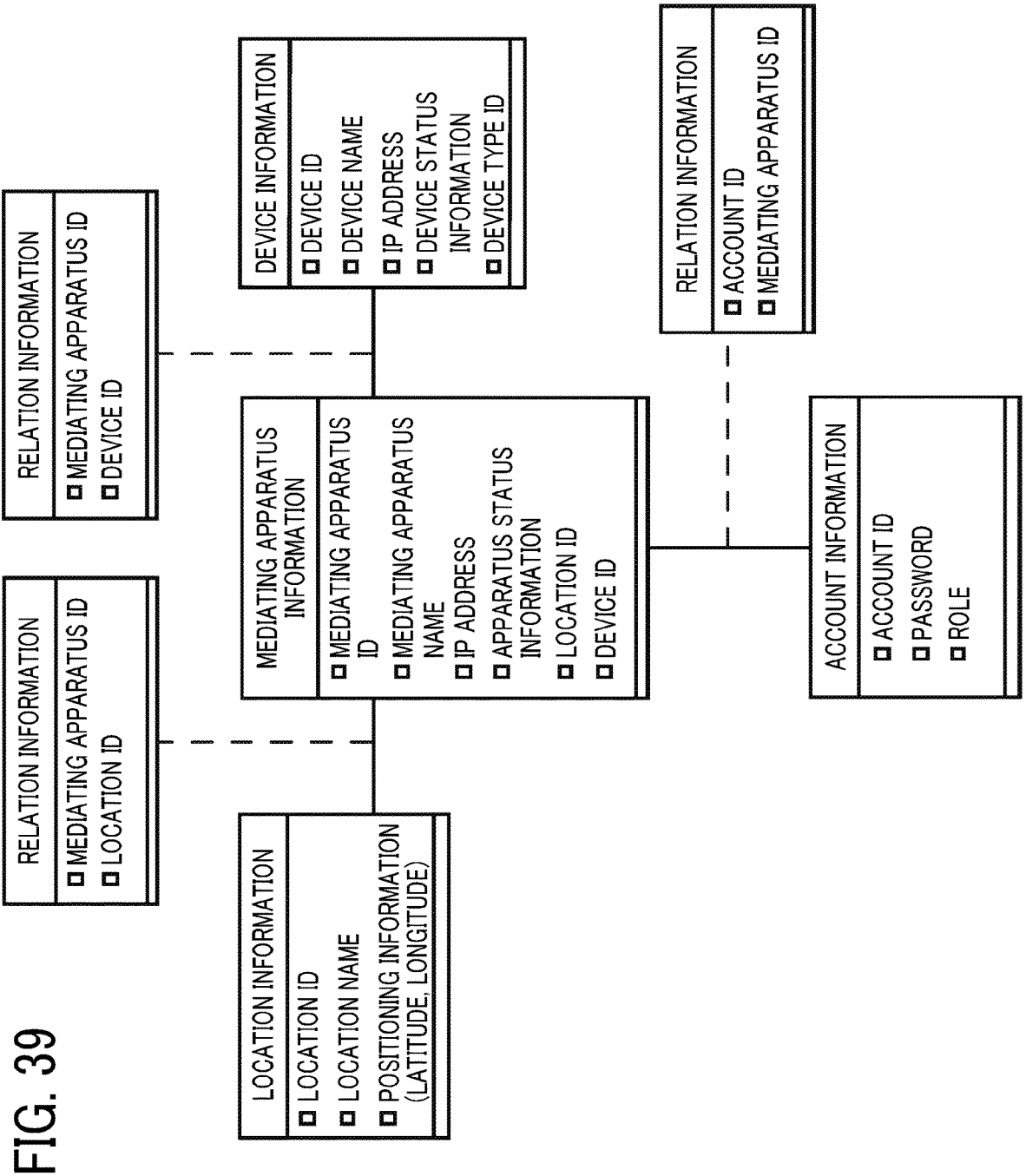
FIG. 39 is a diagram illustrating an example of data structure of the application according to the third embodiment of the present disclosure.

FIG. 39 is a diagram illustrating an example of data structure of the application according to the third embodiment of the present disclosure. The data structure illustrated in FIG. 34 has account information in which a role of the account for logging in to the application 900 is set in addition to the data structure of the application 900 according to the first embodiment illustrated in FIG. 7. Here, the role is, for example, the role of an administrator who uses an account such as a person in charge of installing the mediating apparatus 30 or an administrator of the device. Each piece of information that the application 900 has is stored in the following tables held by the remote device management apparatus 10.

Account Management Table

FIG. 40 is a diagram illustrating an example of the account management table according to the third embodiment of the present disclosure. The account management table 140b illustrated in FIG. 40 stores a role indicating the role of an account (administrator) who logs in to the application 900 and a mediating apparatus ID for identifying the mediating apparatus 30 managed by the account in association with each other in addition to the device information stored in the account management table 140a illustrated in FIG. 11. A role is an example of attribute information indicating an attribute of an administrator. The management system 3 can display only necessary information according to the role of the administrator who uses the account by storing the account information in association with the role. In addition, the management system 3 can store only the information related to the management target mediating apparatus 30 and not display the information related to the mediating apparatus 30 that is not the management target by storing the account information in association with the mediating apparatus ID. In this way, the management system 3 can filter the information displayed on the management screen using the account information stored in the account management table 140b.

Figure 41:
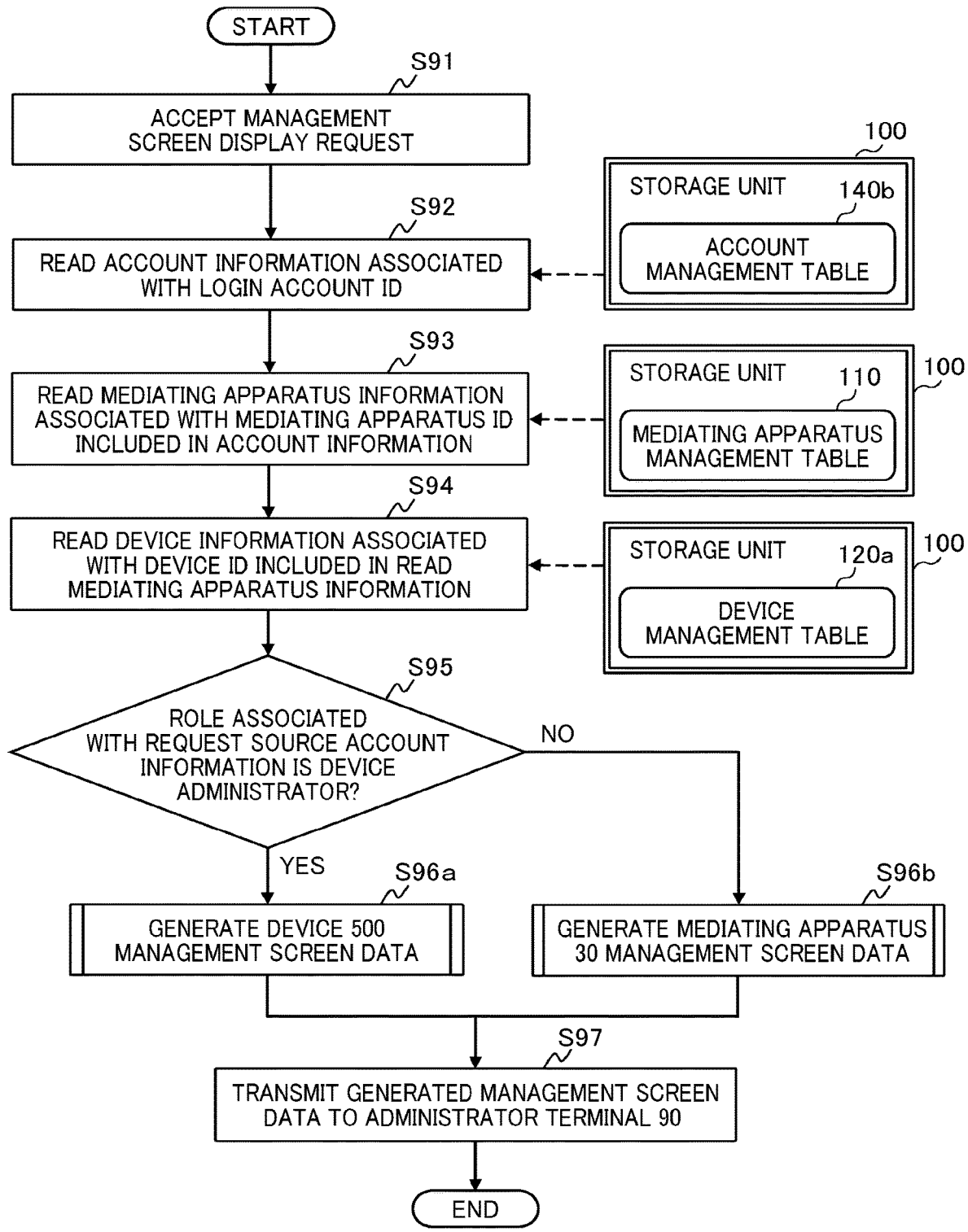
FIG. 41 is a flowchart illustrating an example of a generation process of generating the management screen in the remote device management apparatus according to the third embodiment of the present disclosure.

Hereinafter, processes executed by the remote device management system according to the third embodiment are described with reference to FIG. 41. FIG. 41 is a flowchart illustrating an example of a generation process of generating the management screen in the remote device management apparatus according to the third embodiment of the present disclosure. The flowchart illustrated in FIG. 41 is described on the assumption that an administrator who uses the administrator terminal 90 is logged in to the application 900 using the account ID of the administrator. FIG. 41 illustrates an example in which the role stored in the account management table 140b is a device administrator or a person in charge of installation. In the third embodiment, the processes other than the management screen generation process illustrated in FIG. 41 are the same as each process described in the first embodiment, and thus the description thereof is omitted.

In step S91, the web server 16 of the remote device management apparatus 10 receives the management screen display request transmitted from the administrator terminal 90. This process corresponds to the process in step S37 illustrated in FIG. 19.

In step S92, the storage/reading unit 21 of the remote device management apparatus 10 searches the account management table 140b using the account ID of the logged-in administrator as a search key, thereby acquiring account information associated with the corresponding account ID.

In step S93, the storage/reading unit 21 searches the mediating apparatus management table 110 using the mediating apparatus ID included in the account information read in step S92 as a search key, thereby acquiring the mediating apparatus information associated with the corresponding mediating apparatus ID.

In step S94, the storage/reading unit 21 searches the device management table 120a using the device ID included in the mediating apparatus information read in step S93 as a search key, thereby acquiring the device information associated with the corresponding device ID.

In step S95, when the role included in the account information read in step S92 is the device administrator, the determination unit 13 of the remote device management apparatus 10 shifts the process to step S96a. In step S96a, the screen information generation unit 18 of the remote device management apparatus 10 generates management screen data related to the device 500 based on the device information read in step S94. In this case, the management screen data generated by the screen information generation unit 18 includes only information related to the device 500 managed by the account logged into the application 900. Further, the management screen data generated by the screen information generation unit 18 may be either logical configuration screen data generated by the process illustrated in FIG. 22 or physical configuration screen data generated by the process illustrated in FIG. 25.

On the other hand, in step S95, when the role included in the account information read in step S92 is not a device administrator, the determination unit 13 of the remote device management apparatus 10 shifts the process to step S96b. In step S96b, the screen information generation unit 18 of the remote device management apparatus 10 generates management screen data related to the mediating apparatus 30 based on the mediating apparatus information read in step S93. In this case, the management screen data generated by the screen information generation unit 18 includes only information related to the mediating apparatus 30 managed by the account logged into the application 900.

In step S97, the web server 16 of the remote device management apparatus 10 transmits the management screen data generated by the screen information generation unit 18 to the administrator terminal 90. Thereby, the web client 91 of the administrator terminal 90 receives the management screen data and displays the management screen related to the received management screen data on the display 1006a of the administrator terminal 90. As described above, the remote device management apparatus 10 displays different management screens on the administrator terminal 90 depending on the role associated with the account for logging in to the application 900. The remote device management apparatus 10 displays only information on the mediating apparatus 30 managed by the logged-in account on the management screen. Further, the remote device management apparatus 10 determines whether to display information on the mediating apparatus 30 or information on the device 500 according to the role of the logged-in account.

As described above, the remote device management system according to the third embodiment displays different management screen on the administrator terminal 90 for each account that the administrator uses to log in to the application 900 by managing information on the role of the account and information on the mediating apparatus 30 managed by the account in association with each other in the remote device management apparatus 10. Thereby, the remote device management system according to the third embodiment can prevent reduced assessment or search capability on the part of the administrator due to an increase in information displayed on the management screen.

Hereinafter, the remote device management system according to a fourth embodiment is described. The same configuration and the same function as those of the first embodiment are denoted by the same reference numbers, and the description thereof is omitted. In the remote device management system according to the fourth embodiment, positioning information related to the administrator terminal 90 used by a person in charge of installing the mediating apparatus 30 is registered in advance, and the registered positioning information is set as the positioning information related to the mediating apparatus 30 when the mediating apparatus 30 is installed. Thereby, the remote device management system according to the fourth embodiment can eliminate inputting the positioning information and can improve the work efficiency of the person in charge of installation.

Functional Configuration

Figure 42:
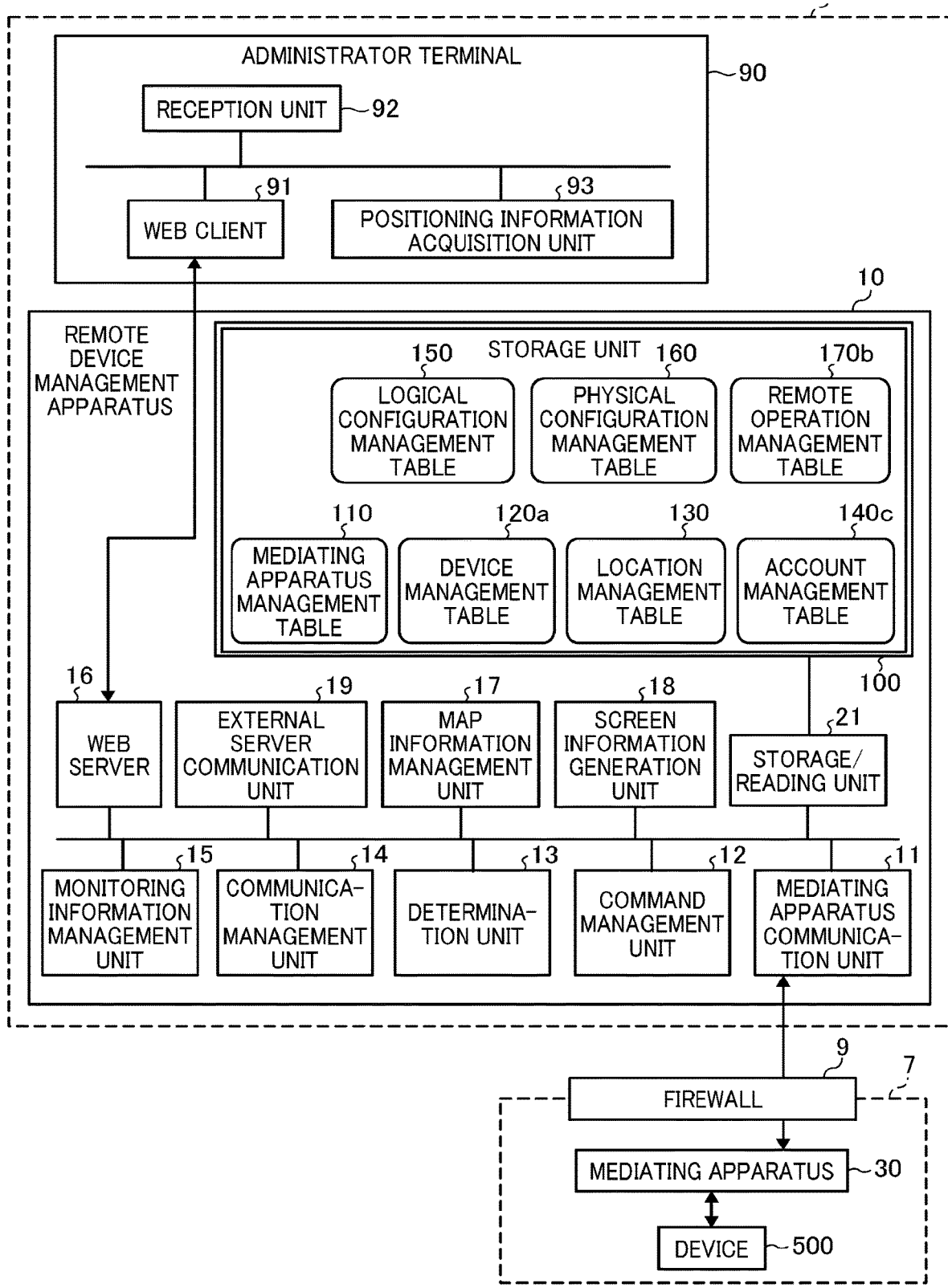
FIG. 42 is a block diagram illustrating an example of the functional configuration of the management system according to a fourth embodiment of the present disclosure.

FIG. 42 is a block diagram illustrating an example of the functional configuration of the management system according to a fourth embodiment of the present disclosure. The difference from the first embodiment is that an account management table 140c is stored in the storage unit 100 of the remote device management apparatus 10 instead of the account management table 140a, and a remote operation management table 170b is stored instead of the remote operation management table 170a. The remote operation management table 170b is the same as that illustrated in FIG. 36 and the description thereof is omitted.

Account Management Table

FIG. 43 is a diagram illustrating an example of the account management table according to the fourth embodiment of the present disclosure. In addition to the account information stored in the account management table 140a illustrated in FIG. 11, the account management table 140c illustrated in FIG. 43 further stores a location ID for identifying the place where the administrator using the account is located. The remote device management apparatus 10 identifies the location ID associated with the account information based on the positioning information including the latitude and longitude information related to the administrator terminal 90 and the location information stored in the location management table 130.

Figure 44:
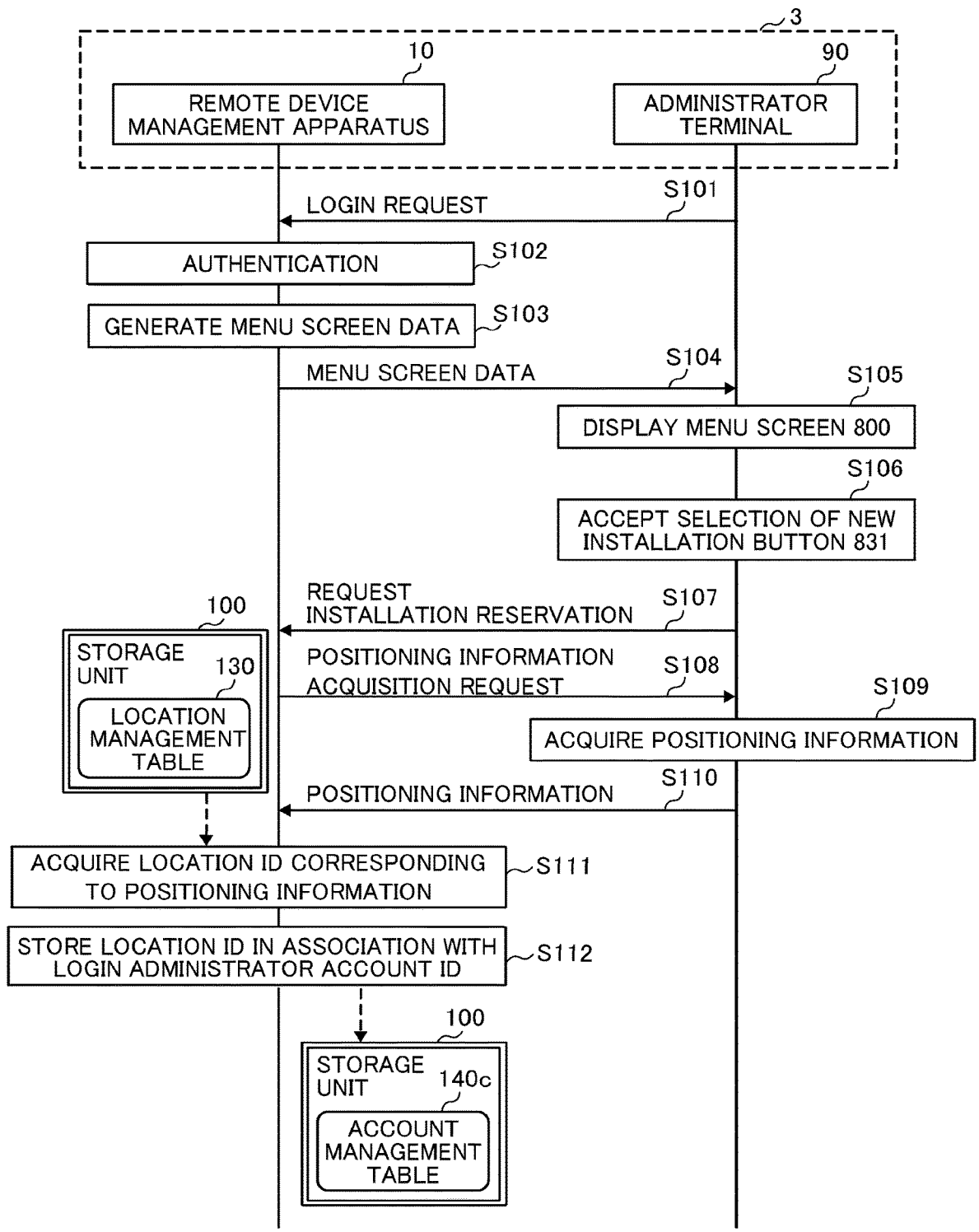
FIG. 44 is a sequence diagram illustrating an example of the registration process of registering the mediating apparatus on the remote device management apparatus according to the fourth embodiment of the present disclosure.
Figure 45:
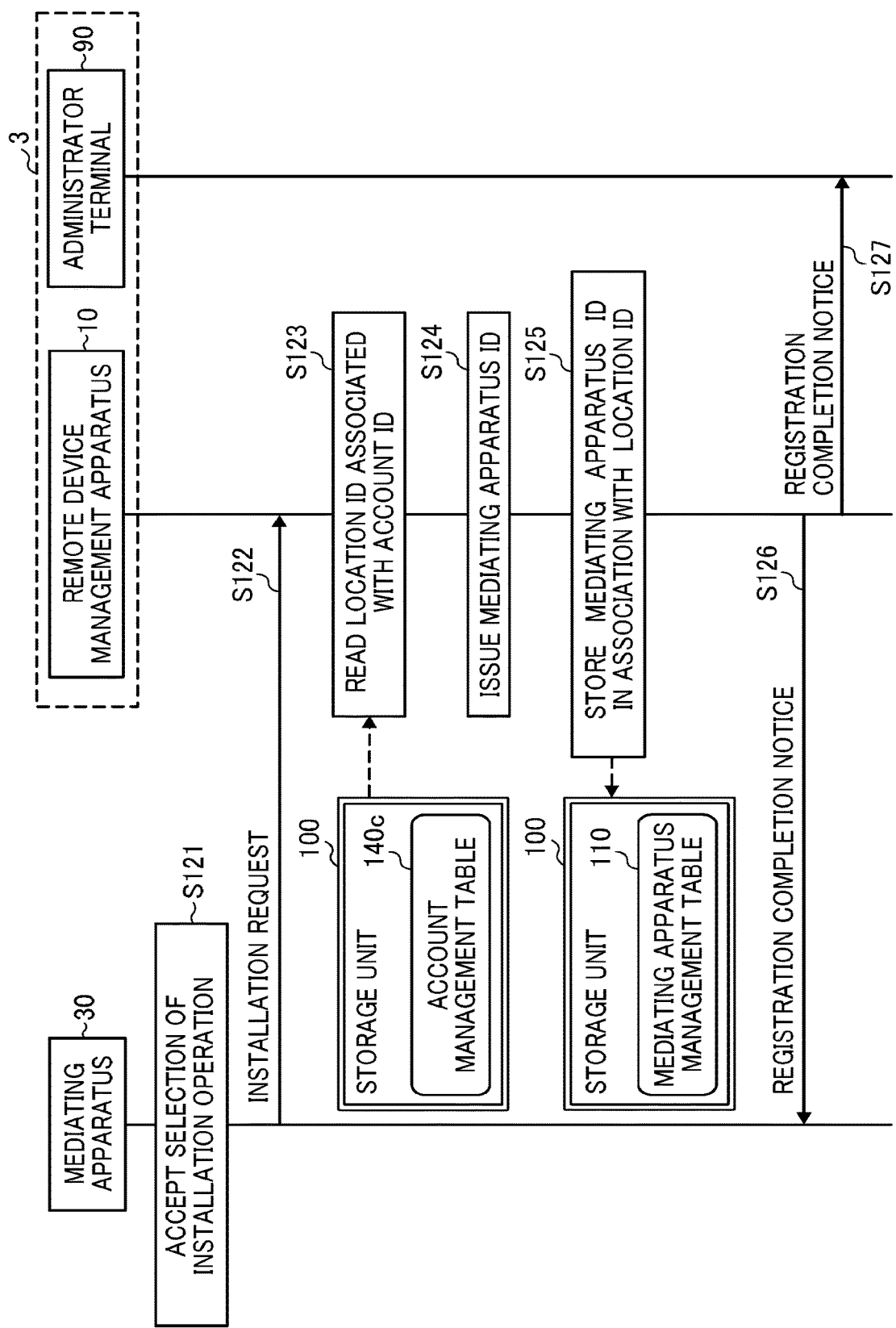
FIG. 45 is a sequence diagram illustrating another example of the registration process of registering the mediating apparatus on the remote device management apparatus according to the fourth embodiment of the present disclosure.

Hereinafter, processes executed by the remote device management system according to the fourth embodiment is described with reference to FIG. 44 and FIG. 45. FIG. 44 and FIG. 45 are sequence diagrams illustrating examples of the registration process of registering the mediating apparatus on the remote device management apparatus according to the fourth embodiment of the present disclosure. In the fourth embodiment, processes other than the registration process of registering the mediating apparatus illustrated in FIGS. 44 and 45 are the same as the processes described in the first embodiment, and thus the description thereof is omitted. First, a process in which the person in charge of installing the mediating apparatus 30 (administrator) makes an installation reservation of the mediating apparatus 30 on the management system 3 is described with reference to FIG. 44. Note that the processes from step S101 to step S105 are the same as the processes from step S31 to step S35 illustrated in FIG. 19, and thus the description thereof is omitted.

In step S106, the reception unit 92 of the administrator terminal 90 receives the selection of the new installation button 831 included in the mediating apparatus management area 830 of the menu screen 800 illustrated in FIG. 20. In step S107, when the selection of the new installation button 831 is received by the reception unit 92, the web client 91 of the administrator terminal 90 transmits an installation reservation request for newly installing the mediating apparatus 30 to the remote device management apparatus 10. Thereby, the web server 16 of the remote device management apparatus 10 receives the installation reservation request.

In step S108, when the installation reservation request is received, the web server 16 of the remote device management apparatus 10 transmits a positioning information acquisition request to the administrator terminal 90. Thereby, the web client 91 of the administrator terminal 90 receives the positioning information acquisition request.

In step S109, the positioning information acquisition unit 93 of the administrator terminal 90 uses the GPS reception circuit 1009 to acquire the positioning information including latitude and longitude information indicating the location of the administrator terminal 90.

In step S110, the web client 91 of the administrator terminal 90 transmits the positioning information acquired by the positioning information acquisition unit 93 to the remote device management apparatus 10. Thereby, the web server 16 of the remote device management apparatus 10 receives the positioning information related to the administrator terminal 90.

In step S111, the monitoring information management unit 15 of the remote device management apparatus 10 acquires a location ID corresponding to the positioning information received in step S110. Specifically, the monitoring information management unit 15 searches the location management table 130 using the acquired positioning information as a search key, thereby collating whether corresponding positioning information exists. If the corresponding positioning information exists, the monitoring information management unit 15 acquires a location ID associated with the corresponding positioning information. On the other hand, when the corresponding positioning information does not exist, the monitoring information management unit 15 newly generates a location ID and acquires the generated location ID. Then, the monitoring information management unit 15 associates the generated location ID with the acquired positioning information and stores in the location management table 130 as location information.

In step S112, the storage/reading unit 21 of the remote device management apparatus 10 stores the location ID acquired in step S111 in the account management table 140c in association with the account ID of the logged-in administrator. As described above, the person in charge (administrator) of installation of the mediating apparatus 30 registers the positioning information related to the administrator terminal 90 in association with the account ID before the mediating apparatus 30 is installed. Thereby, the remote device management apparatus 10 can register the positioning information related to the administrator terminal 90 as the positioning information related to the person in charge of installation without manually inputting the positioning information to the person in charge (administrator) of the mediating apparatus 30.

Hereinafter, an installation process of the mediating apparatus 30 performed by the person in charge (administrator) of the installation of the mediating apparatus 30 is described with reference to FIG. 45. In step S121, the accepting unit 33 of the mediating apparatus 30 accepts selection of an installation operation for the mediating apparatus 30. The reception unit 33 receives selection of an installation operation of the mediating apparatus 30 by, for example, an input operation on a display screen displayed on the display 1006a of the mediating apparatus 30 illustrated in FIG. 3.

In step S122, the management apparatus communication unit 31 of the mediating apparatus 30 transmits an installation request to the remote device management apparatus 10 when the selection of the installation operation is received by the reception unit 33. Here, the installation request includes the account ID of the person in charge of installation of the mediating apparatus 30. Note that the account ID of the person in charge of installation is the same as the account ID of the person in charge of installation who made the installation reservation in the process illustrated in FIG. 24. Thereby, the mediating apparatus communication unit 11 of the remote device management apparatus 10 receives the installation request.

In step S123, the storage/reading unit 21 of the remote device management apparatus 10 reads the location ID associated with the corresponding account ID by searching the account management table 140c using the account ID included in the installation request received by the mediating apparatus communication unit 11 as a search key.

In step S124, the monitoring information management unit 15 of the remote device management apparatus 10 issues a mediating apparatus ID for identifying the newly installed mediating apparatus 30. In step S125, the storage/reading unit 21 of the remote device management apparatus 10 stores the location ID read in step S123 and the mediating apparatus ID issued by the monitoring information management unit 15 in association with each other.

In step S126, the mediating apparatus communication unit 11 of the remote device management apparatus 10 transmits a registration completion notice to the mediating apparatus 30. As a result, the management apparatus communication unit 31 of the mediating apparatus 30 receives the registration completion notice. In step S127, the web server 16 of the remote device management apparatus 10 transmits a registration completion notice to the administrator terminal 90. Thereby, the web client 91 of the administrator terminal 90 receives the registration completion notice. As described above, the remote device management apparatus 10 can automatically set the positioning information related to the mediating apparatus 30 from the positioning information related to the person in charge of installation (account ID) set in advance.

As described above, the remote device management system according to the fourth embodiment registers the positioning information related to the administrator terminal 90 used by the person in charge of installing the mediating apparatus 30 in advance, and the positioning information is set as the positioning information related to the mediating apparatus 30. Thereby, the remote device management system according to the fourth embodiment can eliminate inputting the positioning information and can improve the work efficiency of the person in charge of installation.

Figure 46:
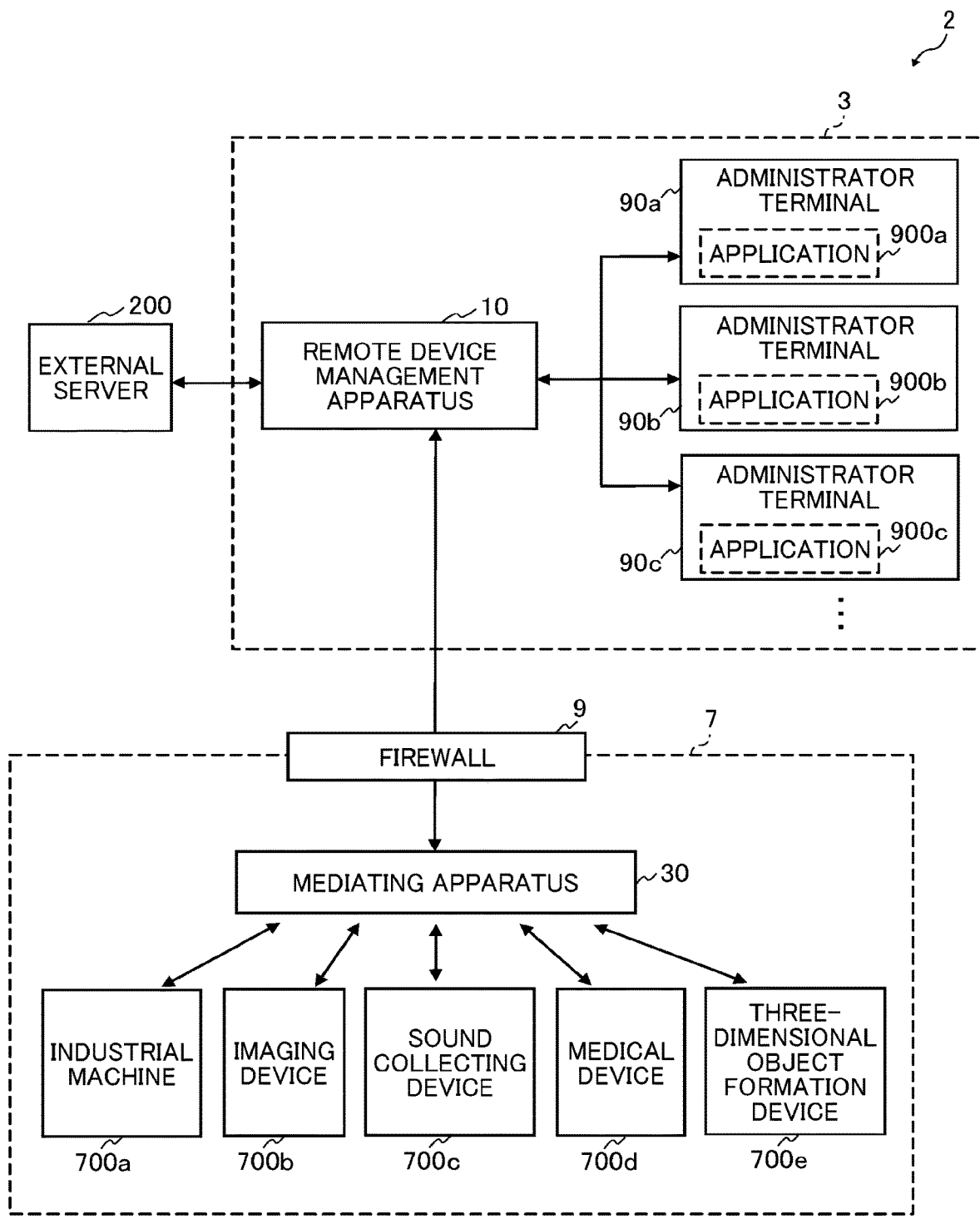
FIG. 46 is a block diagram illustrating an example of the system configuration of the remote device management system according to another embodiment of the present disclosure.

FIG. 46 is a diagram illustrating an example of a system configuration of the remote device management system according to another embodiment of the present disclosure. The difference between the remote device management system 2 illustrated in FIG. 46 and the remote device management system 1 described above is that the types of devices 500 that communicate with the mediating apparatus 30 are different, that is, the usage environment of the device 500 to be managed is different. The device 700 includes an industrial machine 700*a*, an imaging device 700*b*, a sound collecting device 700*c*, a medical device 700*d*, a three-dimensional object formation device 700*e*, and the like.

The industrial machine 700*a* is a processing device, an inspection device, a transport device, a picking device, and the like. The industrial machine 700*a* transmits device information such as device identification information, operation status, presence/absence of abnormal operation, information on replacement time of consumables, inspection result obtained by the device to the management system 3 (remote device management apparatus 10). The industrial machine 700*a* transmits device information to the management system 3 (remote device management apparatus 10) using various information transfer formats, such as data or image.

The imaging device 700*b* and the sound collecting device 700*c* are devices installed around the industrial machine 700*a*, for example, to detect the status of the industrial machine 700*a*. The medical device 700*d* is a fundus examination apparatus, an X-ray examination apparatus, a sphygmomanometer, a body fat scale, an eye meter, a pacemaker, and the like. The medical device 700*d* transmits device information such as device identification information, device operation status, presence or absence of abnormal operation, measurement result of the device, etc., to the management system 3 (remote device management apparatus 10). The medical device 700*d* transmits device information to the management system 3 (remote device management apparatus 10) using various information transfer formats such as data or image.

The three-dimensional object formation device 700*e* includes a 3D printer or the like that receives 3D data indicating a shape of a three-dimensional object such as computer aided design (CAD) data and forms a three-dimensional object by depositing a tier of a forming material based on the data. The three-dimensional object formation device 700*e* uses material extrusion delocation (fused delocation modeling (FDM)), material jetting, binder jetting, powder sinter tiered formation (selective laser sintering (SLS)), stereolithography (SLA) etc., as a formation method. The three-dimensional object formation device 700*e* transmits the identification information related to the device, the operation status of the device, the presence or absence of abnormal operation, the status of the consumables attached to the device, etc., to the management system 3 (remote device management apparatus 10) through the mediating apparatus 30 using various data formats such as numerical data, text data or image data.

In the remote device management system 2 illustrated in FIG. 46, the mediating apparatus 30 is connected to the remote device management apparatus 10 through the firewall 9. The mediating apparatus 30 may have a firmware update function of updating the firmware installed in the device 700 using the internet connection.

In the example illustrated in FIG. 46, the remote device management system 2 illustrates a configuration including a plurality of devices 700 and one mediating apparatus 30, but the remote device management system 2 may further include other devices. For example, when the processing load of one mediating apparatus 30 becomes large, the function for updating the firmware of the device 700 and the function of remote management of the device 700 may be divided and assigned to a plurality of mediating apparatuses.

The device 700 to be managed in the remote device management system 2 is not limited to the example illustrated in FIG. 46. The device 700 may be, for example, a device that has a communication function in a home appliance, a vending machine, a power supply device, an air conditioning system, or a metering system such as gas, water, electricity, and the like.

As described above, the management system 3 according to embodiments of the present disclosure communicates with the mediating apparatus 30 communicably connected to the device 500 in the local network 7 through the firewall 9, and acquires the positioning information indicating the location of the mediating apparatus 30 and stores the acquired positioning information and the device identification information for identifying device 500 communicably connected to the mediating apparatus 30 corresponding to the positioning information in association with each other. The management system 3 receives the device status information indicating the status of the device 500 from the mediating apparatus 30, and displays the physical configuration screen 910*b* (an example of a first management image) including the map information depicting an area including a location corresponding to the positioning information, and the device identification image 930 indicating the device status information related to the device 500 related to the device identification information associated with the positioning information corresponding to the map information on the display 1006*a*. Thereby, the management system 3 can cause the system administrator intuitively grasp the status and location of the device 500 to be managed.

In addition, the management system according to embodiments of the present disclosure stores the positioning information indicating the location of the mediating apparatus 30 and the mediating apparatus identification information for identifying the mediating apparatus 30 corresponding to the positioning information in association with each other, receives the apparatus status information indicating the status of the mediating apparatus 30 from the mediating apparatus 30, and displays the physical configuration screen 910*a* (an example of a second management image) including the map information depicting an area including a location corresponding to the positioning information, and the mediating apparatus identification image 920 indicating the apparatus status information related to the mediating apparatus 30 related to the mediating apparatus identification information associated with the positioning information at the location indicated by the positioning information corresponding to the map information, on the display 1006*a*. As a result, the management system 3 allows the system administrator to intuitively grasp the status and location of the management target device 500 and the management target mediating apparatus 30.

Furthermore, the management system according to embodiments of the present disclosure is configured to display the logical configuration screen 710 (third management image) indicating a connection relation between the mediating apparatus 30 and the device 500 based on the stored device identification information and mediating apparatus identification information on the display 1006a. As a result, the management system 3 displays the hierarchical relation between the mediating apparatus 30 and the device 500 to be managed (monitored) and information indicating the status of the mediating apparatus 30 and the device 500, for the administrator to visually recognizes information related to the management target mediating apparatus 30 and the management target device 500.

In addition, the management system according to embodiments of the present disclosure receives a request to display a management screen from a specific account (an example of an administrator), stores the account ID (an example of administrator identification information) for identifying the specific account and a role of the specific account (an example of attribute information indicating an attribute of a specific administrator) in association with each other, and based on the role associated with the account ID, displays either the physical configuration screen 910b (an example of a first management image) or the physical configuration screen 910a (an example of a second management image) on the display 1006a. Thereby, the management system 3 can prevent reduced assessment or search capability on the part of the administrator due to an increase in information displayed on the management screen.

Furthermore, the management system according to embodiments of the present disclosure receives selection of the device identification image 930 included in the physical configuration screen 910b (an example of the first management image), and transmits a device control request for performing remote control on the device 500 related to the device identification image 930 to the mediating apparatus 30 communicably connected to the device 500. As a result, the management system 3 can cause the administrator to select the device 500 to be remotely controlled according to the status and location of the device 500 displayed on the logical configuration screen 710 or the physical configuration screen 910a or 910b. The time and effort of the administrator can be reduced, and it becomes possible to fix malfunction or perform maintenance on the device 500 that requires remote control.

In addition, the management system according to embodiments of the present disclosure transmits a device control request for performing control on the device 500 to the mediating apparatus 30 through a WebSocket session with the mediating apparatus 30 (an example of a communication session connected to the mediating apparatus 30) and as a response to the device control request, receives device status information indicating the status of the device 500 from the mediating apparatus 30. As a result, the management system 3 can acquire the device status information from the mediating apparatus 30 by maintaining the communication session in which communication (connection) is always possible with the mediating apparatus 30.

Furthermore, the display control method according to embodiments of the present disclosure is executed by the mediating apparatus 30 communicably connected to the device 500 in the local network 7 and the management system 3 that communicates through the firewall 9. The display control method includes an acquisition step of acquiring positioning information indicating the location of the mediating apparatus 30, a storage control step of associating and storing the acquired positioning information and device identification information for identifying the device 500 communicably connected to the mediating apparatus 30 corresponding to the positioning information in the storage unit 100, a receiving step of receiving device status information indicating the status of the device 500 from the mediating apparatus 30, and a display control step of displaying the physical configuration screen 910b (an example of a first management image) on the display 1006a including map information depicting an area including a location corresponding to the positioning information and the device identification image 930 indicating device status information related to the device 500 related to the device identification information associated with the positioning information at the location indicated by the positioning information stored in the storage unit 100 corresponding to the map information. Thereby, the display control method according to the embodiment of the present disclosure allows the system administrator to intuitively grasp the status and location of the management target device 500 and the mediating apparatus 30.

The functions of each embodiment can be implemented by a computer executable program described in a legacy programming language such as assembler, C, C++, C#, Java (registered trademark) or an object oriented programming language, etc. Programs for performing the functions of each embodiment can be distributed through telecommunication lines.

The programs for executing the functions of the embodiments may be stored and distributed on equipment readable recording media such as a ROM, an electrically erasable programmable read-only memory (EEPROM), an erasable programmable read-only memory (EPROM), a flash memory, a flexible disc, a compact disc-read only memory (CD-ROM), a compact disc-rewritable (CD-RW), a digital versatile disc-read only memory (DVD-ROM), a digital versatile disc-random access memory (DVD-RAM), a digital versatile disc-rewritable (DVD-RW), a Blu-ray disc, an Secure Digital (SD) card, a magneto-optical (MO) disc, and the like.

In addition, some or all of the functions of the embodiments may be mounted on a programmable device (PD) such as a field programmable gate array (FPGA) or implemented as an application specific integrated circuit (ASIC), and distributed by the recording medium as a circuit configuration data (bit stream data) downloaded to the PD in order to implement the functions of the embodiments on the PD, or as data described by Hardware Description Language (HDL), Very High Speed Integrated Circuits Hardware Description Language (VHDL), Verilog-HDL, etc. for generating circuit configuration data.

Although the management system, a remote device management system, a display control method, and the program according to one embodiment of the present disclosure have been described above, the present disclosure is not limited to the above-described embodiment, and other embodiments. Such additions, changes or deletions may be modified within the scope of those skilled in the art, and any mode is within the scope of the present disclosure as long as the action and effect of the present disclosure are exhibited.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A management system for communicating with a mediating apparatus communicably connected to a device in a local network through a firewall, the management system comprising:
    processing circuitry configured to:
        acquire positioning information indicating a location of the mediating apparatus;
        store the positioning information in association with device identification information identifying a device communicable with the mediating apparatus corresponding to the positioning information;
        receive, from the mediating apparatus, device status information indicating a status of the device; and
        display, on a display, a first management image including (1) a map depicting an area including the location corresponding to the positioning information, and (2) a device identification image indicating the device status information related to the device corresponding to the device identification information associated with the positioning information, wherein the device identification image, which identifies the device, is displayed on the map at the location of the mediating apparatus indicated by the stored positioning information, wherein
    the processing circuitry is further configured to selectively switch between
        (1) displaying the first management image including the map and the device identification image, and
        (2) displaying a second management image including the map and a mediating apparatus identification image indicating apparatus status information of the mediating apparatus, without displaying the device identification information, and
    the device identification image and the mediating apparatus identification image, when displayed, are displayed at the location of the mediating apparatus.

2. The management system of claim 1, wherein the processing circuitry is further configured to:
    store mediating apparatus identification information identifying the mediating apparatus corresponding to the positioning information in association with the positioning information;
    receive the apparatus status information indicating a status of the mediating apparatus from the mediating apparatus; and
    display, on the display, the second management image including the map and the mediating apparatus identification image.

3. The management system of claim 2, wherein the processing circuitry is further configured to:
    display, on the display, a third management image indicating a connection relation between the mediating apparatus and the device, based on the stored device identification information and the stored mediating apparatus identification information.

4. The management system of claim 3, wherein the processing circuitry is further configured to:
    receive a selection of an image displayed on the display; and
    switch the image on the display from the displayed image to one of the first management image, the second management image, and the third management image, in response to the received selection.

5. The management system of claim 4, wherein the processing circuitry is further configured to:
    receive selection of the mediating apparatus identification image included in the second management image; and
    switch the image on the display from the second management image to the first management image, in response to receiving the selection of the mediating apparatus identification image.

6. The management system of claim 2, wherein the processing circuitry is further configured to:
    receive a request to display a management screen from an administrator;
    store administrator identification information identifying the administrator in association with attribute information indicating an attribute of the administrator; and
    display, on the display, one of the first management mage and the second management image based on the attribute information associated with the administrator identification information.

7. The management system of claim 1, wherein the processing circuitry is further configured to:
    receive selection of the device identification image included in the first management image; and
    transmit a device control request for performing control on the device corresponding to the selected device identification image to the mediating apparatus communicably connected to the device.

8. The management system of claim 7, wherein the processing circuitry is further configured to:
    transmit the device control request to the mediating apparatus through a communication session established with the mediating apparatus; and
    receive the device status information from the mediating apparatus as a response to the device control request.

9. A remote device management system, comprising
    the management system of claim 1; and
    the mediating apparatus communicably connected with the management system, the mediating apparatus comprising:
        a memory that stores a plurality of instructions; and
        a processor, when executing the plurality of instructions, configured to:
            receive a device control request from the management system;
            transmit the received device control request to the device; and
            transmit the device status information transmitted from the device as a response to the device control request to the management system.

10. A display control method executed by a mediating apparatus communicably connected to a device in a local network and a management system that performs communication through a firewall, the display control method comprising:

acquiring positioning information indicating a location of the mediating apparatus;

storing positioning information indicating a location of the mediating apparatus in association with device identification information identifying the device communicable with the mediating apparatus corresponding to the positioning information;

receiving, from the mediating apparatus, device status information indicating a status of the device;

displaying, on a display, a first management image including (1) a map depicting an area including the location corresponding to the positioning information, and (2) a device identification image indicating the device status information related to the device corresponding to the device identification information associated with the positioning information, wherein the device identification image, which identifies the device, is displayed on the map at the location of the mediating apparatus indicated by the stored positioning information; and selectively switching between
- (1) displaying the first management image including the map and the device identification image, and
- (2) displaying a second management image including the map and a mediating apparatus identification image indicating apparatus status information of the mediating apparatus, without displaying the device identification information, and the device identification image and the mediating apparatus identification image, when displayed, are displayed at the location of the mediating apparatus.

11. A non-transitory recording medium storing instructions which, when executed by processing circuitry of a mediating apparatus communicably connected to a device in a local network and a management system that performs communication through a firewall, cause the processing circuitry to perform a display control method comprising:

acquiring positioning information indicating a location of the mediating apparatus;

storing positioning information indicating a location of the mediating apparatus in association with device identification information identifying the device communicable with the mediating apparatus corresponding to the positioning information;

receiving, from the mediating apparatus, device status information indicating a status of the device;

displaying, on a display, a first management image including (1) a map depicting an area including the location corresponding to the positioning information, and (2) a device identification image indicating the device status information related to the device corresponding to the device identification information associated with the positioning information, wherein the device identification image, which identifies the device, is displayed on the map at the location of the mediating apparatus indicated by the stored positioning information; and selectively switching between
- (1) displaying the first management image including the map and the device identification image, and
- (2) displaying a second management image including the map and a mediating apparatus identification image indicating apparatus status information of the mediating apparatus, without displaying the device identification information, and the device identification image and the mediating apparatus identification image, when displayed, are displayed at the location of the mediating apparatus.

* * * * *